United States Patent
Masanaga

(10) Patent No.: US 10,227,258 B2
(45) Date of Patent: Mar. 12, 2019

(54) SHRINKAGE-REDUCING AGENT FOR HYDRAULIC MATERIAL

(71) Applicant: NIPPON SHOKUBAI CO., LTD., Osaka-shi, Osaka (JP)

(72) Inventor: Mari Masanaga, Osaka (JP)

(73) Assignee: Nippon Shokubai Co., Ltd., Osaka (JP)

(*) Notice: Subject to any disclaimer, the term of this patent is extended or adjusted under 35 U.S.C. 154(b) by 178 days.

(21) Appl. No.: 15/515,481

(22) PCT Filed: Sep. 30, 2015

(86) PCT No.: PCT/JP2015/077818
§ 371 (c)(1),
(2) Date: Mar. 29, 2017

(87) PCT Pub. No.: WO2016/052652
PCT Pub. Date: Apr. 7, 2016

(65) Prior Publication Data
US 2017/0226012 A1 Aug. 10, 2017

(30) Foreign Application Priority Data

Sep. 30, 2014 (JP) ................... 2014-202235
Apr. 13, 2015 (JP) ................... 2015-082043

(51) Int. Cl.
| C04B 24/26 | (2006.01) |
| C04B 24/02 | (2006.01) |
| C04B 24/12 | (2006.01) |
| C04B 24/32 | (2006.01) |
| C04B 28/02 | (2006.01) |
| C04B 28/04 | (2006.01) |
| C04B 24/04 | (2006.01) |

(Continued)

(52) U.S. Cl.
CPC .......... *C04B 24/2647* (2013.01); *C04B 24/04* (2013.01); *C04B 24/2611* (2013.01); *C04B 24/34* (2013.01); *C04B 28/04* (2013.01); *C04B 2103/302* (2013.01); *C04B 2103/304* (2013.01); *C04B 2103/50* (2013.01); *C04B 2111/34* (2013.01)

(58) Field of Classification Search
CPC . C04B 24/2647; C04B 24/04; C04B 24/2611; C04B 24/34; C04B 28/04; C04B 2103/302; C04B 2103/304; C04B 2103/50; C04B 2111/34
USPC .......................................................... 524/5
See application file for complete search history.

(56) References Cited

U.S. PATENT DOCUMENTS

| 9,139,474 B2* | 9/2015 | Masanaga | ............... C04B 24/32 |
| 2007/0181039 A1 | 8/2007 | Yamamoto et al. | |
| 2011/0291053 A1 | 12/2011 | Masanaga | |

FOREIGN PATENT DOCUMENTS

| JP | 2002-293596 | 10/2002 |
| JP | 2007-076872 | 3/2007 |

(Continued)

*Primary Examiner* — Kelechi C Egwim
(74) *Attorney, Agent, or Firm* — Hamre, Schumann, Mueller & Larson, P.C.

(57) ABSTRACT

The present invention aims to provide a shrinkage reducing agent that exhibits high performance to reduce the shrinkage of hydraulic materials. The present invention relates to a shrinkage reducing agent for a hydraulic material including a compound that satisfies the following conditions (1) to (4): (1) a ratio represented by {(15-drop flow value of a mortar composition containing the compound)/(15-drop flow value of a mortar free from the compound)}×100 is 120 or less, wherein the (15-drop flow value of a mortar composition containing the compound) means a 15-drop flow value of a mortar composition containing the compound at a solid concentration of 0.1% after 10 minutes mixing and the (15-drop flow value of a mortar free from the compound) means a 15-drop flow value of a mortar free from the compound after 10 minutes mixing; (2) a ratio represented by {(ratio between 15-drop flow values after two hours mixing)/(ratio between 15-drop flow values after 10 minutes mixing)}×100 is 110 or less, wherein the (ratio between 15-drop flow values after two hours mixing) means a ratio of a 15-drop flow value of a mortar composition containing the compound at a solid concentration of 0.1% after two hours mixing to a 15-drop flow value of a mortar free from the compound after two hours mixing, and the (ratio between 15-drop flow values after 10 minutes mixing) means a ratio of a 15-drop flow value of a mortar composition containing the compound at a solid concentration of 0.1% after 10 minutes mixing to a 15-drop flow value of a mortar free from the compound after 10 minutes mixing; (3) the compound has an average particle diameter of 2.2 to 8.5 nm in an alkaline solution; and (4) a product of {(ratio between 15-drop flow values relating to a mortar composition containing the compound at a solid concentration of 1.0%)×(ratio between 15-drop flow values relating to a mortar composition containing the compound at a solid concentration of 0.1%)} is 10,100 or more, wherein the (ratio between 15-drop flow values relating to a mortar composition containing the compound at a solid concentration of 1.0%) means a ratio of a 15-drop flow value of a mortar composition containing the compound at a solid concentration of 1.0% after 10 minutes mixing to a 15-drop flow value of a mortar free from the compound after 10 minutes mixing, and the (ratio between 15-drop flow values relating to a mortar composition containing the compound at a solid concentration of 0.1%) means a ratio of a 15-drop flow value of a mortar composition containing the compound at a solid concentration of 0.1% after 10 minutes mixing to a 15-drop flow value of a mortar free from the compound after 10 minutes mixing, the mortar compositions and the mortars are in accordance with JASS 5 M402.

10 Claims, No Drawings

(51) Int. Cl.
  *C04B 24/34*   (2006.01)
  *C04B 103/60*  (2006.01)
  *C04B 103/30*  (2006.01)
  *C04B 103/50*  (2006.01)
  *C04B 111/34*  (2006.01)

(56) References Cited

FOREIGN PATENT DOCUMENTS

| | | | |
|---|---|---|---|
| JP | 2007-529397 | 10/2007 | |
| JP | 2007-297241 | 11/2007 | |
| JP | 2008-230865 | 10/2008 | |
| JP | 2009-263167 | 11/2009 | |
| JP | 2009263167 A * | 11/2009 | ......... C04B 24/2647 |
| JP | 2010-053027 | 3/2010 | |
| JP | 4437369 B | 3/2010 | |
| JP | 2010053027 A * | 3/2010 | |
| JP | 2015-067521 | 4/2015 | |
| JP | 2015-074666 | 4/2015 | |

* cited by examiner

SHRINKAGE-REDUCING AGENT FOR HYDRAULIC MATERIAL

TECHNICAL FIELD

The present invention relates to a shrinkage reducing agent for a hydraulic material. Specifically, the present invention relates to a shrinkage reducing agent for a hydraulic material suitable for a cement composition, for example.

BACKGROUND ART

Hydraulic materials give cured products excellent in properties such as strength and durability, and therefore have been widely used in cement compositions such as cement paste, mortar, and concrete. Such hydraulic materials are indispensable for the construction of civil engineering and constructional structures. The hydraulic materials after being cured incur dispersion of an unaltered water component remaining therein owing to an atmospheric temperature and humidity, and suffer drying shrinkage probably caused thereby. This causes the generation of cracks in the cured products, leading to a reduction in the strength and the durability. When the strength or durability of the civil engineering and building structures is reduced, serious problems occur such as decline of safety and increased cost for repair.

In order to solve such problems, the importance of shrinkage reducing agents for a hydraulic material that suppress the development of drying shrinkage in cured products of hydraulic materials has been acknowledged, and the technical innovation thereof has been actively developed.

The following compounds are disclosed, for example, as conventional shrinkage reducing agents: a copolymer containing a structural unit derived from an unsaturated carboxylic acid monomer and a structural unit derived from an ethylenically unsaturated monomer containing an oxyalkylene group at a side chain (see Patent literature documents 1 to 3); and a graft polymer obtained by graft polymerization of an ethylenically unsaturated monomer to a polyether compound having a structure in which one oxyalkylene chain is bonded to a residue of a compound containing one active hydrogen atom (see Patent literature documents 4 and 5).

CITATION LIST

Patent Literature

Patent Literature 1: JP 2007-529397 T
Patent Literature 2: JP 2007-297241 A
Patent Literature 3: JP 2007-76872 A
Patent Literature 4: JP 4437369 B
Patent Literature 5: JP 2002-293596 A

SUMMARY OF INVENTION

Technical Problem

Polymers with a variety of structures have been proposed as shrinkage reducing agents as described above, but they do not exhibit sufficient performance to reduce shrinkage. Therefore, there is room for developing shrinkage reducing agents with higher performance to reduce shrinkage.

The present invention has been made in view of the state of the art and aims to provide a shrinkage reducing agent that exhibits high performance to reduce the shrinkage of hydraulic materials.

Solution to Problem

The present inventors conducted various investigations on shrinkage reducing agents with a high performance to reduce the shrinkage of cured hydraulic materials and found that a compound that allows a mortar composition containing the compound to satisfy the specific requirements of the flow value and has an average particle diameter within a predetermined range in an alkaline solution is remarkably effective as a shrinkage reducing agent for a hydraulic material. The present inventors have conceived that the problem can be admirably solved thereby, and have reached the present invention.

That is, the present invention relates to a shrinkage reducing agent for a hydraulic material including a compound that satisfies the following conditions (1) to (4):

(1) a ratio represented by {(15-drop flow value of a mortar composition containing the compound)/(15-drop flow value of a mortar free from the compound)}×100 is 120 or less, wherein the (15-drop flow value of a mortar composition containing the compound) means a 15-drop flow value of a mortar composition containing the compound at a solid concentration of 0.1% after 10 minutes mixing and the (15-drop flow value of a mortar free from the compound) means a 15-drop flow value of a mortar free from the compound after 10 minutes mixing;

(2) a ratio represented by {(ratio between 15-drop flow values after two hours mixing)/(ratio between 15-drop flow values after 10 minutes mixing)}×100 is 110 or less, wherein the (ratio between 15-drop flow values after two hours mixing) means a ratio of a 15-drop flow value of a mortar composition containing the compound at a solid concentration of 0.1% after two hours mixing to a 15-drop flow value of a mortar free from the compound after two hours mixing, and the (ratio between 15-drop flow values after 10 minutes mixing) means a ratio of a 15-drop flow value of a mortar composition containing the compound at a solid concentration of 0.1% after 10 minutes mixing to a 15-drop flow value of a mortar free from the compound after 10 minutes mixing;

(3) the compound has an average particle diameter of 2.2 to 8.5 nm in an alkaline solution; and (4) a product of {(ratio between 15-drop flow values relating to a mortar composition containing the compound at a solid concentration of 1.0%)×(ratio between 15-drop flow values relating to a mortar composition containing the compound at a solid concentration of 0.1%)} is 10,100 or more, wherein the (ratio between 15-drop flow values relating to a mortar composition containing the compound at a solid concentration of 1.0%) means a ratio of a 15-drop flow value of a mortar composition containing the compound at a solid concentration of 1.0% after 10 minutes mixing to a 15-drop flow value of a mortar free from the compound after 10 minutes mixing, and the (ratio between 15-drop flow values relating to a mortar composition containing the compound at a solid concentration of 0.1%) means a ratio of a 15-drop flow value of a mortar composition containing the compound at a solid concentration of 0.1% after 10 minutes mixing to a 15-drop flow value of a mortar free from the compound after 10 minutes mixing, the mortar compositions and the mortars are in accordance with JASS 5 M402.

The present invention is described in detail below.

Any combination of two or more of the following preferred embodiments according to the present invention is also a preferred embodiment according to the present invention.

The shrinkage reducing agent for a hydraulic material of the present invention contains a compound that satisfies all the conditions (1) to (4). The condition (4) means that the compound has an dispersing ability that increases the flow value of the mortar composition, and the conditions (1) and (2) mean that the ability of the compound to increase the flow value or enhance the flow retention of the mortar composition are not too high.

In the present invention, it was found that a compound having such a predetermined dispersing ability and an average particle diameter within a predetermined range in an alkaline solution is effective as a shrinkage reducing agent for a hydraulic material. Mortar in accordance with JASS 5 M402 is described in the examples below.

The shrinkage reducing agent for a hydraulic material of the present invention may contain one compound satisfying the conditions (1) to (4) or two or more thereof, and may contain another compound other than the compounds satisfying the conditions (1) to (4).

When the ratio of a 15-drop flow value of a mortar composition containing the compound to a 15-drop flow value of a mortar free from the compound is 120 or less as described in the condition (1), it means the ability of the compound to increase the flow value is not too high. The ratio is preferably 118 or less, more preferably 115 or less, and is preferably 90 or more, more preferably 95 or more, still more preferably 97 or more.

When the ratio of the ratio of a 15-drop flow value of a mortar composition containing the compound at a solid concentration of 0.1% after two hours mixing to a 15-drop flow value of a mortar free from the compound after two hours mixing, i.e. a value of (15-drop flow value of a mortar composition containing the compound after two hours mixing)/(15-drop flow value of a mortar free from the compound after two hours mixing), to the ratio of a 15-drop flow value of a mortar composition containing the compound at a solid concentration of 0.1% after 10 minutes mixing to a 15-drop flow value of a mortar free from the compound after 10 minutes mixing, i.e. a value of (15-drop flow value of a mortar composition containing the compound after 10 minutes mixing)/(15-drop flow value of a mortar free from the compound after 10 minutes mixing)×100 is 110 or less, it means the ability of the compound to improve the flow retention is not too high. The ratio is preferably 109 or less, more preferably 105 or less. The ratio is preferably 85 or more, more preferably 90 or more, still more preferably 95 or more.

When the product of a ratio of a 15-drop flow value of a mortar composition containing the compound at a solid concentration of 1.0% after 10 minutes mixing to a 15-drop flow value of a mortar free from the compound after 10 minutes mixing and a ratio of a 15-drop flow value of a mortar composition containing the compound at a solid concentration of 0.1% after 10 minutes mixing to a 15-drop flow value of a mortar free from the compound after 10 minutes mixing is 10,100 or more as described in the condition (4), the compound has an dispersing ability required when it is used as the shrinkage reducing agent of the present invention. The product is preferably 10,200 or more, more preferably 10,500 or more, still more preferably 10,700 or more. The compound preferably does not have too high dispersing ability. The product is preferably 24,000 or less, more preferably 17,000 or less, still more preferably 14,500 or less.

The flow values in the conditions (1), (2), and (4) can be determined by the method described in the examples.

The compound satisfying the requirements of the flow values in the conditions (1), (2), and (4) may be any compound that satisfies these requirements. Since the flow value is affected by the acid content of the compound, the preparation of a compound with a small acid content is one of effective methods for obtaining a compound satisfying the requirements of the flow values in the conditions (1), (2), and (4). In cases where the compound is a polymer, the flow value provided by the compound can be adjusted by controlling the proportion of an acid group-containing monomer in the monomer component, and thus the compound satisfying the requirements of the flow values in the conditions (1), (2), and (4) can be obtained.

The compound contained in the shrinkage reducing agent for a hydraulic material of the present invention preferably has an acid content of 97 mol % or less. The compound with such an acid content is likely to satisfy the requirements of the flow values in the conditions (1), (2), and (4). The acid content of the compound is more preferably 95 mol % or less, still more preferably 90 mol % or less. The acid content is preferably 25 mol % or more. If the acid content of the compound is too small, the compound does not sufficiently reduce the shrinkage and may not satisfy the condition (4). The acid content is more preferably 30 mol % or more, still more preferably 35 mol %.

In cases where the compound contained in the shrinkage reducing agent for a hydraulic material of the present invention is a polymer, the proportion of an acid group-containing monomer in 100 mol % of the monomer component serving as a material for the polymer preferably falls within the above range.

The compound contained in the shrinkage reducing agent for a hydraulic material of the present invention has an average particle diameter of 2.2 to 8.5 nm in an alkaline solution. In order to allow the compound to function as a shrinkage reducing agent, the compound needs to be sufficiently adsorbed to the hydraulic material and needs to have a predetermined particle diameter. The average particle diameter of the compound is preferably 3 to 8.5 nm, more preferably 3.5 to 8.5 nm, still more preferably 4 to 8.5 nm, particularly preferably 4.5 to 8.5 nm in an alkaline solution.

The alkaline solution herein refers to an aqueous solution of an inorganic compound prepared by the method described in the examples below.

The average particle diameter of the compound in an alkaline solution can be determined by the method described in the examples below.

Since the average particle diameter of the compound is affected by the molecular weight thereof, the compound contained in the shrinkage reducing agent for a hydraulic material of the present invention preferably has a weight average molecular weight of 2,000 to 40,000, more preferably 3,000 to 35,000, still more preferably 4,000 to 35,000.

The weight average molecular weight of the compound can be measured by gel permeation chromatography (GPC) under the conditions described in the examples below.

Since the average particle diameter of the compound is affected by the molecular weight thereof, the compound contained in the shrinkage reducing agent for a hydraulic material of the present invention has an absolute molecular weight of preferably 2,000 to 70,000, more preferably 2,000 to 60,000, still more preferably 3,000 to 50,000.

The absolute molecular weight of the compound can be determined by the light scattering method.

As for the compound satisfying the conditions (1) to (4), a 5% by mass aqueous solution of the compound preferably has a surface tension of 55 to 70 mN/m. By using the compound that provides such a surface tension, the air content of the hydraulic material composition is easily adjusted, and further the compound does not influence the effects of an antifoaming agent and an air-entraining agent (AE agent). As a result, a reduction in the resistance to freezing and thawing, which is a problem caused by conventional shrinkage reducing agents, can be suppressed. The surface tension of a 2% by mass aqueous solution of the compound is preferably 57 to 70 mN/m, still more preferably 60 to 70 mN/m, particularly preferably 60 to 65 mN/m.

The surface tension of the 5% by mass aqueous solution of the compound can be determined by either one of the following procedures.

<Condition (1) for Measurement of Surface Tension>
Measuring equipment: Dynometer (trade name), BYK-Chemie
Ring: Made of platinum with a diameter of 19.5 mm
Standard solution: Pure water 72.8 mN/m (20° C.)
Table speed: 1.5 mm/min
Measurement temperature: 20° C.
<Measurement Procedure>

(1) Ion-exchanged water in an amount of 200 parts by mass at 25° C. is poured in a 300-ml glass beaker containing a stirrer bar 39 mm in length. To the water is added 100 parts by mass of ordinary portland cement (Taiheiyo Cement K.K.) whose temperature is adjusted in advance in an atmosphere at 25° C., while the mixture is stirred using a magnetic stirrer. After this addition, the content is stirred at a rotation speed of 700 rpm for 30 minutes so that the water-soluble component in the cement particles is sufficiently transferred to the water, and the resulting mixture is then left standing for 10 minutes. The resulting supernatant is filtered by suction with a filter paper (quantitative filter paper 5C, Advantec Toyo Kaisha, Ltd.). The filtrate is further filtered with a water filter having a pore diameter of 0.45 µm (Chromatodisk 25A, manufactured by Kurabo Industries Ltd. and sold by G.L. Science) to obtain an aqueous cement supernatant. The cement supernatant thus prepared is put in a container, tightly sealed with nitrogen therein, and stored.

(2) Separately, ion-exchanged water at 25° C. is added to a compound to be measured for the surface tension to prepare an aqueous solution having a solid content of the compound of 15% by mass. The aqueous solution in an amount of 15 parts by mass containing the compound is added to 30 parts by mass of the cement supernatant, and they are sufficiently mixed to prepare a 5% by mass aqueous sample solution. This aqueous sample solution is put in a container, tightly sealed with nitrogen therein, and adjusted to 20° C.

(3) Next, a platinum ring sufficiently cleaned is attached to a dynometer and submerged to a depth of 3 mm in the standard solution (purified water) adjusted in advance at 20° C. The table with this standard solution thereon is lowered at a speed of 1.5 mm/min. At this time, the point at which the reading of the dynometer reaches the maximum is calibrated as the surface tension of water. Next, a platinum ring sufficiently cleaned is submerged to a depth of 3 mm in the sample solution adjusted in advance at 20° C. The table with the aqueous solution thereon is lowered at a speed of 1.5 mm/min. The point at which the reading of the dynometer reaches the maximum is defined as the surface tension of the compound.

<Condition (2) for Measurement of Surface Tension>
Measuring equipment: Dynamic surface tension meter (SITA Science line t60 (Messtechnik))
<Measurement Procedure>

(1) An aqueous sample solution of a shrinkage reducing agent is prepared in accordance with the procedures (1) and (2) in "Condition (1) for measurement of surface tension".

(2) An aqueous solution of the compound to be measured for the surface tension with a solid content of 2% by mass is prepared and adjusted to 20° C. Then, the surface tension is measured using a dynamic surface tension meter (SITA Science line t60 (Messtechnik)). The measurement value at a frequency of 0.5 Hz is defined as the surface tension of the compound.

As for the shrinkage reducing agent for a hydraulic material of the present invention, it is preferred that when 0.7% by mass of the shrinkage reducing agent for a hydraulic material is added to a cement to provide a mortar composition, the mortar composition has a bubble spacing factor of 350 µm or less measured by an air void analyzer. In order to improve the resistance to freezing and thawing of the hydraulic material composition, large size bubbles in the hydraulic material composition are preferably reduced. The bubble spacing factor is an indicator of the sizes of air bubbles in the hydraulic material composition. When the bubble spacing factor thus measured is 350 µm or less, the number of large size bubbles is small. The bubble spacing factor is more preferably 330 µm or less, still more preferably 300 µm or less, particularly preferably 280 µm or less. The bubble spacing factor is usually 120 µm or more.

The measurement of the bubble spacing factor of the mortar composition using an air void analyzer can be performed according to the method described in the examples.

The amount of the compound satisfying the conditions (1) to (4) in the shrinkage reducing agent for a hydraulic material may be any amount capable of achieving the effects of the present invention, and is preferably 60% by weight or more, more preferably 70% by weight or more, still more preferably 80% by weight or more, most preferably 90% by weight or more of the total amount of the shrinkage reducing agent for a hydraulic material.

The compound contained in the shrinkage reducing agent for a hydraulic material of the present invention may be any compound that satisfies the conditions (1) to (4), and is preferably a polymer having in a structure at least one polymer chain selected from the group consisting of polymer chains derived from an ethylenically unsaturated monomer, polyalkylene glycol chains, and polyamine chains. Using the polymer having such a structural feature makes it easy to obtain the polymer that satisfy the conditions (1) to (4). Therefore, polymers with a variety of structures can be designed.

In cases where the compound contained in the shrinkage reducing agent for a hydraulic material of the present invention is the polymer with such a structural feature, the polymer is preferably at least one compound selected from the group consisting of the following compounds (I) to (V):

(I): a polymer including a structural unit represented by the following formula (1):

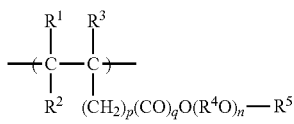  (1)

wherein $R^1$ to $R^3$ are the same as or different from each other and each represent a hydrogen atom or a methyl group, $R^4Os$ are the same as or different from each other and each represent a C2-C18 oxyalkylene group, $R^5$ represents a hydrogen atom or a C1-C30 hydrocarbon group, p represents 0 to 5, q represents 0 or 1, and n represents an average number of moles of oxyalkylene groups added and is 1 to 300; and
a structural unit represented by the following formula (2):

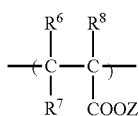  (2)

wherein $R^6$ to $R^8$ are the same as or different from each other and each represent a hydrogen atom, a methyl group, or a $-(CH_2)_mCOOZ'$ group, in which m is an integer of 0 to 2, and Z' represents a hydrogen atom, a metal atom, an ammonium group, an organic amine group, or a hydrocarbon group, and Z represents a hydrogen atom, a metal atom, an ammonium group, an organic amine group, or a hydrocarbon group;

(II): a polymer prepared by graft polymerization of an ethylenically unsaturated monomer to a polyether compound represented by the following formula (3):

$$W-(R^9O)_r-Y \quad (3)$$

wherein $R^9Os$ are the same as or different from each other and each represent a C2-C18 oxyalkylene group, r represents an average number of moles of oxyalkylene groups added and is 1 to 2,000, and W and Y are the same as or different from each other and each represent a hydrogen atom or a methyl group;

(III): a (poly)alkylene glycol block copolymer having a structure in which a polymer chain (A) derived from an ethylenically unsaturated monomer component is bonded to an end of a (poly)alkylene glycol chain (B) via a binding site (X);

(IV): a polyalkylene glycol compound including a linear or branched polyalkylene glycol chain, the chain having at least two ends each of which has an organic residue bonded thereto, the organic residue being capable of adsorbing at least one selected from the group consisting of metals, metal compounds, and metal ions,
the organic residue containing at least one functional group selected from the group consisting of a carbonyl group, a hydroxy group, an amino group, a thiol group, a phosphate group, a phosphorous acid group, and a silane group; and (V): a polyamine compound having an acid group-containing side chain.

The compounds (I) to (V) are described in detail below.

First Preferred Embodiment

In the first preferred embodiment of the compound contained in the shrinkage reducing agent for a hydraulic material of the present invention, the compound contained in the shrinkage reducing agent for a hydraulic material of the present invention is a polymer including a structural unit (I) represented by the following formula (1):

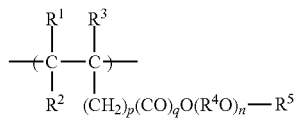  (1)

wherein $R^1$ to $R^3$ are the same as or different from each other and each represent a hydrogen atom or a methyl group, $R^4Os$ are the same as or different from each other and each represent a C2-C18 oxyalkylene group, $R^5$ represents a hydrogen atom or a C1-C30 hydrocarbon group, p represents 0 to 5, q represents 0 or 1, and n represents an average number of moles of oxyalkylene groups added and is 1 to 300; and
a structural unit (II) represented by the following formula (2):

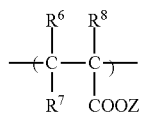  (2)

wherein $R^6$ to $R^8$ are the same as or different from each other and each represent a hydrogen atom, a methyl group, or a $-(CH_2)_mCOOZ'$ group, in which m is an integer of 0 to 2 and Z' represents a hydrogen atom, a metal atom, an ammonium group, an organic amine group, or a hydrocarbon group, and Z represents a hydrogen atom, a metal atom, an ammonium group, an organic amine group, or a hydrocarbon group.

The compound of the first preferred embodiment may contain one or more structural units (I) represented by the formula (1) and one or more structural units (II) represented by the formula (2).

In the formula (1), $R^1$ to $R^3$ are the same as or different from each other and each represent a hydrogen atom or a methyl group, and at least one of $R^1$ and $R^2$ is preferably a hydrogen atom.

The oxyalkylene group represented by $-(R^4O)-$ in the formula (1) is a C2-C18 oxyalkylene group. When two or more oxyalkylene groups are present, they may be bonded in any addition form, and, for example, are bonded through random addition, block addition, or alternate addition.

The oxyalkylene group represented by $-(R^4O)-$ is preferably a C2-C8 oxyalkylene group, more preferably a C2-C4 oxyalkylene group.

The oxyalkylene group is an adduct of an alkylene oxide, and examples of the alkylene oxide include ethylene oxide, propylene oxide, butylene oxide, isobutylene oxide, 1-butene oxide, 2-butene oxide, and styrene oxide. The alkylene oxide is more preferably ethylene oxide, propylene oxide, or butylene oxide, still more preferably ethylene oxide or propylene oxide.

When the oxyalkylene groups represented by $-(R^4O)-$ in the formula (1) includes an oxyethylene group which is an ethylene oxide adduct, the amount of the oxyethylene group in 100 mol % of the entire oxyalkylene groups is preferably 50 to 100 mol %. At such an amount of the oxyethylene group, an increase in air entrainment is suppressed and the air content can be readily adjusted. As a result, a reduction in the strength or the resistance to freezing and thawing can be suppressed. The amount of the oxyethylene group is more preferably 60 to 100 mol %, still more preferably 70 to 100 mol %, particularly preferably 80 to 100 mol %, most preferably 90 to 100 mol %.

In the formula (1), $R^5$ represents a hydrogen atom or a C1-C30 hydrocarbon group. $R^5$ is preferably a C1-C20 hydrocarbon group or a hydrogen atom, more preferably a hydrogen atom or a C1-C18 hydrocarbon group, still more preferably a hydrogen atom or a C1-C12 hydrocarbon group, particularly preferably a hydrogen atom or a C1-C8 hydrocarbon group, most preferably a hydrogen atom or a C1-C3 hydrocarbon group.

Examples of the hydrocarbon group include linear or branched alkyl groups such as methyl, ethyl, propyl, isopropyl, n-butyl, isobutyl, sec-butyl, tert-butyl, pentyl, isopentyl, neopentyl, hexyl, heptyl, octyl, nonyl, decyl, undecyl, dodecyl, isooctyl, 2,3,5-trimethylhexyl, 4-ethyl-5-methyloctyl, 2-ethylhexyl, tetradecyl, octadecyl, and icosyl; cycloalkyl groups such as cyclopropyl, cyclobutyl, cyclopentyl, cyclohexyl, cycloheptyl, and cyclooctyl; and aryl groups such as phenyl, benzyl, phenethyl, o-, m-, or p-tolyl, 2,3- or 2,4-xylyl, mesityl, naphthyl, anthryl, phenanthryl, biphenylyl, benzhydryl, trityl, and pyrenyl. Linear, branched, or cyclic alkyl groups are preferred.

In the formula (1), p represents 0 to 5, and q represents 0 or 1. A preferred combination of p and q is a combination in which p is 1 or 2 and q is 0, or p is 0 and q is 1.

In the formula (1), n represents an average number of moles of oxyalkylene groups added and is 1 to 300. If the average number of moles added is more than 300, the air entrainment increases and the air content is difficult to adjust, which may lead to a reduction in the strength or the resistance to freezing and thawing. The average number of moles of oxyalkylene groups added is preferably 1 to 150, more preferably 1 to 100, still more preferably 1 to 80, particularly preferably 1 to 50, most preferably 1 to 30.

The monomer that forms the structural unit (I) represented by the formula (1) can be obtained by addition of alkylene oxide that forms a predetermined number of alkylene oxide repeating units to an unsaturated alcohol and/or an unsaturated carboxylic acid. Alternatively, the monomer can also be obtained by esterification of an unsaturated carboxylic acid and an alcohol obtained by addition of alkylene oxide that forms a predetermined number of alkylene oxide repeating units to an alcohol or phenol containing a C1-C30 hydrocarbon group and/or by transesterification of an unsaturated carboxylic acid ester and an alcohol obtained by addition of alkylene oxide that forms a predetermined number of alkylene oxide repeating units to an alcohol or phenol containing a C1-C30 hydrocarbon group.

Preferred examples of the unsaturated alcohol include vinyl alcohol, allyl alcohol, methallyl alcohol, 3-buten-1-ol, 3-methyl-3-buten-1-ol, 3-methyl-2-buten-1-ol, 2-methyl-3-buten-2-ol, 2-methyl-2-buten-1-ol, and 2-methyl-3-buten-1-ol.

Preferred examples of the unsaturated carboxylic acid include acrylic acid and methacrylic acid. Examples of the unsaturated carboxylic acid ester include alkyl esters of these unsaturated carboxylic acids.

Examples of the alcohol or phenol containing a C1-C30 hydrocarbon group include alkyl alcohols such as methanol, ethanol, and butanol; aryl group-containing alcohols such as benzyl alcohol; and phenols such as phenol and para-methylphenol. C1-C3 alcohols such as methanol, ethanol, and butanol are preferred.

The alkylene oxide may be any of those mentioned above.

In the formula (2), $R^6$ to $R^8$ are the same as or different from each other and each represent a hydrogen atom, a methyl group, or a —$(CH_2)_m$COOZ' group.

Z' in —$(CH_2)_m$COOZ' represents a hydrogen atom, a metal atom, an ammonium group, an organic amine group, or a hydrocarbon group. Examples of a monovalent metal include lithium, sodium, and potassium. Examples of a divalent metal include magnesium, calcium, strontium, and barium. Z' is a divalent metal when any two or more of $R^6$ to $R^8$ represent —$(CH_2)_m$COOZ' groups, and two —COO— groups therein form an anhydride; or when at least one of $R^6$ to $R^8$ represents a —$(CH_2)_m$COOZ' group, and the —$(CH_2)_m$COOZ' group and COOZ form an anhydride.

When Z' is an organic amine group, examples of the organic amine group include a group derived from a primary amine such as methylamine, ethylamine, propylamine, n-butylamine, sec-butylamine, tert-butylamine, cyclohexylamine, benzylamine, or phenylamine; a group derived from a secondary amine such as dimethylamine, diethylamine, dipropylamine, dibutylamine, diisobutylamine, di-sec-butylamine, di-tert-butylamine, dicyclohexylamine, dibenzylamine, or diphenylamine; a group derived from a tertiary amine such as trimethylamine, triethylamine, tripropylamine, tributylamine, tricyclohexylamine, tribenzylamine, or triphenylamine; and a group derived from an alkanol amine such as ethanolamine, diethanolamine, or triethanolamine. An alkanol amine group such as an ethanolamine group, a diethanolamine group, or a triethanolamine group; or a triethylamine group is mentioned.

When Z' is a hydrocarbon group, the hydrocarbon group is preferably a C1-C30 hydrocarbon group, more preferably a C1-C20 hydrocarbon group, still more preferably a C1-C12 hydrocarbon group. Examples of the C1-C30 hydrocarbon group include linear or branched alkyl groups such as methyl, ethyl, propyl, isopropyl, n-butyl, isobutyl, sec-butyl, tert-butyl, pentyl, isopentyl, neopentyl, hexyl, heptyl, octyl, nonyl, decyl, undecyl, dodecyl, isooctyl, 2,3,5-trimethylhexyl, 4-ethyl-5-methyloctyl, 2-ethylhexyl, tetradecyl, octadecyl, and icosyl; cycloalkyl groups such as cyclopropyl, cyclobutyl, cyclopentyl, cyclohexyl, cycloheptyl, and cyclooctyl; or aryl groups such as phenyl, benzyl, phenethyl, o-, m-, or p-tolyl, 2,3- or 2,4-xylyl, mesityl, naphthyl, antholyl, phenanthryl, biphenylyl, benzhydryl, trithyl, and pyrenyl.

Among these, Z' is preferably a hydrogen atom, a monovalent metal, a divalent metal, an ammonium group, or an organic amine group, particularly preferably a hydrogen atom, sodium, or calcium.

In the formula (2), m is an integer of 0 to 2, preferably an integer of 0 or 1, particularly preferably an integer of 0.

When Z in the formula (2) is a hydrocarbon group, Z is preferably a C1-C30 hydrocarbon group. If Z is a hydrocarbon group containing 31 or more carbon atoms, the hydrophilicity and the hydrophobicity of the polymer are less likely to be balanced, the air entrainment increases and the air content is difficult to adjust, which may lead to a reduction in the strength or the resistance to freezing and thawing. The number of carbon atoms of Z is preferably 1 to 18, more preferably 1 to 12, still more preferably 1 to 8, most preferably 1 to 3.

Examples of the C1-C30 hydrocarbon group include linear or branched alkyl groups such as methyl, ethyl, propyl, isopropyl, butyl, isobutyl, sec-butyl, tert-butyl, pentyl, isopentyl, neopentyl, hexyl, heptyl, octyl, nonyl, decyl, undecyl, dodecyl, isooctyl, 2,3,5-trimethylhexyl, 4-ethyl-5-methyloctyl, 2-ethylhexyl, tetradecyl, octadecyl, and icosyl; cycloalkyl groups such as cyclopentyl, cyclohexyl, cycloheptyl, and cyclooctyl; and aryl groups such as phenyl, benzyl, phenethyl, o-, m-, or p-tolyl, 2,3- or 2,4-xylyl, mesityl, naphthyl, anthryl, phenanthryl, biphenylyl, benzhydryl, trityl, and pyrenyl.

C1-C3 alkyl groups such as methyl, ethyl, propyl, and isopropyl are preferred in view of the dispersibility in a cured cement and the reduction in the drying shrinkage of a cured cement.

$R^6$ to $R^8$ in the formula (2) are the same as or different from each other and each represent a hydrogen atom, a methyl group, or a $—(CH_2)_m COOZ'$ group. When at least one of $R^6$ to $R^8$ is a $—(CH_2)_m COOZ'$ group, it is preferred that $R^7$ represents a $—(CH_2)_m COOZ'$ group, and $R^6$ and $R^8$ each represent a hydrogen atom or a methyl group. An embodiment in which each of $R^6$ to $R^8$ represents a hydrogen atom or a methyl group is also a preferred embodiment.

The monomer that forms the structural unit (II) represented by the formula (2) may be, for example, an unsaturated carboxylic acid monomer. Preferred examples of the unsaturated carboxylic acid monomer include an unsaturated monocarboxylic acid monomer and an unsaturated dicarboxylic acid monomer. The unsaturated monocarboxylic acid monomer has only to contain one unsaturated group and one group capable of forming a carbanion in a molecule, and examples thereof include (meth)acrylic acid, crotonic acid, tiglic acid, 3-methylcrotonic acid, 2-methyl-2-pentenoic acid, and itaconic acid; and monovalent metal salts, divalent metal salts, ammonium salts, and organic amine salts thereof. The unsaturated dicarboxylic acid monomer has only to contain one unsaturated group and two groups capable of forming a carbanion in a molecule, and examples thereof include maleic acid, itaconic acid, mesaconic acid, citraconic acid, and fumaric acid; monovalent metal salts, divalent metal salts, ammonium salts, and organic amine salts of these acids; and anhydrides and halfesters of these acids.

The compound of the first embodiment may have a structural unit (III) other than the structural unit (I) represented by the formula (1) and the structural unit (II) represented by the formula (2).

Examples of the monomer that forms the structural unit (III) include bifunctional (meth)acrylates such as hexanediol di(meth)acrylate; hydroxy group- or alkoxy group-containing (meth)acrylate compounds such as hydroxyethyl (meth)acrylate, hydroxypropyl (meth)acrylate, methoxyethyl (meth)acrylate, ethoxyethyl (meth)acrylate, butoxyethyl (meth)acrylate, and methoxypropyl (meth)acrylate; unsaturated amides such as amides of the above unsaturated monocarboxylic acid monomer and a C1-C30 amine, (meth)acrylamide, methyl (meth)acrylamide, (meth)acrylalkylamide, N-methylol (meth)acrylamide, and N,N-dimethyl (meth)acrylamide; diesters of the above unsaturated dicarboxylic acid and a C2-C18 glycol and diesters of the above unsaturated dicarboxylic acid and a (poly)alkylene glycol in which the number of moles of the glycol added is 2 to 500; halfamides of maleamidic acid and a C2-C18 glycol, and halfamides of maleamidic acid a (poly)alkylene glycol in which the number of moles of the glycol added is 2 to 500; polyfunctional (meth)acrylates such as hexanediol di(meth)acrylate, trimethylolpropane tri(meth)acrylate, and trimethylolpropane di(meth)acrylate; unsaturated sulfonic acids such as vinyl sulfonate, (meth)allyl sulfonate, 2-(meth)acryloxy ethyl sulfonate, 3-(meth)acryloxy propyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyloxysulfobenzoate, 4-(meth)acryloxybutyl sulfonate, (meth)acrylamide methylsulfonic acid, (meth)acrylamide ethylsulfonic acid, 2-methylpropane sulfonic acid (meth)acrylamide, and styrene sulfonic acid, and monovalent metal salts, divalent metal salts, ammonium salts, and organic amine salts thereof; and vinyl aromatic compounds such as styrene, α-methylstyrene, bromostyrene, chlorostyrene, vinyltoluene, and p-methylstyrene; α-olefins such as hexene, heptane, and decene; alkyl vinyl ethers such as methylvinylether, ethylvinylether, and butylvinylether; allyl esters such as allyl acetate; allyls such as allyl alcohols; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, isobutylene, 2-methyl-1,3-butadiene, and 2-chlor-1,3-butadiene; unsaturated cyans such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinyl pyridine; divinyl aromatic compounds such as divinyl benzene; cyanurates such as triallyl cyanurate; and siloxane derivatives such as polydimethylsiloxane propyl amino maleic amide acid, polydimethylsiloxane amino propylene amino maleic amide acid, polydimethylsiloxane-bis-(propyl amino maleic amide acid), polydimethylsiloxane-bis-(dipropylene amino maleic amide acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate).

In the compound of the first preferred embodiment, the mass ratio of the structural unit (I) represented by the formula (1), the structural unit (II) represented by the formula (2), and the structural unit (III), i.e. the mass ratio of structural unit (I)/structural unit (II)/structural unit (III), is preferably (99.5 to 50)/(0.5 to 50)/(0 to 49.5), more preferably (98 to 65)/(2 to 35)/(0 to 33), still more preferably (98 to 75)/(2 to 25)/(0 to 23), particularly preferably (98 to 85)/(2 to 15)/(0 to 13), most preferably (97 to 90)/(3 to 10)/(0 to 7).

In the compound of the first preferred embodiment, the molar ratio of the structural unit (I) represented by the formula (1), the structural unit (II) represented by the formula (2), and the structural unit (III), i.e. the molar ratio of structural unit (I)/structural unit (II)/structural unit (III), is preferably (75 to 3)/(25 to 97)/(0 to 70), more preferably (75 to 10)/(25 to 90)/(0 to 65), still more preferably (70 to 30)/(30 to 70)/(0 to 40), particularly preferably (70 to 40)/(30 to 60)/(0 to 30), most preferably (65 to 50)/(35 to 50)/(0 to 15).

The compound (polymer) of the first preferred embodiment may be produced by any method and is preferably produced by polymerization of a monomer component serving as a material for the polymer using a polymerization initiator.

The monomer component may be polymerized by any common polymerization method and is preferably polymerized in a solvent or by bulk polymerization, for example.

The polymerization in a solvent may be carried out batchwise or continuously. Examples of the solvent which can be used in this case include water; lower alcohols such as methyl alcohol, ethyl alcohol, and 2-propanol; aromatic or aliphatic hydrocarbons such as benzene, toluene, xylene, cyclohexane, and n-hexane; ester compounds such as ethyl acetate; and ketone compounds such as acetone and methyl ethyl ketone. In view of the solubility of the material monomer and the polymer made from the monomer and the convenience of the use of the polymer, water and/or a C1-C4 lower alcohol are/is preferably used, and particularly, water and/or an alcohol such as methyl alcohol, ethyl alcohol, or 2-propanol are/is preferably used.

Other polymerization methods are disclosed in JP 2007-529397 T.

The thus-obtained polymer may be used as it is as a drying shrinkage reducing agent or alternatively may be handled in the form of an aqueous solution containing no organic solvent. In such a case, the polymer may be neutralized with an alkaline substance to form a polymer salt, and the polymer salt may be used as a drying shrinkage reducing agent. Examples of the alkaline substance include inorganic substances such as hydroxides, chlorides, and carbonates of a monovalent metal and a divalent metal; ammonia; and organic amines (preferably a hydroxide of a monovalent metal such as sodium hydroxide or potassium hydroxide).

The thus-obtained polymer may include a water-soluble alkylene-oxide-modified polymer, which is disclosed in WO 2007/086507, that has a structure in which an alkylene oxide is added to a polymer backbone that is formed by grafting and/or crosslinking a compound containing an amino group and an imino group and/or a compound containing an amino group, an imino group, and an amide group.

Second Preferred Embodiment

In the second preferred embodiment of the compound contained in the shrinkage reducing agent for a hydraulic material of the present invention, the compound contained in the shrinkage reducing agent for a hydraulic material of the present invention is a polymer prepared by graft polymerization of an ethylenically unsaturated monomer to a polyether compound represented by the following formula (3):

$$W-(R^9O)_r-Y \quad (3)$$

wherein $R^9$Os are the same as or different from each other and each represent a C2-C18 oxyalkylene group, r represents an average number of moles of oxyalkylene groups added and is 1 to 2000; and W and Y are the same as or different from each other and each represent a hydrogen atom or a methyl group.

The graft polymer is prepared by graft polymerization of an ethylenically unsaturated monomer to a polyether compound. The graft polymer is constituted by a polyether chain derived from a polyether compound and a graft chain formed by a polymerization of an ethylenically unsaturated monomer to a graft site of the polyether compound. In the present invention, the polyether chain and the graft chain has an effect of sufficiently suppressing the drying shrinkage of a cured product (hereinafter, also referred to as shrinkage reducing performance). In the preparation of the hydrophilic graft polymer, one ethylenically unsaturated monomer may be used alone or two or more ethylenically unsaturated monomers may be used in combination, and one polyether compound may be used alone or two or more polyether compounds may be used in combination.

The ethylenically unsaturated monomer includes an unsaturated carboxylic acid monomer. The unsaturated carboxylic acid monomer means a monomer containing at least one polymerizable unsaturated bond and at least one carboxyl group in a molecule, including an α,β-unsaturated dicarboxylic acid and/or an anhydride thereof. This can prevent a rapid thickening due to a runway reaction of the graft polymerization. The amount of the unsaturated carboxylic acid monomer in the ethylenically unsaturated monomer may be any amount that provides the effects of the present invention, and is preferably 50% by mass or more, more preferably 70% by mass or more, still more preferably 80% by mass or more, particularly preferably 90% by mass or more, of the total amount of the ethylenically unsaturated monomer. Most preferably, the amount thereof is 100% by mass, that is, the ethylenically unsaturated monomer consists of the unsaturated carboxylic acid monomer.

The α,β-unsaturated dicarboxylic acid and/or an anhydride thereof may be the same as the above examples of the unsaturated dicarboxylic acid monomer in the first preferred embodiment.

In order to prevent thickening of the polymer by graft polymerization of the α,β-unsaturated dicarboxylic acid and/or an anhydride thereof to the polyether compound at an appropriate rate, the amount of the α,β-unsaturated dicarboxylic acid and/or an anhydride thereof in the unsaturated carboxylic acid monomer is preferably 0.1% to 99.9% by weight, more preferably 1% to 99% by weight, still more preferably 10% to 90% by weight, most preferably 20% to 80% by weight.

The unsaturated carboxylic acid monomer preferably includes an unsaturated carboxylic acid monomer different from the α,β-unsaturated dicarboxylic acid. The different unsaturated carboxylic acid monomer may be the same as the above examples of the unsaturated monocarboxylic acid monomer in the first preferred embodiment.

One preferred embodiment of the unsaturated carboxylic acid monomer in the present invention is an unsaturated carboxylic acid monomer containing (meth)acrylic acid and at least one selected from the group consisting of maleic acid, fumaric acid, and maleic anhydride as essential components. In such an embodiment, the weight ratio between (meth)acrylic acid and at least one compound selected from the group consisting of maleic acid, fumaric acid, and maleic anhydride is preferably, for example, 1/99 to 99/1, more preferably 10/90 to 90/10, still more preferably 20/80 to 80/20, most preferably 30/70 to 70/30.

Examples of a different ethylenically unsaturated monomer other than the unsaturated carboxylic acid monomer include, but are not limited to, ethylenically unsaturated carboxylic acid esters and ethylenically unsaturated monomers other than these. Examples of the ethylenically unsaturated carboxylic acid esters include alkyl esters of maleic acid, such as monomethyl maleate, dimethyl maleate, monoethyl maleate, and diethyl maleate; alkyl esters of fumaric acid, such as monomethyl fumarate, dimethyl fumarate, monoethyl fumarate, and diethyl fumarate; alkyl (meth)acrylates such as methyl (meth)acrylate, ethyl (meth)acrylate, butyl (meth)acrylate, and stearyl (meth)acrylate; unsaturated carboxylic acid esters having a hydroxy group, such as hydroxyalkyl (meth)acrylates (e.g. hydroxyethyl (meth)acrylate, hydroxypropyl (meth)acrylate); and polyalkylene glycol (meth)acrylates such as (methoxy) polyethylene glycol (meth)acrylate, phenoxy polyethylene glycol (meth)acrylate, naphthoxy polyethylene glycol (meth)acrylate, monophenoxy polyethylene glycol maleate, and carbazole polyethylene glycol (meth)acrylate.

Examples of the ethylenically unsaturated monomers other than the ethylenically unsaturated carboxylic acid esters include aromatic vinyl monomers such as styrene; amide group-containing vinyl monomers such as (meth)acrylamide and (meth)acrylalkylamide; vinyl esters such as vinyl acetate, vinyl propionate, vinyl pivalate, vinyl benzoate, and vinyl cinnamate; alkenes such as ethylene and propylene; dienes such as butadiene and isoprene; trialkyloxysilyl group-containing vinyl monomers such as vinyltrimethoxysilane and vinyltriethoxysilane; silicon-containing vinyl monomers such as γ-(methacryloyloxypropyl)trimethoxysilane; maleimide; maleimide derivatives such as methylmaleimide, ethylmaleimide, propylmaleimide, butylmaleimide, octylmaleimide, dodecylmaleimide, stearylmaleimide, phenymaleimide, and cyclohexylmaleimide;

nitrile group-containing vinyl monomers such as (meth)acrylonitrile; aldehyde group-containing vinyl monomers such as (meth)acrolein; amino group-containing vinyl monomers such as dialkylaminoethyl (meth)acrylates (e.g. dimethylaminoethyl (meth)acrylate); unsaturated ethers such as (methoxy)polyethylene glycol (meth)allyl ether and (methoxy)polyethylene glycol isopropenyl ether; sulfonic acid group-containing vinyl monomers such as 2-acrylamido-2-methylpropane sulfonic acid, (meth)allylsulfonic acid, 2-sulfoethyl (meth)acrylate, vinyl sulfonic acid, hydroxy allyloxy propane sulfonic acid, and styrene sulfonic acid; and vinyl monomers containing another functional group, such as vinyl chloride, vinylidene chloride, allyl chloride, allyl alcohol, vinyl pyrrolidone, and ethyl vinyl ether.

The amount of the ethylenically unsaturated monomer other than the unsaturated carboxylic acid monomer is preferably 0.1% to 20% by mass, more preferably 0.1% to 10% by mass, still more preferably 0.1% to 5% by mass of the entire ethylenically unsaturated monomer.

The amount of the ethylenically unsaturated monomer may be any amount. The graft polymer of the second preferred embodiment is preferably prepared by graft polymerization of the ethylenically unsaturated monomer to the polyether compound so that the amount of the unsaturated carboxylic acid monomer in the ethylenically unsaturated monomer is 0.1% to 50% by weight relative to the polyether compound. If the amount of the unsaturated carboxylic acid monomer is less than 0.1% by weight, the hydrophilic graft polymer is less likely to act on hydraulic materials, which may lead to insufficient shrinkage reducing performance. If the amount is more than 50% by weight, the hydrophilic graft polymer may possibly greatly induce retardation of the hardening of a hydraulic material, or the reaction mixture in the preparation of the hydrophilic graft polymer may possibly be highly viscous and thus may be difficult to handle. The amount is more preferably 0.5% to 30% by weight, still more preferably 1% to 20% by weight, particularly preferably 2% to 10% by weight.

The monomer component serving as a material for the compound in the graft polymer of the second preferred embodiment includes a polyether compound, an unsaturated carboxylic acid monomer, and an ethylenically unsaturated monomer other than the unsaturated carboxylic acid monomer which serve as materials of the graft polymer. The molar ratio of the polyether compound, the unsaturated carboxylic acid monomer, and the ethylenically unsaturated monomer other than the unsaturated carboxylic acid monomer is preferably (75 to 3)/(25 to 97)/(0 to 72), more preferably (75 to 5)/(25 to 95)/(0 to 70), still more preferably (65 to 5)/(35 to 95)/(0 to 60), particularly preferably (50 to 5)/(50 to 95)/(0 to 45), most preferably (50 to 8)/(60 to 92)/(0 to 32).

The polyether compound in the graft polymer of the second preferred embodiment is used as a material to prepare a graft polymer, and forms a polyether chain of the graft polymer. The balance between the hydrophilicity and the hydrophobicity of the polyether compound directly, greatly influences the balance between the hydrophilicity and the hydrophobicity of the hydrophilic graft polymer. If the hydrophilicity of the graft polymer is too high, cement may be highly dispersed, possibly leading to material separation, and in addition, the alkali resistance of the cured product may be possibly reduced. If the hydrophobicity of the graft polymer is too high, the air content of the hydraulic material may become too low, possibly leading to a reduction in the fluidity of the hydraulic material, for example. Therefore, in the graft polymer of the second preferred embodiment, it is important to appropriately balance the hydrophilicity and the hydrophobicity of the polyether compound. The balance between the hydrophilicity and the hydrophobicity is indicated by, for example, HLB. HLB can be calculated by the Griffin's equation, which is disclosed in, for example, Kitahara et al. (eds.) "Surfactants-properties, applications, chemical ecology-(Kaimenkasseizai-Bussei, ouyou, kagakuseitaigaku-)" (8th edition, Aug. 10, 1991, Kodansha). The HLB of the polyether compound is, for example, preferably 8 to 20, more preferably 10 to 20, still more preferably 13 to 19.

The polyether compound in the graft polymer of the second preferred embodiment is represented by the formula (3). One compound represented by the formula (3) may be used alone or two or more compounds represented by the formula (3) may be used in combination.

In the formula (3), the average number of moles added means an average of the number of moles of repeating units per mole of the compound represented by the formula (3). The C2-C18 oxyalkylene group in the formula (1) imparts appropriate hydrophobicity to the graft polymer.

In order to increase the grafting rate, the ability to disperse cement and the hydrophilicity of the graft polymer, r in the formula (3) is preferably 25 or more, more preferably 40 or more, still more preferably 50 or more. Also, r is preferably 1000 or less, more preferably 500 or less.

The group(s) represented by —($R^9O$)— in the formula (3) may include one C2-C18 oxyalkylene group or may include two or more different C2-C18 oxyalkylene groups. When two or more different C2-C18 oxyalkylene groups are present, such different C2-C18 oxyalkylene groups may be repeated in any form such as a random form, block form, or alternate form.

In the group(s) represented by —($R^9O$)— in the formula (3), the average number of moles of oxyethylene groups added accounts for preferably 50% or more, more preferably 60% or more, still more preferably 70% or more, particularly preferably 80% or more, most preferably 90% or more of the average number of moles of the C2-C18 oxyalkylene groups added.

The compound represented by the formula (3) may be suitably prepared by, for example, polymerization of a C2-C18 alkylene oxide to water or methyl alcohol which is a compound having an active hydrogen atom by a common method. One alkylene oxide may be used alone or two or more different alkylene oxides may be used in combination, and one compound having an active hydrogen atom may be used or two or more compounds having an active hydrogen atom may be used in combination.

The C2-C18 alkylene oxide(s) preferably include(s) ethylene oxide and optionally include(s) another copolymerizable alkylene oxide such as propylene oxide. Further, another alkylene oxide such as styrene oxide may optionally be included in addition to the C2-C18 alkylene oxides.

The compound represented by the formula (3) may be prepared by any polymerization method and is, for example, preferably prepared by a known polymerization method in view of versatility. In such a polymerization method, an acid catalyst or an alkali catalyst is preferably used. Examples of the acid catalyst include halogen compounds of a metal or a metalloid such as borontrifluoride, which serves as a Lewis acid catalyst; mineral acids such as hydrogen chloride, hydrogen bromide, and sulfuric acid. Examples of the alkali catalyst include potassium hydroxide, sodium hydroxide, and sodium hydride. Each of these may be used alone or two or more of these may be used in combination.

The graft polymer of the second preferred embodiment may include, as a polyether compound, a derivative of the compound represented by the formula (3) in combination with the compound represented by the formula (3), or may include a derivative of the compound represented by the formula (3) instead of the compound represented by the formula (3). Examples of the derivative of the compound represented by the formula (3) include an end-transformed compound obtained by transformation of a functional group at an end of the compound represented by the formula (3), and a cured article obtained by reaction of the compound represented by the formula (3) with a cross-linking agent containing, in one molecule, multiple groups selected from a carboxyl group, an isocyanate group, an amino group, a halogen group, and others.

Examples of the end-transformed compound include (i) compounds obtained by esterifying all or part of terminal hydroxy group(s) of the compound represented by the formula (3) with a dicarboxylic acid and/or an anhydride thereof such as a C2-C22 fatty acid, succinic acid, succinic anhydride, maleic acid, maleic anhydride, or adipic acid; (ii) alkoxy polyoxyalkylenes obtained by alkoxylating all or part of hydroxy group(s) at the end(s) of the compound represented by the formula (3) by a dehalogenation-hydrogenation reaction using a halogenated alkyl; and (iii) polyoxyalkylene sulfuric acid (salt) obtained by sulfating all or part of hydroxy group(s) at the end(s) of the compound represented by the formula (3) with a known sulfating agent such as chlorosulfonic acid, sulfuric anhydride, or sulfamic acid.

The weight average molecular weight (Mw) of the compound represented by the formula (3) is not limited and is preferably, for example, 1,000 to 1,000,000, more preferably 2,000 to 50,000, still more preferably 2,000 to 40,000, particularly preferably 3,000 to 35,000. The dispersion degree is not limited and is preferably, for example, 1 to 100, more preferably 1.1 to 10, still more preferably 1.1 to 3. Herein, the dispersion degree means a value (Mw/Mn) obtained by dividing the weight average molecular weight (Mw) by the number average molecular weight (Mn).

The weight average molecular weight of the compound represented by the formula (3) can be determined by GPC under the conditions described in the examples below.

The graft polymerization for preparing the graft polymer of the second preferred embodiment is performed by addition polymerization of an ethylenically unsaturated monomer starting from a graft site that is generated when a hydrogen atom or a halogen atom is abstracted from a polyether compound.

In the graft polymerization, some polyether compounds have many graft sites, and some other polyether compounds have no graft sites at all, in one molecule. When a plurality of atoms are abstracted from one carbon atom, a polyether chain breaks at this site. The polymerization of the ethylenically unsaturated monomer is terminated by a chain-transfer reaction, a disproportionation termination reaction, or a recombination termination reaction, and the ethylenically unsaturated monomer may be coupled with the polyether compound to form a dimer or trimer of the polyether compound. Thus, the resulting hydrophilic graft polymer is considered to have a wide molecular weight distribution and a high dispersion degree (Mw/Mn).

The graft polymerization may be performed by any method capable of graft polymerizing the ethylenically unsaturated monomer to the polyether compound. For example, since the shrinkage reducing performance of the hydrophilic graft polymer is enhanced by increasing the grafting rate, the graft polymerization is preferably performed in the presence of a polymerization initiator. Examples of the polymerization initiator include, but are not limited to, known radical initiators. In view of reactivity and other properties, organic peroxides are particularly preferred.

The specific examples of the organic peroxides and other methods of graft polymerization are disclosed in JP 2002-293596 A.

The graft polymer obtained by graft polymerization may be used as it is or may be dissolved in a solvent and used. Examples of the solvent include water and alcohol, and water is preferably used. The acid groups such as a carboxyl group and a sulfonic acid group, and an ester group thereof in the hydrophilic graft polymer may be entirely or partly transformed with a basic group-containing compound. Thus, the hydrophilic graft polymer may be used as a salt.

Examples of the basic group-containing compound include hydroxides of an alkali metal and hydroxides of an alkaline-earth metal, such as sodium hydroxide, potassium hydroxide, calcium hydroxide, and lithium hydroxide; carbonates of an alkali metal and carbonates of an alkaline-earth metal, such as sodium carbonate, calcium carbonate, and lithium carbonate; ammonia; and amines such as monoethanolamine, diethanolamine, and triethanolamine. Each of these may be used alone or two or more of these may be used in combination.

Third Preferred Embodiment

In the third preferred embodiment of the compound contained in the shrinkage reducing agent for a hydraulic material of the present invention, the compound contained in the shrinkage reducing agent for a hydraulic material of the present invention is a (poly)alkylene glycol block copolymer having a structure in which a polymer chain (A) derived from an ethylenically unsaturated monomer component and an end of a (poly)alkylene glycol chain (B) are bonded via a binding site (X).

The (poly)alkylene glycol block copolymer of the third preferred embodiment is characterized in that it has a structure in which a polymer chain (A) derived from a vinyl monomer component containing an unsaturated anionic monomer and an end of a polymer chain (B) consisting of a (poly)alkylene glycol constitutional unit are bonded via a binding site (X). Such a (poly)alkylene glycol block copolymer can exhibit high shrinkage reducing effects.

The overall structure of the (poly)alkylene glycol block copolymer of the third preferred embodiment is not limited as long as it has such a structural feature. The (poly)alkylene glycol block copolymer is preferably a copolymer having any one of the following structures (1) to (4):

(1) a copolymer having a structure in which only one end of the linear polymer chain (B) is bonded to an end of the polymer chain (A) derived from a vinyl monomer component containing an unsaturated anionic monomer via the binding site (X);

(2) a copolymer having a structure in which each end of the linear polymer chain (B) is bonded to an end of the polymer chain (A) derived from a vinyl monomer component containing an unsaturated anionic monomer via the binding site (X);

(3) a multibranched (poly)alkylene glycol block copolymer essentially including a bond of the polymer chain (A) derived from a vinyl monomer component containing an unsaturated anionic monomer and the polymer chain (B) consisting of a (poly)alkylene glycol constitutional unit via the binding site (X), the multibranched (poly)alkylene glycol block copolymer having three or more branches in a multibranched structure, each branch being entirely or partly constituted by the polymer chain (B), part of the branches having the polymer chain (A) at its end.

(4) a multibranched (poly)alkylene glycol block copolymer essentially including a bond of the polymer chain (A) derived from a vinyl monomer component containing an unsaturated anionic monomer and the polymer chain (B) consisting of a (poly)alkylene glycol constitutional unit via the binding site (X), the multibranched (poly)alkylene glycol block copolymer having three or more branches in a multibranched structure, each branch being partly constitute by the polymer chain (B), and each branch having the polymer chain (A) at its end.

Hereinafter, the copolymers having the structures (1) to (4) are referred to as the (poly)alkylene glycol block copolymers (1) to (4), respectively. First, these copolymers are specifically described, and next, the specific structures of the polymer chain (A), the polymer chain (B), the binding site (X) and a residue (Z) of a compound having an active hydrogen atom which forms a branch site of the branched structure are described.

[(Poly)Alkylene Glycol Block Copolymer (1)]

The (poly)alkylene glycol block copolymer (1) has a structure in which only one end of the linear polymer chain (B) consisting of a (poly)alkylene glycol constitutional unit is bonded to an end of the polymer chain (A) derived from a vinyl monomer component containing an unsaturated anionic monomer via the binding site (X). The end of the polymer chain (A) bonded to the polymer chain (B) via the binding site (X) may be an end of the main chain of the polymer chain (A) or may be, when a side chain is bonded to a terminal atom of the main chain of the polymer chain (A), an end of this side chain. The end is preferably an end of the main chain of the polymer chain (A). This feature is also applied to the below-described copolymers (2) to (4).

The (poly)alkylene glycol block copolymer (1) preferably has a structure represented by the following formula (4):

$$R^{10}-(B)_{n1}-X-A \tag{4}$$

wherein $R^{10}$ represents a hydrogen atom, a C1-C10 alkyl group, a C1-C10 alkenyl group, or a C6-C20 aryl group, $(B)_{n1}$ represents a polymer chain including a (poly)alkylene glycol constitutional unit, Bs are the same as or different from each other and each represent a C2-C18 oxyalkylene group, X represents an organic residue, A represents a polymer chain derived from a vinyl monomer component containing an unsaturated anionic monomer, and n1 represents an average number of moles of oxyalkylene groups added and is 1 to 1,000.

In the formula (4), X located adjacent to one end of the polymer chain $(B)_{n1}$ consisted of a (poly)alkylene glycol constitutional unit represents the binding site (X), and the polymer chain A derived from a vinyl monomer component containing an unsaturated anionic monomer is bonded to the polymer chain $(B)_{n1}$ consisted of a (poly)alkylene glycol constitutional unit via X. To the other end of the polymer chain $(B)_{n1}$ consisted of a (poly)alkylene glycol constitutional unit, hydrogen atom, a C1-C10 alkyl group, a C1-C10 alkenyl group, or a C6-C20 aryl group is bonded.

[(Poly)Alkylene Glycol Block Copolymer (2)]

The (poly)alkylene glycol block copolymer (2) has a structure in which each end of the linear polymer chain (B) consisting of a (poly)alkylene glycol constitutional unit is bonded to an end of the polymer chain (A) derived from a vinyl monomer component containing an unsaturated anionic monomer via the binding site (X).

The (poly)alkylene glycol block copolymer (2) preferably has a structure represented by the following formula (5):

$$A-X-(B)_{n2}-X-A \tag{5}$$

wherein $(B)_{n2}$ represents a polymer chain including a (poly)alkylene glycol constitutional unit, Bs are the same as or different from each other and each represent a C2-C18 oxyalkylene group, Xs are the same as or different from each other and each represent an organic residue, As are the same as or different from each other and each represent a polymer chain derived from a vinyl monomer component containing an unsaturated anionic monomer, and n2 represents an average number of moles of oxyalkylene groups added and is 1 to 1,000.

The copolymer (2) and the copolymer (1) are the same in that the polymer chain (B) represented by $(B)_{n2}$ and the polymer chain (A) represented by A are bonded via the binding site (X) represented by X in the formula (5).

[(Poly)Alkylene Glycol Block Copolymer (3)]

The (poly)alkylene glycol block copolymer (3) is a multibranched (poly)alkylene glycol block copolymer essentially including a bond of the polymer chain (A) derived from a vinyl monomer component containing an unsaturated anionic monomer and the polymer chain (B) consisting of a (poly)alkylene glycol constitutional unit via the binding site (X). The multibranched (poly)alkylene glycol block copolymer has three or more branches in a multibranched structure, each branch is entirely or partly constituted by the polymer chain (B), and part of the branches has the polymer chain (A) at an end.

The (poly)alkylene glycol block copolymer (3) preferably has a structure represented by the following formula (6):

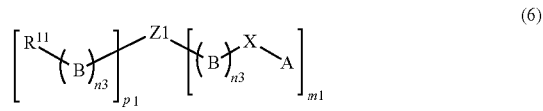

(6)

wherein $R^{11}$s are the same as or different from each other and each represent a hydrogen atom, a C1-C10 alkyl group, a C1-C10 alkenyl group, or a C6-C20 aryl group, Z1 represents a residue of a compound containing three or more active hydrogen atoms, $(B)_{n3}$s are the same as or different from each other and each represent a polymer chain including a (poly)alkylene glycol constitutional unit, Bs are the same as or different from each other and each represent a C2-C18 oxyalkylene group, Xs are the same as or different from each other and each represent an organic residue, A represents a polymer chain derived from a vinyl monomer component containing an unsaturated anionic monomer, n3s are the same as or different from each other and each represent an average number of moles of oxyalkylene groups added and is 1 to 1,000; and m1 and p1 each represent 1 or more and the sum of m1 and p1 is 3 or more.

The copolymer (3) and the copolymer (1) are the same in that the polymer chain (B) represented by $(B)_{n3}$ is bonded to the polymer chain (A) represented by A via the binding site (X) represented by X in the formula (6).

In the formula (6), m1 represents the number of branches in which the polymer chain A is bonded to the polymer chain $(B)_{n3}$ via the binding site X, and p1 represents the number of branches in which a hydrogen atom is bonded to the polymer chain $(B)_{n3}$. The sum of m1 and p1 is 3 or more, preferably 10 or less, more preferably 6 or less. A part of the end parts of the polymer chains (B) is bonded to the polymer chain (A) via the binding site (X) means that the proportion of the number moles of the end part of the branches of the polymer chain (B) that is bonded to the polymer chain (A) via the binding site (X) relative to all the end part of the branches of the polymer chain (B) is less than 100 mol %. In the above formula (6), (m1+p1) represents the number of moles of the ends of all the branches of the polymer chain (B), and m1/(m1+p1) represents the proportion of the number of moles of the branches of the polymer chain (B) that is bonded to the polymer chain (A) via the binding site (X) relative to all the end part of the branches of the polymer chain (B). The value $\{m1/(m1+p1)\} \times 100$ preferably falls within the range of 10 to 90 mol %, more preferably 30 to 70 mol %, still more preferably 40 to 60 mol %.

Herein, just the term "branch" refers to both a branch in which the polymer chain (A) is bonded to the polymer chain (B) via the binding site X and a branch in which the polymer chain (B) is bonded to a hydrogen atom, a C1-C10 alkyl group, a C1-C10 alkenyl group, or a C6-C20 aryl group. The phrase "each branch is entirely or partly constituted by the polymer chain (B)" means when the "branch" is a combination of the polymer chain (A) and the polymer chain (B), that the branch is partly constituted by the polymer chain (B), and when the "branch" is a combination of a hydrogen atom and the polymer chain (B), that the branch is entirely constituted by the polymer chain (B).

The number of branches of the (poly)alkylene glycol block copolymer (3) of the third preferred embodiment is three or more.

The lower limit of the number of the branches is preferably 5. The upper limit thereof is preferably 20, more preferably 13, still more preferably 7.

The number of the branches is preferably equal to the number of active hydrogen atoms of a compound having three or more active hydrogen atoms. In other words, every active hydrogen atom of the compound having three or more active hydrogen atoms is preferably bonded to the branch. Thus, higher shrinkage reducing performance can be obtained.

A structure in which the number of the branches is equal to the number of active hydrogen atoms of the compound having three or more active hydrogen atoms is schematically represented, for example, by the following formula (7) or (8):

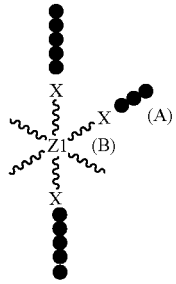

(7)

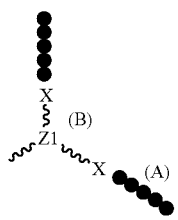

(8)

The formula (7) schematically shows a structure in which the residue of the compound having three or more active hydrogen atoms is a glycerin residue (a residue of a polyhydric alcohol, three active hydrogen atoms), each of the three active hydrogen atoms of the glycerin has a branch, and two of the three branches each have the polymer chain (A) derived from an unsaturated anionic monomer unit at an end.

The formula (8) schematically shows a structure in which the residue of the compound having three or more active hydrogen atoms is a sorbitol residue (a residue of a polyhydric alcohol, six active hydrogen atoms), each of the active hydrogen atoms of the sorbitol is bonded to the branch, and the polymer chain (A) including an unsaturated anionic monomer unit is bonded to the ends of three of the six branches.

[(Poly)Alkylene Glycol Block Copolymer (4)]

The (poly)alkylene glycol block copolymer (4) is a multibranched (poly)alkylene glycol block copolymer essentially including a bond of the polymer chain (A) derived from a vinyl monomer component containing an unsaturated anionic monomer and the polymer chain (B) consisting of a (poly)alkylene glycol constitutional unit via the binding site (X). The multibranched (poly)alkylene glycol block copolymer has three or more branches in a multibranched structure. Each branch is partly constituted by the polymer chain (B), and each branch has the polymer chain (A) at its end.

The (poly)alkylene glycol block copolymer (4) preferably has a structure represented by the following formula (9):

$$Z1[(B)_{n4}X\text{-}A]_{m2} \quad (9)$$

wherein Z1 represents a residue of a compound containing three or more active hydrogen atoms, $(B)_{n4}$s are the same as or different from each other and each represent a polymer chain including a (poly)alkylene glycol constitutional unit; Bs are the same as or different from each other and each represent a C2-C18 oxyalkylene group, Xs are the same as or different from each other and each represent an organic residue, A represents a polymer chain including an unsaturated anionic monomer unit, n4s are the same as or different from each other and each represent an average number of moles of oxyalkylene groups added and is 1 to 1,000, and m2 represents 3 or more.

The copolymer (4) and the copolymer (1) are the same in that the polymer chain (B) represented by $(B)_{n4}$ is bonded to the polymer chain (A) represented by A via the binding site (X) represented by X as in the formula (9).

In the formula (9) which represents the (poly)alkylene glycol block copolymer (4), m2 represents the number of branches in which the polymer chain (A) is bonded to the polymer chain (B) via the binding site (X), and the number of the branches is 3 or more, preferably 10 or less, more preferably 6 or less.

All of the end of each of the polymer chains (B) is bonded to the polymer chain (A) derived from a vinyl monomer component containing an unsaturated anionic monomer via the binding site (X) means that substantially every branch in all the copolymer molecules is bonded at an end to the polymer chain (A), and the percentage of the number of moles of the polymer chain (A) relative to the number of moles of the ends of all the branches including the polymer chain (B) is substantially 100 mol %.

The (poly)alkylene glycol block copolymer (4) of the third preferred embodiment has three or more of the branches. A preferred value of the number of the branches is the same as that of the (poly)alkylene glycol block copolymer (3).

A structure in which the number of the branches is equal to the number of active hydrogen atoms of the compound having three or more active hydrogen atoms is schematically represented, for example, by the following formula (10) or (11):

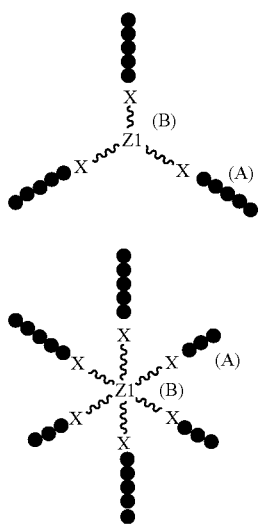

The formula (10) schematically shows a structure in which the residue of the compound having three or more active hydrogen atoms is a glycerin residue (a residue of a polyhydric alcohol, three active hydrogen atoms), each of the three or more active hydrogen atoms of the glycerin has the polymer chain (B) consisting of a (poly)alkylene glycol constitutional unit and the polymer chain (A) including an unsaturated anionic monomer unit bonded via the binding site (X).

The formula (11) schematically shows a structure in which the residue of the compound having three or more active hydrogen atoms is a sorbitol residue (a residue of a polyhydric alcohol, six active hydrogen atoms), each of the active hydrogen atoms of the sorbitol has the polymer chain (B) consisting of a (poly)alkylene glycol constitutional unit and the polymer chain (A) including an unsaturated anionic monomer unit bonded via the binding site (X).

In the following, the polymer chain (A) derived from a vinyl monomer component containing an unsaturated anionic monomer, the polymer chain (B) consisting of a (poly)alkylene glycol constitutional unit, the binding site (X), and the residue (Z1) of the compound having three or more active hydrogen atoms are described.

[Polymer Chain (A) Derived from Vinyl Monomer Component Containing Unsaturated Anionic Monomer]

In the third preferred embodiment, the polymer chain (A) derived from a vinyl monomer component containing an unsaturated anionic monomer is a constitutional unit having a structure in which a vinyl monomer component containing an unsaturated anionic monomer is polymerized.

The constitutional unit having a structure in which a vinyl monomer component containing an unsaturated anionic monomer is polymerized may be prepared by modifying a constitutional unit derived from a different monomer as long as the resulting constitutional unit has the same structure.

The unsaturated anionic monomer is preferably an unsaturated carboxylic acid monomer (hereinafter, also referred to merely as "monomer (a)"), an unsaturated sulfonic acid monomer (hereinafter, also referred to merely as "monomer (b)"), or an unsaturated phosphoric acid monomer (hereinafter, also referred to merely as "monomer (c)").

The monomer (a) is preferably, for example, a compound represented by the following formula (12):

wherein $R^{12}$, $R^{13}$, $R^{14}$, and $R^{15}$ are the same as or different from each other and each represent a hydrogen atom, a C1-C10 alkyl group, or —$(CH_2)zCOOM^2$, provided that at least one of $R^{12}$, $R^{13}$, $R^{14}$, and $R^{15}$ represents —$COOM^1$, (—$(CH_2)zCOOM^2$ may optionally form an anhydride together with $COOM^1$ or another —$(CH_2)zCOOM^2$,) z represents an integer of 0 to 2, and $M^1$ and $M^2$ are the same as or different from each other and each represent a hydrogen atom, a monovalent metal atom, a divalent metal atom, a trivalent metal atom, a quaternary ammonium group, or an organic amine group.

That is, the monomer (a) is an unsaturated carboxylic acid monomer which has at least one a carboxyl group or a salt thereof (—$COOM^1$) bonded to a C=C double bond.

The constitutional unit derived from the monomer (a) corresponds to a structure in which the polymerizable double bond of the monomer (a) represented by the formula (12) is opened by a polymerization reaction, in other words, a structure in which the double bond (C=C) is opened to a single bond (—C—C—).

The monovalent metal atom, divalent metal atom, and organic amine group represented by $M^1$ and $M^2$ in the formula (12) may be the same as the above specific examples of the monovalent metal atom, divalent metal atom, and organic amine group represented by Z' in the formula (2). Examples of the trivalent metal atom include aluminum and iron.

Specific examples of the unsaturated carboxylic acid monomer represented by the formula (12) may be the same as the above examples of the monomer that forms the structural unit (II) represented by the formula (2). In particular, in view of polymerizability, acrylic acid, methacrylic acid, maleic acid, maleic anhydride, and salts thereof are preferred. Acrylic acid, methacrylic acid, and salts thereof are particularly preferred.

Examples of the monomer (b) include styrene sulfonic acid and alkali metal salts, alkaline-earth metal salts, ammonium salts, amine salts, and substituted amine salts thereof;

sulfoalkyl (meth)acrylates such as sulfoethyl methacrylate, sulfopropyl methacrylate, sulfobutyl methacrylate, sulfoethyl acrylate, sulfopropyl acrylate, and sulfobutyl acrylate, and alkali metal salts, alkaline-earth metal salts, ammonium salts, amine salts, and substituted amine salts thereof; and 2-acrylamido-2-methylpropane sulfonic acid and alkali metal salts, alkaline-earth metal salts, ammonium salts, amine salts, and substituted amine salts thereof. Styrene sulfonic acid, sulfoalkyl (meth)acrylate, and salts thereof are preferred. Preferred among the salts are alkali metal salts.

Examples of the monomer (c) include hydroxyalkyl (meth)acrylate monophosphoric acid esters such as hydroxyethyl methacrylate monophosphoric acid ester, hydroxyethyl propyl methacrylate monophosphoric acid ester, hydroxyethyl butyl methacrylate monophosphoric acid ester, and alkali metal salts, alkaline-earth metal salts, ammonium salts, amine salts, and substituted amine salts thereof.

Two or more of these unsaturated anionic monomers may be used in combination.

The vinyl monomer component containing the unsaturated anionic monomer may contain a vinyl monomer other than the unsaturated anionic monomer.

Examples of the vinyl monomer other than the unsaturated anionic monomer include, in addition to the compounds listed as the specific examples of the monomer that forms the structural unit (III) in the compound of the first embodiment, esters of a C1-C30 alcohol and an unsaturated monocarboxylic acid such as methyl(meth)acrylate or glycidyl (meth)acrylate; (alkoxy) (poly)alkylene glycol mono(meth)acrylates such as polyethylene glycol mono(meth)acrylate and methoxy (poly)ethylene glycol mono(meth)acrylate; diesters of a C1-C30 alcohol and an unsaturated dicarboxylic acid such as maleic acid (anhydride), fumaric acid, or itaconic acid; diamides of the above unsaturated dicarboxylic acid and a C1-C30 amine; diesters of the above unsaturated dicarboxylic acid and an alkyl (poly)alkylene glycol prepared by adding 1 to 500 mol of a C2-C18 alkylene oxide to the alcohol or amine; (poly)alkylene glycol di(meth)acrylates such as (poly)ethylene glycol di(meth)acrylate and (poly)propylene glycol di(meth)acrylate; (poly)alkylene glycol dimaleates such as polyethylene glycol dimaleate; vinyl ethers and (meth)allyl ethers such as (methoxy)polyethylene glycol monovinyl ether and (methoxy)polyethylene glycol mono(meth)allyl ether; and 3-methyl-3-butenyl ethers such as (methoxy)polyethylene glycol 3-methyl-3-butenyl ether. The vinyl monomer component may contain one or two or more of these.

The vinyl monomer component containing the unsaturated anionic monomer preferably contains 1% to 100% by mass, more preferably 10% to 100% by mass, still more preferably 50% to 100% by mass of the unsaturated anionic monomer based on 100% by mass of the entire vinyl monomer component. Most preferably, the amount thereof is 100% by mass, that is, the vinyl monomer component consists only of the unsaturated anionic monomer.

In the (poly)alkylene glycol block copolymer of the third preferred embodiment, the average number of moles of an unsaturated anionic monomer unit introduced in the polymer chain (A) is preferably 1 or more.

When the (poly)alkylene glycol block copolymer of the third preferred embodiment has a multibranched structure, the average number of moles of an unsaturated anionic monomer unit introduced means the average number of moles of an unsaturated anionic monomer unit introduced in one branch.

The lower limit of the average number of moles of an unsaturated anionic monomer unit introduced is more preferably 2, still more preferably 5. The upper limit thereof is preferably 50, more preferably 30, still more preferably 20, particularly preferably 15, most preferably 10.

When the average number of moles of an unsaturated anionic monomer unit introduced is 1 or more, the copolymer can sufficiently exhibit the performance based on the polymer chain (A) including an unsaturated anionic monomer unit.

If the average number of moles of an unsaturated anionic monomer unit introduced is more than 50, dispersibility is imparted and thus a shrinkage reducing agent needed to obtain a sufficient shrinkage reducing performance cannot be added.

In the (poly)alkylene glycol block copolymer of the third preferred embodiment, the mass ratio between the unsaturated anionic monomer in the ethylenically unsaturated monomer component that forms the polymer chain (A) and the polyalkylene glycol chain (B) is preferably (0.3 to 70)/(99.7 to 30). If the proportion of the unsaturated anionic monomer in the ethylenically unsaturated monomer component that forms the polymer chain (A) is less than 0.3% by weight, the (poly)alkylene glycol block copolymer is less likely to act on a hydraulic material, which possibly leads to insufficient shrinkage reducing performance. If the proportion thereof is more than 70% by weight, the (poly)alkylene glycol block copolymer possibly greatly induces retardation of the hardening of a hydraulic material. The mass ratio is preferably (0.5 to 65)/(99.5 to 35), more preferably (1 to 60)/(99 to 40), still more preferably (3 to 60)/(97 to 40), particularly preferably (5 to 60)/(95 to 40).

In the (poly)alkylene glycol block copolymer of the third preferred embodiment, the monomer component serving as a material for the compound refers to the monomer component that forms the polymer chain (A) and the polyalkylene glycol chain (B), that is, an ethylenically unsaturated monomer component that forms the polymer chain (A) (an unsaturated anionic monomer and a vinyl monomer other than the unsaturated anionic monomer) and the polyalkylene glycol chain (B). The ratio of the number of moles of the unsaturated anionic monomer in the ethylenically unsaturated monomer component that forms the polymer chain (A), the number of moles of the polyalkylene glycol chain (B), and the number of moles of the vinyl monomer other than the unsaturated anionic monomer is preferably (25 to 97)/(75 to 3)/(0 to 72), more preferably (50 to 97)/(50 to 3)/(0 to 47), still more preferably (65 to 95)/(35 to 5)/(0 to 30), particularly preferably (80 to 95)/(20 to 5)/(0 to 15).

[Polymer Chain (B) Consisting of (Poly)Alkylene Glycol Constitutional Unit]

The polymer chain (B) consisting of a (poly)alkylene glycol constitutional unit is preferably a polymer chain that includes a C2-C18 alkylene oxide ((poly)alkylene oxide). Hereinafter, the (poly)alkylene glycol is also referred to as PAG.

The C2-C18 alkylene oxide is preferably a C2-C8 alkylene oxide, and examples of the C2-C8 alkylene oxide include ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, or octylene oxide. In addition, aliphatic epoxides such as dipentane ethylene oxide and dihexane ethylene oxide; alicyclic epoxides such as trimethylene oxide, tetramethylene oxide, tetrahydrofuran, tetrahydropyran, and octylene oxide; and aromatic epoxides such as styrene oxide and 1,1-diphenyl ethylene oxide may also be used.

The alkylene oxide which constitutes the (poly)alkylene glycol constitutional unit preferably mainly includes an alkylene oxide (oxyalkylene group) with a relatively short chain having about 2 to 8 carbon atoms in view of the compatibility with cement particles. The alkylene oxide more preferably mainly includes a C2-C4 alkylene oxide such as ethylene oxide, propylene oxide, or butylene oxide, and still more preferably mainly includes ethylene oxide.

The term "mainly" herein means that, when the polymer chain (B) is consisted of a (poly)alkylene glycol constitutional unit includes two or more alkylene oxides, the alkylene oxide (oxyalkylene group) with a relatively short chain having about 2 to 8 carbon atoms accounts for most of all the alkylene oxides. When the phrase "account for most of" is represented by using mol % of ethylene oxide in 100 mol % of all the alkylene oxides, the ethylene oxide accounts preferably for 50 to 100 mol %. Thus, the (poly)alkylene glycol block copolymer in the present invention with higher hydrophilicity is provided. The amount of the ethylene oxide is more preferably 60 mol % or more, still more preferably 70 mol % or more, particularly preferably 80 mol % or more, most preferably 90 mol % or more.

When the polymer chain (B) consisting of a (poly) alkylene glycol constitutional unit includes two or more alkylene oxides, they may be bonded in any addition form, and, for example, are bonded through random addition, block addition, or alternate addition.

In cases where the polymer chain (B) consisting of a (poly)alkylene glycol constitutional unit includes an alkylene oxide having three or more carbon atoms, the (poly) alkylene glycol block copolymer of the third preferred embodiment with a certain level of hydrophobicity can be provided. Therefore, the use of the copolymer as a shrinkage reducing agent forms some binding structures (networks) in cement particles, leading to a reduction in viscosity and stiffness of the cement composition. If too large an amount of an alkylene oxide having three or more carbon atoms is introduced in the polymer chain (B), the copolymer exhibits too high hydrophobicity and less water solubility, leading to a remarkable reduction in workability. Furthermore, since the copolymer is likely to interact with an antifoaming agent and an air-entraining agent, the air content of concrete or mortar is less likely to be adjusted to possibly cause a reduction in resistance to freezing and thawing. Therefore, the amount of the alkylene oxide having three or more carbon atoms based on 100% by mass of all the alkylene oxides is preferably 50% by mass or less, more preferably 30% by mass or less, still more preferably 20% by mass or less, particularly preferably 10% by mass or less.

In order to enhance the hydrolysis resistance, an oxyalkylene group having three or more carbon atoms may be introduced at an end of the polymer chain (B) consisting of a (poly)alkylene glycol constitutional unit.

Examples of the oxyalkylene group having three or more carbon atoms include an oxypropylene group, an oxybutylene group, an oxystyrene group, and an alkyl glycidyl ether residue. In particular, an oxypropylene group and an oxybutylene group are preferred because they are easily produced.

When the oxyalkylene group having three or more carbon atoms is introduced, the amount thereof is preferably adjusted taking into consideration the hydrolysis resistance of the binding site (X) in the block copolymer in the present invention. For example, the amount of the oxyalkylene group having three or more carbon atoms is preferably 50 mol % or more, more preferably 100 mol % or more, still more preferably 150 mol % or more, particularly preferably 200 mol % or more, based on the polymer chain (B) consisting of a (poly)alkylene glycol constitutional unit.

In the (poly)alkylene glycol block copolymer of the third preferred embodiment, the average number of alkylene oxide repeating units (an average number of moles of oxyalkylene groups added) in the polymer chain (B) is preferably 1 to 1,000.

When the average number of moles of oxyalkylene groups added is 1 or more, the copolymer can sufficiently exhibit the performance based on the polymer chain (B) consisting of a (poly)alkylene glycol constitutional unit.

On the other hand, if the average number of moles of oxyalkylene groups added is more than 1,000, the material compound for use in the production of the copolymer may be highly viscous, or the reactivity may be insufficient, for example. As a result, a copolymer not suitable in view of workability may possibly be obtained.

The lower limit of the average number of moles added is more preferably 10, still more preferably 20, further more preferably 50, particularly preferably 75, more particularly preferably 80, most preferably 100. The upper limit thereof is more preferably 800, still more preferably 700, further more preferably 600, particularly preferably 500, more particularly preferably 300, most preferably 200.

The average number of alkylene oxide repeating units (an average number of moles of oxyalkylene groups added) means an average of the numbers of moles of an alkylene oxide per branch.

The polymer chain (B) in the (poly)alkylene glycol block copolymer of the third preferred embodiment not bonded to the polymer chain (A) via the binding site (X) preferably has at its end a hydrogen atom, a C1-C10 alkyl group, a C1-C10 alkenyl group, or a C6-C20 aryl group, more preferably a hydrogen atom, a methyl group, an ethyl group, a n-propyl group, an i-propyl group, a n-butyl group, an iso-butyl group, a sec-butyl group, a tert-butyl group, a phenol, a methyl phenol, or naphthol.

$R^{10}$ in the formula (4) and $R^{11}$ in the formula (6) each preferably represent any one of these.

[Binding Site (X)]

In the (poly)alkylene glycol block copolymer of the third preferred embodiment, the binding site (X) may be any site having a structure capable of chemically, stably bonding the polymer chain (A) and the polymer chain (B).

Preferred examples of the structure of the binding site include an organic residue derived from a structure which works as a chain transfer agent for use in a polymerization reaction.

Examples of the binding site (X) include (i) a sulfur-containing binding site, (ii) a binding site derived from an azo initiator, (iii) a binding site derived from a residue containing a phosphorus atom, and (iv) a binding site derived from another structure.

The structures of the plural organic residues present as binding sites may be the same or different from each other.

(i) Sulfur-Containing Binding Site

The sulfur-containing binding site (X) forms an ester bond together with an oxygen atom at an end of the polymer chain (B) and contains a sulfur atom, or does not form an ester bond together with an oxygen atom at an end of the polymer chain (B) and contains a sulfur atom.

The sulfur-containing binding site (X) has a structure represented by, for example, the following formula (13):

(13)

wherein $R^{16}$ represents an organic residue, preferably a linear or branched C1-C18 alkylene group or an aromatic group such as a phenyl group, an alkyl phenyl group, a pyridinyl group, thiophene, pyrrole, furan, or thiazole (which may partially be substituted with, for example, a hydroxy group, an amino group, a cyano group, a carbonyl group, a carboxyl group, a halogen group, a sulfonyl group, a nitro group, or a formyl group).

$R^{16}$ in the structure represented by the formula (13) is a site to be bonded to the polymer chain (B) consisting of a (poly)alkylene glycol constitutional unit, and the sulfur atom (S) is a site to be bonded to the polymer chain (A) derived from a vinyl monomer component containing an unsaturated anionic monomer.

When $R^{16}$ in the structure represented by the formula (13) is bonded to an oxygen atom at an end of the polymer chain (B) consisted of a (poly)alkylene glycol constitutional unit, a moiety represented by the following formula (14):

(wherein $R^{16}$ is the same as described above) is formed. The phrase "the binding site (X) does not form an ester bond together with an oxygen atom at an end of the polymer chain (B)" means that this moiety does not include an ester bond.

Such a structure can be formed in the following way: the hydroxy group at an end of the polymer chain (B) consisting of a (poly)alkylene glycol constitutional unit is tosylated, thioacetylated with thioacetic acid, and hydrolyzed to obtain a thiol group at the end, and the unsaturated carboxylic acid monomer (a) is block polymerized using the thiol group as a chain transfer agent and using a radical polymerization initiator.

Alternatively, when a carboxyl group of mercapto carboxylic acid is reacted with a hydroxy group at an end of the polymer chain (B) consisting of a (poly)alkylene glycol constitutional unit by dehydration esterification to obtain a thiol ester, and the unsaturated carboxylic acid monomer (a) is block polymerized using the thiol ester as a chain transfer agent and using a radical polymerization initiator to obtain a copolymer, the copolymer has the binding site (X) represented by the following formula (15):

wherein $R^{17}$ represents a mercapto carboxylic acid residue, and is, for example, a C1-C18 linear or branched alkylene group, or an aromatic group such as a phenyl group, an alkyl phenyl group, a pyridinyl group, thiophene, pyrrole, furan, or thiazole (which may partially be substituted with, for example, a hydroxy group, an amino group, a cyano group, a carbonyl group, a carboxyl group, a halogen group, a sulfonyl group, a nitro group, or a formyl group).

In this case, the binding site and an oxygen atom at an end of the polymer chain (B) consisting of a (poly)alkylene glycol constitutional unit form a moiety represented by the following formula (16):

(wherein $R^{17}$ is the same as described above), and this moisty includes an ester bond.

(ii) Binding Site Derived from Azo Initiator

The binding site derived from an azo initiator may be a site derived from an azo group-containing polymerization initiator (azo initiator), and preferably has, for example, a structure which is derived from an azo initiator and is represented by the following formula (17).

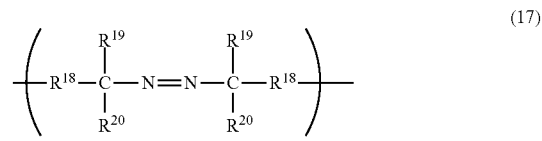

Examples of the azo initiator include those having a repeating unit represented by the formula (17), wherein $R^{18}$s each independently represent a C1-C20 alkylene group (the alkylene group may partially be substituted with, for example, an alkyl group, an alkenyl group, a hydroxy group, a cyano group, a carboxyl group, or an amino group), a carbonyl group, or a carboxyl group, or a group in which a C1-C20 alkylene group (the alkylene group may partially be substituted with, for example, an alkyl group, an alkenyl group, a hydroxy group, a cyano group, a carboxyl group, or an amino group) is bonded to a carbonyl group or a carboxyl group, $R^{19}$s are each independently represent a C1-C20 alkyl group, a carboxy-substituted (C1-C10) alkyl group, a phenyl group, or a substituted phenyl group, $R^{20}$s are each independently represent a cyano group, an acetoxy group, a carbamoyl group, or a (C1-C10 alkoxy) carbonyl group.

An azo initiator represented by the following formula (18) is more preferred.

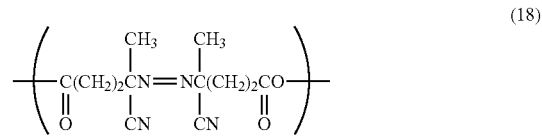

The azo initiator represented by the formula (18) preferably has a structure in which an end thereof is preliminarily bonded to the polymer chain (B) consisted of a (poly) alkylene glycol constitutional unit by an ester bond.

The organic residue X as a binding site derived from an azo initiator represented by the formula (17) or (18) has a structure represented by the following formula (19) or (20):

wherein $R^{18}$, $R^{19}$, and $R^{20}$ are the same as $R^{18}$, $R^{19}$, and $R^{20}$ in the formula (17),

In the formula (20), the carbon of the carbonyl group is to be bonded to the polymer chain (B) consisting of a (poly) alkylene glycol constitutional unit.

(iii) Binding Site Derived from Phosphorus-Containing Residue

The binding site containing a phosphorus atom preferably has, for example, a structure represented by the following formula (21):

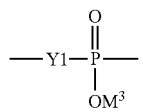

(21)

wherein Y1 represents an organic residue, and $M^3$ represents a metal atom, an ammonium group, or an organic amine group.

Y1 is a site to be bonded to the polymer chain (B) consisting of a (poly)alkylene glycol constitutional unit, and the phosphorus atom of hypophosphorous acid (salt) bonded to Y1 is a site to be bonded to the polymer chain (A) including an unsaturated anionic monomer unit.

Examples of the organic residue include a linear, branched, or cyclic C2-C30 alkylene group, a divalent C6-C30 aromatic group (a phenylene group, an alkyl phenylene group, and a divalent group derived from pyridine, thiophene, pyrrole, furan, or thiazole). Such groups that may be optionally partially substituted with a substituent such as a hydroxy group, an amino group, an acetyl amino group, a cyano group, a carbonyl group, a carboxyl group, a halogen group, a sulfonyl group, a nitro group, or a formyl group are preferred.

More preferred are divalent C2-C18 organic residues which may optionally partially be substituted with a hydroxy group, and still more preferred are a linear or branched C2-C8 alkylene group which may optionally partially be substituted with a hydroxy group.

The hypophosphite may preferably be a salt of hypophosphorous acid with a metal, ammonia, or an organic amine. Preferred examples of the metal include alkali metals and alkaline-earth metals. Examples of the organic amine include C1-C18 alkylamines, hydroxyalkylamines, and polyalkylene polyamines. A salt of sodium, potassium, ammonia, or triethanolamine is preferred.

(iv) Binding Site Derived from Another Structure

Examples of the binding site derived from another structure include binding sites derived from any of the following chain transfer agents. Sulfur-containing binding sites also fall into the category of the above sulfur-containing binding site (i).

Specific examples of the chain transfer agents include a compound prepared by reacting the —OH group with thiocarboxylic acid such as thioacetic acid or thiobenzoic acid using a zinc halide, and then alkali-hydrolyzing the resulting group, thereby converting a —OH group at an end of a (poly)alkylene glycol to a —SH group; a compound prepared by reacting diethyl azodicarboxylate (DEAD) with triphenylphosphine in the presence of a (poly)alkylene glycol and thioacetic acid, and then alkali-hydrolyzing the resulting group, thereby converting a —OH group at an end of a (poly)alkylene glycol to a —SH group; a compound prepared by reacting the —OH group at an end of the (poly)alkylene glycol with an allyl halide such as allyl bromide through the SN2 reaction, thereby alkylating an end of a (poly)alkylene glycol; and a compound prepared by adding a thiocarboxylic acid such as thioacetic acid or thiobenzoic acid to a compound having a double bond such as allyl group at an end of the (poly)alkylene glycol and then, converting an thiocarboxyl group of the compound to a —SH group by alkali-hydrolysis.

Each of these compounds (chain transfer agents) may be used alone or two or more of these may be used in combination.

Preferred among these structures as the binding site (X) is a sulfur-containing binding site (i).

When the binding site (X) is a sulfur-containing binding site, the sulfur content of the entire (poly)alkylene glycol block copolymer in the present invention is preferably 0.001% by mass or more, more preferably 0.005% by mass or more, still more preferably 0.01% by mass or more. The sulfur content is also preferably 5% by mass or less, more preferably 3% by mass or less, still more preferably 2% by mass or less.

The sulfur content can be calculated from the sulfur content of a PAG thiol compound and an average of the numbers of the vinyl monomer unit per one thiol group (SH) in the polymer chain (A). When the sulfur content falls within the above range, the (poly)alkylene glycol block copolymer of the third preferred embodiment can be efficiently produced by the production method described below.

In a preferred embodiment of the (poly)alkylene glycol block copolymer of the third preferred embodiment, the copolymer is decomposed into the polymer chain (A) and the polymer chain (B) at a decomposition rate of 10% by mass or less when the copolymer is put in a 2% by mass alkaline solution for 15 minutes. The decomposition rate is more preferably 5% by mass or less, still more preferably 2% by mass or less, most preferably substantially 0% by mass.

The decomposition rate herein refers to a hydrolysis rate of the copolymer in an alkaline aqueous solution. When the hydrolysis rate is 10% by mass or less, the copolymer exhibits higher performance as a shrinkage reducing agent.

In order to reduce the hydrolysis rate, the binding site (X) is preferably a non-ester bond containing a sulfur atom.

Thus, an embodiment in which at least one of the binding sites (X) is a non-ester bond containing a sulfur atom is one preferred embodiment of the present invention.

The hydrolysis rate can be determined by, for example, a hydrolysis test as follows.

(1) The weight average molecular weight (Mw) of the copolymer is determined under the below-described GPC measurement conditions as a molecular weight before reaction (before decomposition).

(2) The copolymer is dissolved in a NaOH aqueous solution to prepare a 2% by mass aqueous solution. In order to adjust the pH of the aqueous copolymer solution to 12.5, the pH of the NaOH aqueous solution is preliminarily adjusted. The 2% by mass aqueous solution is stirred for 15 minutes and then neutralized to pH 5.0 with a 35% HCl aqueous solution.

The copolymer is taken out and the weight average molecular weight (Mw) of the copolymer is determined under the below-described GPC measurement conditions as a molecular weight after reaction (after decomposition).

(3) The hydrolysis rate is determined from the GPC chart of the Mws before and after reaction.

When the (poly)alkylene glycol block copolymer of the third preferred embodiment is the above-described (poly)alkylene glycol block copolymer (1) or (2), the copolymer particularly preferably has the structure represented by the following formula (22) or (23). When the (poly)alkylene glycol block copolymer in the present invention is the (poly)alkylene glycol block copolymer (3) or (4), the copolymer particularly preferably has the structure represented by the following formula (24) or (25):

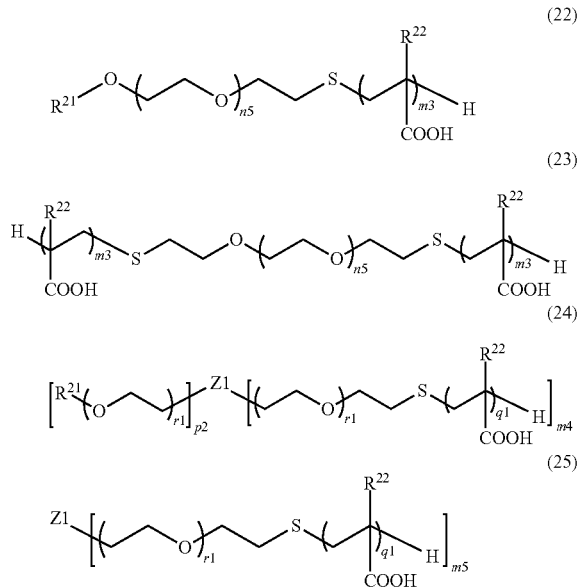

wherein $R^{21}$s are the same as or different from each other and each represent a hydrogen atom, a C1-C10 alkyl group, a C1-C10 alkenyl group, or a C6-C20 aryl group, $R^{22}$s are the same as or different from each other and each represent a hydrogen atom or a methyl group, Z1 represents the residue of the compound having three or more active hydrogen atoms, n5 and r1 each represent an average number of moles of oxyethylene groups added, and are each 1 to 500 (preferably 75 to 500), m3 is 1 to 500 (preferably 1 to 30), q1 is 1 to 50 (preferably 1 to 30), m4 and p2 are each 0 or more, the sum of m4 and p2 is 3 or more, and m5 is 3 or more.

In the structures represented by the formulas (22) to (25), it is preferred that the unsaturated carboxylic acid monomer is acrylic acid or methacrylic acid, the (poly)alkylene glycol chain is a (poly)ethylene glycol chain, and the binding site (X) is a binding site containing a sulfur atom derived from thioacetic acid or a metal salt thereof.

In the formulas (22) to (25), $R^{22}$ and a COOH group in the unsaturated carboxylic acid monomer unit are located on the terminal hydrogen atom side. Alternatively, $R^{22}$ and a COOH group in each monomer unit may be located on the sulfur atom side. In the structures represented by the above formulas (22) to (25), it may be randomly determined, for each monomer unit, whether $R^{13}$ and a COOH group are located on the hydrogen atom side or the sulfur atom side.

[Residue (Z1) of Compound Having Active Hydrogen Atom]

The residue of a compound having an active hydrogen atom herein means a group having a structure formed by removing an active hydrogen atom from a compound having an active hydrogen atom, and the active hydrogen atom means hydrogen to which an alkylene oxide can be added. One such residue of a compound having an active hydrogen atom may be used, or two or more such residues may be used.

Specific preferred examples of the residue of a compound having an active hydrogen atom include polyhydric alcohol residues having a structure formed by removing an active hydrogen atom from a hydroxy group of a polyhydric alcohol, polyvalent amine residues having a structure formed by removing an active hydrogen atom from an amino group of a polyvalent amine, polyvalent imine residues having a structure formed by removing an active hydrogen atom from an imino group of a polyvalent imine, and polyvalent amide residues having a structure formed by removing an active hydrogen atom from an amide group of a polyvalent amide compound. Polyalkylene imine residues are preferred among the polyvalent amine residues, polyhydric alcohol residues, and polyvalent imine residues. That is, the residue of the compound having three or more active hydrogen atoms is preferably at least one polyvalent compound residue selected from the group consisting of polyvalent amine residues, polyalkylene imine residues, and polyhydric alcohol residues.

The structure of the residue of a compound having an active hydrogen atom may be a linear chain structure, a branched structure, or a three-dimensionally crosslinked structure.

Among the specific preferred examples of the residue of a compound having an active hydrogen atom, the polyvalent amine (polyamine) has only to be a compound having two or more amino groups in one molecule on average, and is preferably, for example, a homopolymer or copolymer obtained by polymerization of one or two or more monoamine compounds, such as alkylamines (e.g. methylamine); alkylene amines (e.g. arylamine); aromatic amines (e.g. aniline); and ammonia by a common method. Such a compound forms the polyvalent amine residue in the multibranched (poly)alkylene glycol block copolymer.

Further, the polyvalent amine may be an amine compound having two or more amine group such as ethylenediamine, diethylenetriamine, or triethylenetetramine, or may be a polyamine obtained by polymerization of one or two or more of these. Such a polyamine usually has a primary amino group or a secondary amino group (imino group) having an active hydrogen atom as well as a tertiary amino group in the structure.

The polyalkylene imine has only to be a compound having three or more imino groups on average in one molecule and is preferably, for example, a homopolymer or copolymer obtained by polymerization of one or two or more C2-C8 alkylene imines such as ethylene imine and propylene imine by a common method. Such compounds form the polyalkylene imine residue in the multibranched (poly)alkylene glycol block copolymer. The polyalkylene imine is three-dimensionally crosslinked by polymerization, and usually has a primary amino group or a secondary amino group (imino group) having an active hydrogen atom as well as a tertiary amino group in the structure.

More preferred Among these is polyethylene imine obtained by polymerization of ethylene imine in view of the performance imparted by the multibranched (poly)alkylene glycol block copolymer.

The number average molecular weights of the polyvalent amine and polyalkylene imine are each preferably 100 to 100,000, more preferably 300 to 50,000, still more preferably 600 to 10,000, particularly preferably 800 to 5,000.

The polyhydric alcohol has only to be a compound having three or more hydroxy groups on average in one molecule and is preferably a compound constituted by the three elements, carbon, hydrogen, and oxygen. Specific preferred examples of the polyhydric alcohol include saccharides such as polyglycidol, glycerin, polyglycerin, trimethylolethane, trimethylolpropane, 1,3,5-pentatriol, erythritol, pentaerythritol, dipentaerythritol, sorbitol, sorbitan, a sorbitol glycerin condensate, adonitol, arabitol, xylitol, mannitol, and glucose; sugar alcohols such as glucitol; and sugar acids such as gluconic acid. Such a compound forms the polyhydric alcohol residue in the multibranched (poly)alkylene glycol block copolymer.

More preferred among these is glycerin, polyglycerin, trimethylolpropane, erythritol, pentaerythritol, dipentaerythritol, sorbitol, or sorbitan in view of industrial productivity.

[Production Method of (Poly)Alkylene Glycol Block Copolymer of the Third Preferred Embodiment]

In the following, a production method of the (poly)alkylene glycol block copolymer (1) or (2) and a production method of the (poly)alkylene glycol block copolymer (3) or (4) are described in this order.

[Production Method of (Poly)Alkylene Glycol Block Copolymer (1) or (2)]

As an example of a method for producing the (poly)alkylene glycol block copolymer (1) or (2) of the third preferred embodiment, production of a copolymer that has a binding site containing a sulfur atom derived from thioacetic acid (or a metal salt thereof) is described below.

The (poly)alkylene glycol block copolymer (1) or (2) according to the third preferred embodiment may be produced by preparing a polymer chain (B) consisting of a (poly)alkylene glycol constitutional unit which has a hydroxyl group at at least one end (both ends for production of the (poly)alkylene glycol block copolymer (2)); tosylating the hydroxyl group (tosylation); thioacetylating the tosylated end by a reaction with thioacetic acid or a metal salt thereof (thioacetylation); hydrolyzing the thioacetyl group obtained in the thioacetylation (hydrolysis); and block-polymerizing an unsaturated vinyl monomer using the resulting polymer chain (B) consisting of a (poly)alkylene glycol constitutional unit which has a thiol group at an end as a chain transfer agent and using a radical polymerization initiator.

The polymer chain (B) consisting of a (poly)alkylene glycol constitutional unit which has a thiol group at one end or both ends is also referred to as a PAG (di)thiol compound. When the (poly)alkylene glycol is (poly)ethylene glycol, the polymer chain (B) is also referred to as a PEG (di)thiol compound.

[Tosylation]

In the tosylation, the hydroxy group at an end of a hydroxy-terminated polymer chain including a (poly)alkylene glycol constitutional unit is reacted with a tosylating agent to form a tosyl group. Thus, a polymer chain including a tosylated (poly)alkylene glycol constitutional unit is obtained.

The tosylating agent and the reaction conditions used in the tosylation are not limited as long as the hydroxy group is tosylated. For example, tosyl chloride (TsCl) may be used as a tosylating agent, dichloromethane ($CH_2Cl_2$) may be used as a reaction solvent, for example, and the reaction conditions may be set as appropriate.

[Thioacetylation]

In the thioacetylation, the tosyl group of the tosyl-terminated polymer chain including a (poly)alkylene glycol constitutional unit obtained in the tosylation in which the hydroxy group at an end is tosylated is reacted with a thioacetylating agent to form a thioacetyl group. Thus, a polymer chain including a thioacetylated (poly)alkylene glycol constitutional unit is obtained.

The thioacetylating agent and the reaction conditions used in the thioacetylation are not limited as long as the tosyl group is thioacetylated. For example, potassium thioacetate ($CH_3COSK$) may be used as a thioacetylating agent, acetonitrile ($CH_3CN$) may be used as a reaction solvent, and the reaction conditions may be set as appropriate.

[Hydrolysis]

In the hydrolysis, the thioacetyl group of the thioacetyl-terminated polymer chain including a (poly)alkylene glycol constitutional unit obtained in the thioacetylation in which the tosyl group at an end is thioacetylated is hydrolyzed to form a thiol group. Thus, a polymer chain including a (di)thiolated (poly)alkylene glycol constitutional unit is obtained. For example, a PAG (di)thiol compound represented by the following formula (26) or (27) can be obtained.

The PAG (di)thiol compounds represented by the following formulas (26) and (27) are preferred as intermediates used in the production of the (poly)alkylene glycol block copolymers (1) and (2) according to the present invention, respectively.

Also in the hydrolysis, the reaction conditions may be set as appropriate so that the hydrolysis of the thioacetyl group proceeds.

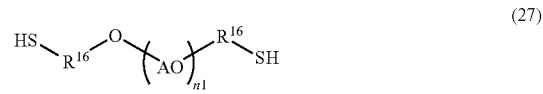

In the formulas (26) and (27), $R^{10}$, $R^{16}$, and n1 are the same as described above. AO represents an oxyalkylene group.

As described below, the (poly)alkylene glycol block copolymers (3) and (4) in the present invention can also be produced by a method including the tosylation, thioacetylation, and hydrolysis. In this case, the PAG (di)thiol compounds obtained through the hydrolysis each have a structure represented by the following formula (28) or (29).

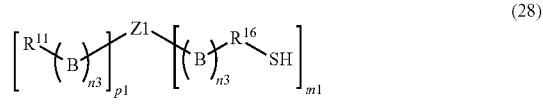

In the formulas (28) and (29), Z1, B, $R^{11}$, $R^{16}$, n3, n4, p1, m1, and m2 are the same as those described above.

[Block Polymerization]

As described above, the PAG (di)thiol compound functions as a chain transfer agent, and when the vinyl monomer component is radical-polymerized using this compound as a chain transfer agent, the (poly)alkylene glycol block copolymers (1) and (2) of the third preferred embodiment can be produced easily, efficiently, and at low cost.

The unsaturated anionic monomer contained in the vinyl monomer component preferably mainly includes an unsaturated carboxylic acid monomer forming the polymer chain (A) (monomer (a)), and is preferably substantially entirely constituted by the unsaturated carboxylic acid monomer forming the polymer chain (A).

The polymer obtained by the above polymerization reaction can be made easy to handle by adjusting its pH to a range of weakly acidic or more (preferably a pH of 4 or more, still more preferably a pH of 5 or more, particularly preferably a pH 6 or more) in an aqueous solution state.

If the polymerization reaction is carried out at a pH of 7 or more, the polymerization rate may decrease and, at the same time, the copolymerizability become insufficient so that the performance as a shrinkage reducing agent may not be sufficiently exhibited. Therefore, the polymerization reaction is preferably carried out in the acidic to neutral pH range (preferably a pH of less than 6, more preferably a pH of less than 5.5, still more preferably a pH of less than 5).

[Production Method of Copolymer Having Binding Site Other than Sulfur-Containing Binding Site]

So far, an example of the production of a copolymer having a sulfur-containing binding site has been described. In the following, a method for producing a copolymer having a different structure as a binding site will be described.

In the case of producing a copolymer having a binding site derived from an azo initiator, a compound having a structure in which an end of the azo initiator and the polymer chain (B) consisting of a (poly)alkylene glycol constitutional unit are bonded in advance via an ester bond can be used as a starting material.

The compound having a structure in which an end of the azo initiator and the polymer chain (B) consisting of a (poly)alkylene glycol constitutional unit are bonded in advance via an ester bond can also be obtained, for example, by esterification of a (poly)alkylene glycol and an azo initiator in which both ends of an azo group are terminated with a carboxyl group (e.g. V-501, Wako Pure Chemical Industries, Ltd.). Since the azo initiator is decomposed by heating, the esterification needs to be performed by a method not including a heating step. Examples of such a method include (1) a method for producing an azo initiator by reacting an azo initiator with thionyl chloride to synthesize an acid chloride and reacting the acid chloride with (poly) alkylene glycol; and (2) a method for producing an azo initiator by dehydration condensation of an azo initiator and (poly)alkylene glycol using dicyclohexylcarbodiimide (DCC) and, if necessary, 4-dimethylaminopyridine.

By using the azo initiator, the azo group is thermally decomposed to generate a radical, and polymerization is started from the radical. Then, unsaturated anionic monomers are added one by one to one end of a polyalkylene oxide part including an oxyalkylene group to form the (poly)alkylene glycol block copolymer of the third preferred embodiment.

In the case of producing the copolymer having a binding site derived from a phosphorus-containing residue, a phosphorus-containing (poly)alkylene glycol compound is preferably produced by addition of hypophosphorous acid (salt) to a compound C having a structure in which an organic residue having a carbon-carbon double bond is bonded to an oxygen atom at an end of the polymer chain (B) consisting of a (poly)alkylene glycol constitutional unit.

The compound C can be synthesized by a known method.

The compound C may be synthesized by addition of a compound having an unsaturated group to the polymer chain (B) consisting of a (poly)alkylene glycol constitutional unit. The compound may be added by esterification, etherification, amidation, or another known method. The unsaturated compound to be added has only to be a compound capable of being added to an alkylene oxide.

In the addition of the hypophosphorous acid (salt) to the compound C, the amount of the hypophosphorous acid (salt) to be added and reacted is preferably 0.01 to 100 mol for each mole of the unsaturated bond contained in the compound C. In order to increase the reaction rate of the compound C, the amount of the hypophosphorous acid (salt) to be reacted is preferably 0.1 mol or more, more preferably 0.2 mol or more, still more preferably 0.5 mol or more for each mole of the compound C. In order to reduce the amount of an unreacted hypophosphorous acid (salt), the amount of the hypophosphorous acid (salt) to be reacted is preferably 10 mol or less, more preferably 5 mol or less, still more preferably 2 mol or less for each mole of the compound C.

The addition of the hypophosphorous acid (salt) to the compound C is preferably performed at a temperature of 0° C. to 200° C., more preferably 20° C. to 150° C., still more preferably 40° C. to 120° C., further more preferably 50° C. to 100° C.

After the addition of the hypophosphorous acid (salt) to the compound C, the resulting phosphorus-containing (poly) alkylene glycol compound is preferably purified. This purification can be performed as follows: the reaction solution is dried to remove the solvent, the remaining compound is suspended with a solvent for purification, and the resulting solution is filtered and/or extracted.

The solvent for purification may be appropriately selected, and preferred examples thereof include THF, acetonitrile, chloroform, and isopropyl alcohol.

The solvent for extraction may be appropriately selected. When a high polar solvent is used, water, methanol, acetonitrile, or dioxane is preferably used, for example. When a low polar solvent is used, diethyl ether, cyclohexane, chloroform, or methylene chloride is preferably used, for example.

In the addition reaction between the hypophosphorous acid (salt) and the compound C, a radical polymerization initiator may optionally be used in a state of being dissolved in a solvent, i.e. in a solution state. Examples of the solvent include water; alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; ketone compounds such as acetone and methyl ethyl ketone; and cyclic ether compounds such as tetrahydrofuran and dioxane. Water is preferably used as the solvent.

When water is used as the solvent in the addition reaction between the hypophosphorous acid (salt) and the Compound C, a water-soluble radical polymerization initiator is preferably used because the use thereof eliminates a step of removing insoluble components after the reaction. Examples of the water-soluble radical polymerization initiator include persulfates such as ammonium persulfate, sodium persulfate, and potassium persulfate; hydrogen peroxide; organic peroxides such as t-butyl hydroperoxide; and water-soluble azo initiators such as azoamidine compounds (e.g. 2,2'-azobis-2-methyl propionamidine hydrochloride), cyclic azoamidine compounds (e.g. 2,2'-azobis-2-(2-imidazolin-2-yl) propane hydrochloride), azonitrile compounds (e.g. 2-carbamoyl azoisobutyronitrile), azoamide compounds (e.g. 2,4'-azobis{2-methyl-N-[2-(1-hydroxybutyl)]propion amide}), macro azo compounds (e.g. an ester of 4,4'-azobis (4-cyano valeric acid) and (alkoxy)polyethylene glycol). Each of these may be used alone or two or more of these may be used. Preferred among these is a persulfuric acid initiator.

The phosphorus-containing (poly)alkylene glycol compound functions as a chain transfer agent. When radical polymerization of the unsaturated anionic monomer is performed using this compound as a chain transfer agent, the (poly)alkylene glycol block copolymer of the third preferred embodiment can be produced easily, efficiently, and at low cost.

The description of the radical polymerization of the unsaturated anionic monomer is omitted because it can be performed in the same manner as the block polymerization using a PAG thiol compound as a chain transfer agent.

[Production Method of (Poly)Alkylene Glycol Block Copolymers (3) and (4)]

The method for producing the (poly)alkylene glycol block copolymers (3) and (4) according to the third preferred embodiment includes a step of obtaining a polymer chain including a multibranched (poly)alkylene glycol constitutional unit (first step) and a step of polymerizing a vinyl monomer component containing an unsaturated anionic monomer to all or part of the ends of the branches of the multibranched (poly)alkylene glycol polymer (second step). The (poly)alkylene glycol block copolymers (3) and (4) can be produced by performing these steps in this order.

The first step can be performed by addition of the polymer chain (B) consisting of a (poly)alkylene glycol constitutional unit to the compound having three or more active hydrogen atoms.

The second step can be performed by the same production method for producing the (poly)alkylene glycol block copolymers (1) and (2) according to the present invention.

Fourth Preferred Embodiment

In the fourth preferred embodiment of the compound contained in the shrinkage reducing agent for a hydraulic material of the present invention, the compound contained in the shrinkage reducing agent for a hydraulic material of the present invention is a polyalkylene glycol compound including a linear or branched polyalkylene glycol chain, the chain having at least two ends each of which has an organic residue bonded thereto, the organic residue being capable of adsorbing at least one selected from the group consisting of metals, metal compounds, and metal ions, the organic residues each containing at least one functional group selected from the group consisting of a carbonyl group, a hydroxy group, an amino group, a thiol group, a phosphoric acid group, a phosphorous acid group, and a silane group.

The compound according to the fourth preferred embodiment including a linear or branched polyalkylene glycol chain having at least two ends each of which has an organic residue bonded thereto (hereinafter, also referred to as an organic residue-containing polyalkylene glycol compound) may contain an additional structure site as long as the compound has at least three structure sites, i.e. a polyalkylene glycol chain and at least two ends each of which has an organic residue bonded to the chain.

The organic residue bonded to an end of the polyalkylene glycol chain means an organic residue directly bonded to an end of the polyalkylene glycol chain. The "end of the polyalkylene glycol chain" herein includes an unmodified end of a polyalkylene glycol chain (the end is a hydroxy group) and a modified end of a polyalkylene glycol chain. The structure in which the organic residue is bonded to an end of the polyalkylene glycol chain can be formed by reacting a compound that provides an organic residue described below with a hydroxy group at an end of the polyalkylene glycol chain or an end modified by introducing a reactive functional group to an end of the polyalkylene glycol chain. Examples of the reactive functional group include, but are not particularly limited to, an amino group, a carboxyl group, and an epoxy group. An epoxy group is preferred.

The phrase "the polyalkylene glycol chain having at least two ends each of which has an organic residue bonded thereto" means that when the polyalkylene glycol chain is linear, both ends of the polyalkylene glycol chain each have an organic residue bonded thereto, and when the polyalkylene glycol chain is branched, at least two ends of the main chain and the branched chain(s) each have an organic residue bonded thereto.

The organic residue has an adsorption ability to at least one selected from the group consisting of metals, metal compounds, and metal ions. Thus, the organic residue-containing polyalkylene glycol compound of the present invention can be adsorbed on at least one selected from the group consisting of metals, metal compounds, and metal ions in the cement composition.

The same shall apply to an embodiment in which an organic residue bonded to at least two ends of the polyalkylene glycol chain is adsorbed on one metal compound particle.

The cement particles contained in the cement composition are known to form a mosaic aggregate of metal compounds such as tricalcium aluminate ($C_3A$:$3CaO.Al_2O_3$), tetracalcium iron aluminate ($4AF$:$4CaO.Al_2O_3$—$Fe_2O_3$), dicalcium silicate ($C_2S$:$2CaO.SiO_2$), and tricalcium silicate ($C_3S$: $3CaO.SiO_2$). Therefore, when the organic residue bonded to each of at least two ends of the polyalkylene glycol chain is adsorbed on one such cement particle, the organic residues are adsorbed on at least two of the metal compounds which constitute the mosaic of cement particles.

The organic residue has at least one functional group selected from the group consisting of a carbonyl group, a hydroxy group, an amino group, a thiol group, a phosphoric acid group, a phosphorous acid group, and a silane group, and has no carbon-carbon bond derived from a vinyl monomer.

The functional group has an electron-donating group having a lone pair of electrons, and forms a coordination bond with at least one selected from the group consisting of metals, metal compounds, and metal ions. In this way, the functional group can be adsorbed on at least one selected from the group consisting of metals, metal compounds, and metal ions.

The organic residue preferably has a plurality of functional groups which have an adsorption ability to at least one selected from the group consisting of metals, metal compounds, and metal ions. More preferably, the functional groups are electron-donating groups. In the case where one organic residue has a plurality of electron-donating groups, the organic residue can form a coordination bond with at least one selected from the group consisting of metals, metal compounds, and metal ions at plural coordination sites. That is, the organic residue can be more strongly bonded to at least one selected from the group consisting of metals, metal compounds, and metal ions due to the chelating effect. Therefore, an additive for cement having a higher effect of suppressing a reduction in cement dispersion and higher performance to reduce dry shrinkage can be provided.

The number of functional groups in one organic residue is preferably 1 to 12, more preferably 2 to 12. When the number of functional groups in one organic residue is preferably 1 to 12, more preferably 2 to 12, the organic residue can be bonded to at least one selected from the group consisting of metals, metal compounds, and metal ions. The number of functional groups is still more preferably 3 to 12.

The organic residue has a molecular weight of 700 or less. When the molecular weight of the organic residue is 700 or less, a reduction in cement dispersion is suppressed, dry shrinkage is reduced, and other effects of the present invention can be efficiently obtained even if the amount of the additive for cement is small. The molecular weight of the organic residue is preferably 500 or less, more preferably 300 or less, still more preferably 200 or less. The molecular weight of the organic residue is preferably 40 or more, more preferably 60 or more, still more preferably 80 or more, particularly preferably 100 or more.

The organic residue contained in the organic residue-containing polyalkylene glycol compound of the fourth preferred embodiment preferably has a carbonyl group, a hydroxy group, an amino group, a phosphoric acid group, or a silane group among the above-described functional groups. More preferably, the organic residue has a carbonyl group, a hydroxy group, an amino group, or a phosphoric acid group.

The organic residue containing a carbonyl group is not limited as long as the residue has a carbonyl group, and may be an organic residue that contains a functional group having in the structure a carbonyl group such as a carboxyl group, an aldehyde group, an ester group, or an amide group. The functional group having a carbonyl group is preferably a carboxyl group or an amide group.

The organic residue preferably contains at least two functional groups selected from the group consisting of a carbonyl group, a hydroxy group, an amino group, a thiol group, a phosphoric acid group, a phosphorous acid group, and a silane group. Such an organic residue can be bonded to at least one selected from the group consisting of metals, metal compounds, and metal ions more strongly due to the chelating effect. Therefore, an additive for cement having a higher effect of suppressing a reduction in cement dispersion and higher performance to reduce dry shrinkage can be provided.

The organic residue may be any one that has an adsorption ability to at least one selected from the group consisting of metals, metal compounds, and metal ions. The organic residue preferably has a catechol structure. Furthermore, the organic residue preferably has a pyrrolidone structure. Furthermore, the organic residue preferably has a gluconic acid structure.

It can be confirmed by the following method that the organic residue has an adsorption ability to at least one selected from the group consisting of metals, metal compounds, and metal ions.

The organic residue-containing polyalkylene glycol compound and a metal, a metal compound, or a metal ion are dispersed in a solution, and the solution was then filtered so that the organic residue-containing polyalkylene glycol compound adsorbing a metal or the like is separated. The quantitative analysis of the total organic carbon content of the filtrate and other analyses are carried out to quantify the organic residue-containing polyalkylene glycol compound not adsorbed on a metal or the like in the filtrate. Thus, it is possible to determine the proportion of the organic residue-containing polyalkylene glycol compound adsorbed on a metal or the like relative to the entire organic residue-containing polyalkylene glycol compound. In this way, the above adsorption ability can be confirmed.

The compound of the fourth preferred embodiment including a linear or branched polyalkylene glycol chain, the chain having at least two ends each of which has an organic residue bonded thereto, is obtained by bonding the below-described compound that provides an organic residue to each of at least two ends of the linear or branched polyalkylene glycol chain.

The organic residue is a residue formed by bonding a compound that provides an organic residue to an end of the polyalkylene glycol chain. The compound that provides an organic residue may be any compound other than a vinyl monomer.

Specific examples thereof include amines such as ethylenediamine, diethylenetriamine, triaminotriethylamine, triethylenetetramine, and N,N,N',N'-tetrakis(2-pyridylmethyl)ethylenediamine; amino carboxylic acids such as ethylenediaminetetraacetic acid, diethylenetriaminepentaacetic acid, triethylene tetramine hexaacetic acid, tetraethylene pentamine heptaacetic acid, glycol ether diamine tetraacetic acid, nitrilotriacetic acid, nitrilotripropionic acid, ethylenediamine-N-monoacetic acid, ethylenediamine-N,N'-diacetic acid, ethylenediamine-N,N'-dipropionic acid, N-(2-hydroxyethyl)-ethylenediamine-N,N',N'-triacetic acid, N,N'-bis(2-hydroxybenzyl)-ethylenediamine-N,N'-diacetic acid, ethylenediamine-N,N,N',N'-tetrapropionic acid, o,o'-bis(2-aminophenyl)ethylene glycol-N,N,N',N'-tetraacetic acid, o,o-bis(2-aminoethyl)ethylene glycol-N,N,N',N'-tetraacetic acid, glycine, N,N-bis(2-hydroxyethyl)glycine, trans-1,2-cyclohexane diamine-N,N,N',N'-tetraacetic acid, 1,3-diamino-2-hydroxypropane-N,N,N',N'-tetraacetic acid, diethylenetriamine-N,N,N',N'',N''-pentaacetic acid, 1,6-hexamethylenediamine-N,N,N',N'-tetraacetic acid, iminodiacetic acid, N-(2-hydroxyethyl)iminodiacetic acid, 1,2-diaminopropane-N,N,N',N'-tetraacetic acid, triethylenetetramine-N,N,N',N'',N''',N'''-hexaacetic acid, glutamic acid, aspartic acid, and aminosuccinic acid; hydroxy amines such as triethanolamine; hydroxycarboxylic acids such as tartaric acid, citric acid, 2,5-dihydroxy-tetrahydrofuran-2,3,4,5-tetracarboxylic acid, 5-hydroxy-cyclohexane-1,2,3,4-tetracarboxylic acid, 6-hydroxy-tetrahydrofuran-2,3,4,5-tetracarboxylic acid, 1,4-dihydroxy-butane-1,1',4,4'-tetracarboxylic acid, 1,3-dihydroxy-propane-1,1',3,3'-tetracarboxylic acid, and 2-(4-hydroxyphenyl)-propane-1,1',3,3'-tetracarboxylic acid; hydroxyaminocarboxylic acids such as bicine; polycarboxylic acids such as oxalic acid, maleic acid, succinic acid, 3-butene-1,2,3-tricarboxylic acid, benzene-1,2,4-tricarboxylic acid, and 1,2,3,4,5,6-cyclohexanehexacarboxylic acid; polyols such as gluconic acid, glucosamic acid, lactone glucoheptonate, and lactone gluconate; phenols such as tyron, salicylic acid, sulfosalicylic acid, pyrogallol carboxylic acid, alizarin S, alizarin complexone, kojic acid, 3-(3, 4-dihydroxyphenyl)-L-alanine, 3-hydroxytyramine, and DL-adrenaline; imidazoles such as histidine; pyrrolidones such as N-hydroxyethyl pyrrolidone; amino phosphoric acids such as ethylenediamine-N,N,N',N'-tetrakis(methylenephosphonic acid), and nitrilotris(methylenephosphonic acid); phosphates; phosphites; phosphonates; phosphinates; thiols such as 2,3-dimercaptopropanol, unithiol, thioglycolic acid, β-mercaptopropionic acid, dimercapto succinic acid, aminoethyl mercaptan, thiooxalic acid, and cysteamine; sulfur compounds such as sodium diethyldithiocarbamate, thiourea, thiocarbazide, and thiosemicarbazide; silanes such as monoalkoxysilane, dialkoxysilane, trialkoxysilane, acyloxysilane, and triacyloxysilane; o-phenanthroline; acetylacetone; o,o'-dihydroxyazo compounds such as eriochromeblack T, 1-(2-hydroxy-4-sulfo-1-naphthylazo)-2-hydroxy-3-naphthoic acid, hydroxynaphthol blue, chalcone, eriochrome-blue-black B, eriochrome-blue SE, and eriochrome-red B; hydroxy azo compounds such as 1-pyridylazo-2-naphthol, 4-(2-pyridylazo)-resorcin, 2-(2-pyridylazo)-p-cresol, 1-(2-thiazolylazo)-2-naphthol, 4-(2-thiazolylazo)-resorcin, 2-(2-thiazolylazo)-p-cresol, trin, neotrin, 3-(4-sulfophenylazo)-4,5-dihydroxynaphthalene-2,7-disulfonic acid sodium salt, and naphthylazoxine; phthaleins, sulfophthaleins, and triphenylmethanes such as cresolphthalein complexone, thymolphthalein complexone, xylenol orange, methylthymol blue, pyrocatechol violet, pyrogallol red, brompyrogallol red, chromazurol S, eriochrome cyanin R, glycinethymol blue, and glycine cresol red; murexide; jincon; thiourea; dithizone; glyoxal bis(2-hydroxyanil); N-benzoyl-N-phenylhydroxylamine; gallocyanine; hematoxylin; feron; fluorescent metal indicators such as calcein, calcein blue, fluoxine, anisidine blue, stilbene fluoro blue S, and morin; and redox indicators such as variamine blue B base, bindschedler's green leuco base, 3,3'-dimethyl naphthidine, cacotheline, diphenyl carbazide, and diphenyl carbazone.

In introducing the organic residue to an end of the polyalkylene glycol, one or two or more of the above compounds may be used. Among the derivatives of these compounds, compounds having a functional group capable of reacting with a polyalkylene glycol, a modified polyalkylene glycol described later, or a polyalkylene glycol having an organic residue bonded to one end may also be used.

The organic residue preferably has a structure derived from an aminocarboxylic acid, a phenol, a polyol, a pyrrolidone, or a polycarboxylic acid. In other words, the organic residue preferably has a residue formed by bonding an aminocarboxylic acid, a phenol, a polyol, a pyrrolidone, or a polycarboxylic acid to an end of the polyalkylene glycol chain. More preferably, the organic residue has a structure derived from an aminocarboxylic acid or a phenol.

More preferred among the residues derived from an aminocarboxylic acid or a phenol is a residue formed by bonding aspartic acid, 3-(3,4-dihydroxyphenyl)-L-alanine, 3-hydroxytyramine, or DL-adrenaline to an end of the polyalkylene glycol chain. Still more preferred is a residue formed by bonding aspartic acid or 3-hydroxytyramine to an end of the polyalkylene glycol chain.

A method of bonding a compound that provides an organic residue to an end of the polyalkylene glycol chain may be any method commonly used. For example, when the compound that provides an organic residue has a carboxyl group (e.g. amino carboxylic acids, hydroxy carboxylic acids, polycarboxylic acids), the organic residue can be introduced by an esterification reaction of the carboxyl group and the hydroxy group at an end of the polyalkylene glycol chain.

Alternatively, an organic residue can be introduced by bonding a modified polyalkylene glycol prepared by introducing a reactive functional group such as an amino group, a carboxyl group, or an epoxy group into an end of a polyalkylene glycol, and a carboxyl group, a hydroxy group, or an amino group of a compound that provides an organic residue or a derivative thereof via an amide bond, an ester bond, a covalent bond, or another bond. Specifically, for example, an epoxy group of polyethylene glycol diglycidyl ether or the like is reacted with an amino group of aspartic acid, 3-hydroxytyramine, or the like to form a bond between them. Furthermore, when an alkylene oxide is added to a functional group such as a hydroxy group or an amino group of the compound that provides an organic residue to prepare a polyalkylene glycol having an organic residue at one end, a functional group such as an amino group, a carboxyl group, or an epoxy group is optionally introduced to a hydroxy group at another end of the above polyalkylene glycol, and another compound that provides an organic residue is allowed to react with such a functional group, a polyalkylene glycol in which an organic residue is bonded to each of both ends can be obtained.

It is also useful to introduce a phosphonate group by reacting a compound having a phosphonate group with an end of the polyalkylene glycol. In this case, a phosphonate group is preferably introduced to each of the two ends of the polyalkylene glycol. Thus resulting compound is represented by the following formula (30). This compound is obtained, for example, by the Mannich reaction of α,ω-diaminopolyalkylene glycol, formaldehyde, and phosphorous acid.

$R^{23}R^{24}NCH_2CH_2(OA^1)_{n6}CH_2CH_2R^{25}R^{26}$ (30)

In the formula, $A^1$s are the same as or different from each other and each represent a C2-C18 alkylene group, $R^{23}$, $R^{24}$, $R^{25}$, and $R^{26}$ each independently represent $—CH_2—PO(OM^4_{q2})_2$ or $—R^{27}$, at least one of $R^{23}$ and $R^{24}$ represents $—CH_2—PO(OM^4_{q2})_2$, at least one of $R^{25}$ and $R^{26}$ represents $—CH_2—PO(OM^4)_2$, $R^{27}$ represents a hydrogen atom or a unsaturated or saturated hydrocarbon residue, $M^4$s are the same as or different from each other and each represent a hydrogen atom, an alkali metal, an alkaline-earth metal, or an amine and/or organic amine residue, q2 is 1 when M is a hydrogen atom, an alkali metal, an alkaline-earth metal, or an amine or organic amine residue, and is ½ when $M^4$ is an alkaline-earth metal.

$A^1$ in the formula (30) is preferably an ethylene group and/or a propylene group, more preferably an ethylene group.

$R^{27}$ in the formula (30) is preferably a C1-C15 alkyl group, more preferably a C1-C3 alkyl group.

When a silane group is introduced to an end of the polyalkylene glycol by reacting the end with a compound having a silane group, a C1-C10 alkoxysilane is preferred, and trialkoxysilane is more preferred as the compound having a silane group. In particular, a compound having $—Si(OMe)_3$ and/or $—Si(OCH_2CH_3)_3$ are/is preferred. Such a compound may be synthesized, for example, by reacting 3-(trialkoxy silyl)propyl isocyanate with polyalkylene glycol or polyalkylene glycol diamine. The reaction of an isocyanate group with an amine forms urea bond, and the reaction of an isocyanate group with a hydroxy group forms an urethane bond.

When the polyalkylene glycol chain is branched, the polyalkylene glycol chain two ends of the main chain and a branched chain(s), i.e. three or more ends. Each of at least two ends of these three or more ends has only to be modified to an organic residue by reacting each end with the compound that provides an organic residue to introduce an organic residue. The percentage of the ends modified with an organic residue in the branched polyalkylene glycol chain in the present invention is preferably 20% or more, more preferably 40% or more, more preferably 40% or more, still more preferably 60% or more, particularly preferably 80% or more, and most preferably 100% relative to all the ends of the branched polyalkylene glycol chain (100%). When 20% or more of the ends of the branched polyalkylene glycol chain of the present invention is modified with an organic residue, cement can be dispersed by a smaller addition amount of an additive for cement, and higher performance to reduce drying shrinkage can be obtained.

In the organic residue-containing polyalkylene glycol compound of the fourth preferred embodiment, the mass ratio between the polyalkylene glycol forming a polyalkylene glycol chain and the compound that provides an organic residue for use in the formation of an organic residue, i.e.

polyalkylene glycol forming a polyalkylene glycol chain/compound that provides an organic residue is preferably (99 to 1)/(1 to 99), more preferably (98 to 10)/(2 to 90), still more preferably (97 to 20)/(3 to 80), particularly preferably (97 to 30)/(3 to 70).

In the organic residue-containing polyalkylene glycol compound of the fourth preferred embodiment, the monomer component serving as a material for the compound means a polyalkylene glycol forming the polyalkylene glycol chain of the organic residue-containing polyalkylene glycol compound and a compound that provides an organic residue for use in the formation of an organic residue. The ratio between the number of moles of the polyalkylene glycol forming the polyalkylene glycol chain and the number of moles of the compound that provides an organic residue for use in the formation of an organic residue is preferably (75 to 3)/(25 to 97), more preferably (50 to 3)/(50 to 97), still more preferably (40 to 3)/(60 to 97), particularly preferably (35 to 3)/(65 to 97), most preferably (35 to 5)/(65 to 95).

The structure of the polyalkylene glycol chain contained in the organic residue-containing polyalkylene glycol compound of the fourth preferred embodiment may be linear or branched. The polyalkylene glycol chain may contain two or more polyalkylene oxides.

The polyalkylene glycol chain contained in the organic residue-containing polyalkylene glycol compound of the fourth preferred embodiment is preferably a polymer chain that includes a C2-C18 oxyalkylene group (polyalkylene oxide). The number of carbon atoms of the oxyalkylene group is more preferably 2 to 8, still more preferably 2 to 4.

Examples of the alkylene oxide include ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, and octylene oxide. Furthermore, aliphatic epoxides such as dipentane ethylene oxide and dihexane ethylene oxide; alicyclic epoxides such as trimethylene oxide, tetramethylene oxide, tetrahydrofuran, tetrahydropyran, and octylene oxide; and aromatic epoxides such as styrene oxide and 1,1-diphenyl ethylene oxide may be used, for example.

From the viewpoint of the balance between the hydrophilicity and the hydrophobicity, the polyalkylene glycol chain preferably essentially contains an oxyethylene group as an oxyalkylene group. The proportion of the oxyethylene group is more preferably 60 mol % or more, still more preferably 80 mol % or more, particularly preferably 90 mol % or more in 100 mol % of the entire alkylene oxide.

The average number of moles of oxyalkylene groups added is preferably 1 to 1,000. The lower limit of the average number of moles added is more preferably 25, still more preferably 40, particularly preferably 50. The upper limit thereof is more preferably 800, still more preferably 700, further more preferably 600, particularly preferably 500, further particularly preferably 300, most preferably 250.

In the organic residue-containing polyalkylene glycol compound of the fourth preferred embodiment, the weight average molecular weight (Mw) of the polyalkylene glycol forming a polyalkylene glycol chain is not limited, and is preferably, for example, 1,000 to 1,000,000, more preferably 2,000 to 50,000, still more preferably 2,000 to 40,000, particularly preferably 3,000 to 35,000.

The dispersion degree of the polyalkylene glycol forming a polyalkylene glycol chain is not limited, and is preferably, for example, 1 to 100, more preferably 1.1 to 10, still more preferably 1.1 to 3. Herein, the dispersion degree means a value (Mw/Mn) obtained by dividing the weight average molecular weight (Mw) by the number average molecular weight (Mn).

In the organic residue-containing polyalkylene glycol compound of the fourth preferred embodiment, the weight average molecular weight of the polyalkylene glycol forming a polyalkylene glycol chain can be determined by GPC under the conditions described in the examples below.

In the case where the polyalkylene glycol chain is branched, the branched polyalkylene glycol can be synthesized, for example, by successively adding an alkylene oxide to a polyhydric alcohol such as trimethylolpropane, glycerin, polyglycerol, or polyglycidol.

When the polyalkylene glycol chain is constituted by two or more alkylene oxides, they may be added by any addition form such as random addition, block addition, or alternate addition.

The organic residue bonded to at least two ends of the polyalkylene glycol chain of the organic residue-containing polyalkylene glycol compound adsorbs any metal, and examples of the metal include typical metal elements and transition metal elements of Groups 8, 9, 10, and 11 of the periodic table. Preferred examples thereof include alkali metals, alkaline-earth metals, and metal elements of Groups 8, 10, 11, 12, 13, and 14 of the periodic table. More preferred are base metals such as alkali metals, alkaline earth metals, zinc, aluminum, and iron.

The metal ion to be adsorbed by the organic residue may be any metal ion, and examples thereof include ions of typical metal elements and transition metal elements of groups 8, 9, 10, and 11 of the periodic table. Preferred are, for example, ions of alkali metals, alkaline earth metals, and metal elements of groups 8, 10, 11, 12, 13, and 14 of the periodic table, and more preferred are ions of base metals such as alkali metals, alkaline earth metals, zinc, aluminum, and iron.

Fifth Preferred Embodiment

In the fifth preferred embodiment of the compound contained in the shrinkage reducing agent for a hydraulic material of the present invention, the compound contained in the shrinkage reducing agent for a hydraulic material of the present invention is a polyamine compound having an acid group-containing side chain.

The polyamine compound of the fifth preferred embodiment has a structure formed by replacing an active amine hydrogen of a polyamine compound having a primary amino group and/or a secondary amino group in a molecule with an acid group-containing side chain. Hereinafter, a polyamine compound before the active amine hydrogen is replaced with an acid group-containing side chain is also referred to as an unsubstituted polyamine compound.

The unsubstituted polyamine compound may be any compound having a primary amino group and/or a secondary amino group in a molecule, and examples thereof include amines having such a group(s) and derivatives thereof. Each of the unsubstituted polyamine compounds may be used alone or two or more of these may be used. The unsubstituted polyamine compound may have the structure of two or more of the following amines and derivatives thereof in its structure.

Examples of the amines include polyalkyleneimines obtained by polymerization or copolymerization of an alkyleneimine (e.g. ethyleneimine, azetidine, pyrrolidine, piperidine), such as polyethyleneimine obtained by polymerization of ethyleneimine; polyamide polyamines obtained by condensation of the above-described polyalkyleneimine and/or a (poly)alkylenepolyamine (e.g. ethylenediamine, diethylenetriamine, triethylenetetramine, tetraethylenepentamine, or pentaethylenehexamine) with a polybasic acid such as sulfuric acid, phosphoric acid, or adipic acid; polyurea polyamines obtained by reacting a polyalkyleneimine and/or an alkyleneimine with urea; polyamide polyester polyamines obtained by copolymerization of an alkylene imine and an acid anhydride such as phthalic anhydride; polyallylamines obtained by polymerization of allylamine or diallylamine and/or a hydrochloride thereof; polydiallylamine-sulfur dioxide copolymers obtained by copolymerization of diallylamine and/or a hydrochloride thereof with sulfur dioxide; and diallylamine-maleic acid copolymers obtained by copolymerization of diallylamine and/or hydrochloride thereof with maleic acid.

Examples of the polyamine derivative include compounds obtained by an addition reaction of the above-described polyamine with an alkylene oxide such as ethylene oxide or propylene oxide, a (meth)acrylic acid ester such as butyl acrylate or methyl methacrylate, or an α,β-unsaturated amide compound such as acrylamide.

The unsubstituted polyamine compound may also be a commercial product such as EPOMINE (polyethyleneimine) SP-003, SP-006, SP-012, SP-018, SP-200, SP-110, or P-1000 (Nippon Shokubai Co., Ltd.), polyallylamine PAA-03, PAA-05, PAA-08, PAA-15, PAA-15B, PAA-10C, or PAA-25 (Nitto Boseki Co., Ltd.), or diallylamine/maleic acid copolymer PAS-410 or PAS-410SA (Nitto Boseki Co., Ltd.).

Preferred among these are a condensate of adipic acid with polyalkyleneimine, polyamide polyamine, polyallylamine, polyethyleneimine, or ethylenediamine; a condensate of triethylenetetramine and adipic acid; and a diallylamine-maleic acid copolymer. Polyalkyleneimine, polyamide polyamine, and polyallylamine are particularly preferred.

The number average molecular weight of the unsubstituted polyamine compound is not limited and is preferably 1,000 to 50,000. If the molecular weight is less than 1,000, the average particle diameter of the polyamine compound in an alkaline solution tends to be smaller than 2.2 nm, so that performance to reduce drying shrinkage may not be sufficient. On the contrary, if the number average molecular weight exceeds 50,000, the unsubstituted polyamine compound becomes too large, so that performance to reduce drying shrinkage reducing may not be sufficient. The number average molecular weight of the unsubstituted polyamine compound is more preferably 2,000 to 40,000, still more preferably 2,000 to 35,000, most preferably 2,000 to 30,000.

The number average molecular weight of the unsubstituted polyamine compound can be measured by gel permeation chromatography (GPC) under the conditions described in the examples below.

Examples of the acid group-containing side chain include, but are not limited to, side chains having a carboxyl group, a sulfonic acid group, or a monovalent metal salt, a divalent metal salt, an ammonium salt, or an organic amine salt thereof.

The acid group-containing side chain can be produced by reaction of a polyamine compound with an acid group-containing compound having a structure in which one or more of a carboxyl group, a sulfonic acid group, a monovalent metal salt, a divalent metal salt, an ammonium salt, and an organic amine thereof is bonded to an atomic group reactive with an amino group.

Examples of the atomic group reactive with an amino group include a C2-C20 unsaturated hydrocarbon group such as a vinyl group or an allyl group; and a group in which a glycidyl ether group, an epoxy group, an isocyanate group, a thioisocyanate group, an aldehyde group, a hydroxy group, or a halogen atom is bonded to a C1-C20 saturated hydrocarbon group.

Examples of the acid group-containing compound include (meth)acrylic acid and maleic acid. Each of these may be used alone or two or more of these may be used.

The amount of the acid group-containing compound is preferably 0.01 to 1 mol per active amine hydrogen of the unsubstituted polyamine compound. The amount thereof is more preferably 0.01 to 0.8 mol, still more preferably 0.01 to 0.6 mol, particularly preferably 0.05 to 0.6 mol, most preferably 0.1 to 0.5 mol.

In the polyamine compound having an acid group-containing side chain of the fifth preferred embodiment, the mass ratio between the unsubstituted polyamine compound for forming a polyamine compound that has an acid group-containing side chain and the acid group-containing compound for forming an acid group-containing side chain, (unsubstituted polyamine compound for forming a polyamine compound that has an acid group-containing side chain)/(acid group-containing compound for forming an acid group-containing side chain), is preferably (99.9 to 50)/(0.1 to 50). If the proportion of the acid group-containing compound for forming an acid group-containing side chain is less than 0.1% by weight, the polyamine compound having an acid group-containing side chain is less likely to act on a hydraulic material, which may lead to insufficient shrinkage reducing performance. If the proportion thereof is more than 50% by weight, the polyamine compound having an acid group-containing side chain may greatly induce retardation of the hardening of a hydraulic material. The mass ratio is more preferably (99.8 to 55)/(0.2 to 45), still more preferably (99.7 to 60)/(0.3 to 40), particularly preferably (99.7 to 65)/(0.3 to 35).

In the polyamine compound having an acid group-containing side chain of the fifth preferred embodiment, the monomer component serving as a material for the compound means an unsubstituted polyamine compound for forming a polyamine compound that has an acid group-containing side chain and an acid group-containing compound for forming an acid group-containing side chain. The ratio between the number of moles of the unsubstituted polyamine compound for forming a polyamine compound that has an acid group-containing side chain and the number of moles of the acid group-containing compound for forming an acid group-containing side chain is preferably (75 to 3)/(25 to 97), more preferably (50 to 3)/(50 to 97), still more preferably (30 to 4)/(70 to 96), particularly preferably (25 to 5)/(75 to 95).

The polyamine compound of the fifth preferred embodiment may have a different side chain other than the acid group-containing side chain. Examples of the different side chain include a hydrocarbon group-containing side chain and an oxyalkylene group-containing side chain.

The hydrocarbon group-containing side chain can be formed by reaction of a polyamine compound with the compound having a structure in which a hydrocarbon group is bonded to an atomic group reactive with an amino group.

The hydrocarbon group is preferably a C1-C30 hydrocarbon group and may have a linear, branched, or cyclic structure. The hydrocarbon group is more preferably a C4-C30 hydrocarbon group. The hydrocarbon group is preferably a linear, branched, or cyclic alkyl group or an aryl group.

Examples of the atomic group reactive with an amino group include a carboxyl group, and a group derived from a carboxylic anhydride; a group derived from (meth)acrylic acid; a glycidyl ether group; an epoxy group; an isocyanate group; a thioisocyanate group; an aldehyde group; a hydroxy group; and a halogen atom.

The compound having a structure in which a hydrocarbon group is bonded to a group derived from (meth)acrylic acid is a (meth)acrylic acid ester.

Specific examples of the compound having a structure in which a hydrocarbon group is bonded to an atomic group reactive with an amino group include glycidyl ethers of higher alcohols, such as octyl glycidyl ether, lauryl glycidyl ether, stearyl glycidyl ether, and 2-ethylhexyl glycidyl ether; glycidyl ethers of alkylphenols, such as octyl phenyl glycidyl ether, nonyl phenyl glycidyl ether, lauryl phenyl glycidyl ether, and stearyl phenyl glycidyl ether; glycidyl ethers of alkyl cycloalkanols, such as octylcyclopentyl glycidyl ether, octylcyclohexyl glycidyl ether, nonylcyclopentyl glycidyl ether, nonylcyclohexyl glycidyl ether, laurylcyclopentyl glycidyl ether, laurylcyclohexyl glycidyl ether, stearylcyclopentyl glycidyl ether, and stearylcyclohexyl glycidyl ether; glycidyl ethers of alkyl benzyl alcohols, such as octyl benzyl glycidyl ether, nonyl benzyl glycidyl ether, lauryl benzyl glycidyl ether, and stearyl benzyl glycidyl ether; 1,2-epoxy alkanes such as epoxy hexane, an α-olefin epoxide which is a mixture of compounds having 12 to 14 carbon atoms, an α-olefin epoxide which is a mixture of compounds having 16 to 18 carbon atoms, an α-olefin epoxide which is a mixture of compounds having 20 to 28 carbon atoms, and an α-olefin epoxide which is a mixture of compounds having 30 or more carbon atoms; alkyl isocyanates such as octyl isocyanate, decyl isocyanate, and octadecyl isocyanate; monoisocyanate compounds obtained by reaction of an alcohol such as octanol, lauryl alcohol, or stearyl alcohol with a diisocyanate such as tolylene diisocyanate; halides in which a terminal hydroxy group of an alcohol such as octanol, lauryl alcohol, or stearyl alcohol is replaced by a halogen atom such as chlorine, bromine, or iodine; saturated fatty acids such as lauric acid, myristic acid, palmitic acid, and stearic acid; unsaturated fatty acids such as oleic acid, linoleic acid, linolenic acid, and eleostearic acid; and (meth) acrylic acid esters such as butyl (meth)acrylate, cyclohexyl (meth)acrylate, 2-ethylhexyl (meth)acrylate, lauryl (meth) acrylate, myristyl (meth)acrylate, and stearyl (meth)acrylate. Each of these compounds may be used alone or two or more of these may be used. When two or more of these compounds are used, at least one of these is preferably a compound having a functional group selected from the group consisting of an epoxy group, an isocyanate group, a thioisocyanate group, an aldehyde group, a halogenated alkyl group, and a halogenated acyl group.

The amount of the compound having a structure in which a hydrocarbon group is bonded to an atomic group reactive with an amino group is preferably 0.01 to 0.90 mol per active amine hydrogen of the unsubstituted polyamine compound. The amount thereof is more preferably 0.05 to 0.90 mol, still more preferably 0.10 to 0.85 mol, particularly preferably 0.17 to 0.80 mol, most preferably 0.23 to 0.80 mol.

The oxyalkylene group-containing side chain can be formed by adding a (poly)alkylene oxide or a (poly)alkylene oxide having an alkoxy group at one end to a polyamine compound, or reacting a polyamine compound with a compound having a (poly)alkylene oxide and an atomic group reactive with an amino group bonded thereto. Examples of the atomic group reactive with an amino group include the same atomic groups as described above.

Examples of the alkylene oxide include C2-C8 alkylene oxides such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, and octylene oxide. In particular, a C2-C4 alkylene oxide is preferred.

Each of these alkylene oxides may be used alone or two or more of these may be used in combination.

Example of the compound having a (poly)alkylene oxide and an atomic group reactive with an amino group bonded thereto include methoxy (poly)ethylene glycol (meth)acrylate, methoxy (poly)ethylene glycol (poly)propylene glycol (meth)acrylate, methoxy (poly)ethylene glycol maleate, and methoxy (poly)ethylene glycol (poly)propylene glycol maleate. Each of these may be used alone or two or more of these may be used in combination.

When the polyamine compound has an oxyalkylene group-containing side chain, the average number of moles of oxyalkylene groups added in one oxyalkylene group-containing side chain is preferably 1 to 500, more preferably 1 to 300, still more preferably 1 to 100.

When the polyamine compound has an oxyalkylene group-containing side chain, the oxyalkylene group-containing side chain is preferably bonded to 10% to 100%, more preferably 30% to 100%, still more preferably 50% to 100% of the nitrogen atoms in the polyamine compound.

The reaction conditions of the reaction of the unsubstituted polyamine compound with the compound for use in introducing a side chain are not limited as long as the reaction proceeds. The reaction temperature is preferably 50° C. to 150° C. and the reaction time is preferably 1 to 100 hours.

The solvent used to react the unsubstituted polyamine compound with the compound for use in introducing a side chain is not limited as long as the reaction proceeds. Examples of the solvent include water; alcohols such as methanol, ethanol, propanol, isopropanol, butanol, pentanol, hexanol, isobutyl alcohol, and isoamyl alcohol; hydrocarbons such as n-butane, propane, benzene, cyclohexane, and naphthalene; esters such as methyl acetate, ethyl acetate, ethyl benzoate, and ethyl lactate; polyhydric alcohols and derivatives thereof, such as (poly)ethylene glycol, ethylene glycol monobutyl ether, ethylene glycol monobutyl ether acetate, tetraethylene glycol, (poly)propylene glycol, and propylene glycol monobutyl ether. Preferred are water, alcohols, hydrocarbons, and esters. In particular, water, methanol, ethanol, isopropanol, cyclohexane, ethylene glycol, ethylene glycol monobutyl ether, and ethyl acetate are preferred.

In the reaction of the unsubstituted polyamine compound with the compound for use in introducing a side chain, a catalyst may be used to promote the reaction. Examples of the catalyst include titanium catalysts such as tetrabutyl titanate and tetraisopropyl titanate; tin catalysts such as stannous chloride, tin octylate, and monobutyltin oxide; and acids such as p-toluenesulfonic acid.

Regarding other reaction conditions, see JP 4436921 B or JP 2008-230865 A.

Other Preferred Embodiments

Even compounds other than the compounds (I) to (V) may be used as the shrinkage reducing agent for a hydraulic material of the present invention as long as they satisfy the conditions (1) to (4). Examples of the compounds other than the compounds (I) to (V) include compounds obtained by introducing a polyoxyalkylene chain into a copolymer of a vinyl aromatic compound, a diene, or an α-olefin with an unsaturated dicarboxylic acid by esterification or amidation. Specific examples of the compounds include a styrene-maleic anhydride copolymer; a compound obtained by introducing an amine having a polyoxyalkylene chain (Jeffamine, manufactured by Huntsman Corporation) in a maleic anhydride of an isobutylene-maleic anhydride copolymer or octadecene-maleic anhydride copolymer; and a phosphoric acid ester polymer containing a phosphoric acid ester monomer as a main constitutional unit described in JP 4717713 B.

<Hydraulic Material Composition>

The shrinkage reducing agent for a hydraulic material of the present invention is preferably added to a composition containing a hydraulic material and water. Such a hydraulic material composition containing the shrinkage reducing agent for a hydraulic material of the present invention, a hydraulic material, and water is also another aspect of the present invention.

The shrinkage reducing agent for a hydraulic material of the present invention can preferably be used as an additive for cement. The additive for cement containing the shrinkage reducing agent for a hydraulic material of the present invention has an ability to reduce the shrinkage of a hydraulic material during drying. Therefore, the additive for cement can be used mainly for reduction or prevention of cracking of the cured product, enhancement of compactability, and prevention of warping and peeling, and is suitably used in the above-described hydraulic material. The additive for cement may optionally contain another component in addition to the shrinkage reducing agent for a hydraulic material of the present invention.

The same components as those described in JP 2002-293596 A may be used as such a component.

The composition containing the shrinkage reducing agent for a hydraulic material of the present invention, a hydraulic material, and water may be produced by any method. The shrinkage reducing agent for a hydraulic material of the present invention, a hydraulic material, and water may be added and mixed by a commonly used method disclosed, for example, in JP 2008-503432 T or JP 2008-512268 T. Examples of the commonly used method include the following methods, and two or more of these may be used in combination.

(a) A method of producing a hydraulic material composition in which a shrinkage reducing agent is diluted with water, and the dilution is mixed with a hydraulic material (b) A method of producing a hydraulic material composition in which a powdered shrinkage reducing agent is mixed with a hydraulic material, and water is added to the resulting mixture (c) A method of producing a hydraulic material composition in which a shrinkage reducing agent is added at the time of the production of a hydraulic material to produce a hydraulic material containing the shrinkage reducing agent, and water is added thereto (d) The method according to the method (c), in which, when a shrinkage reducing agent is added at the time of the production of a hydraulic material, a grinding aid is added or a grinding aid and a shrinkage reducing agent at one time (in the case where the hydraulic material is cement)

(e) A method of adding a shrinkage reducing agent by spraying an aqueous solution containing a shrinkage reducing agent at the time of transportation of the produced hydraulic material solution The hydraulic material for which the shrinkage reducing agent for a hydraulic material of the present invention or an additive composition for a hydraulic material is used may be any hydraulic material or latent hydraulic material. Examples thereof include portland cement such as ordinary portland cement and high-early-strength portland cement, silica cement, fly ash cement, blast furnace cement, alumina cement, high belite cement, and various cement mixtures; constituent components of cement such as tricalcium silicate, dicalcium silicate, tricalcium aluminate, and tetracalcium aluminoferrite; and latent hydraulic fly ash. Each of these may be used alone or two or more of these may be used in combination. Among these, ordinary portland cement is commonly and suitably used.

The amount of the shrinkage reducing agent for a hydraulic material of the present invention is preferably 0.0001% to 10% by weight in terms of solid content relative to the hydraulic material, for example. If the amount is less than 0.0001% by weight, sufficient shrinkage reducing performance may not be obtained. If the amount is more than 10% by weight, retardation of the hardening of a hydraulic material may be possibly induced. The amount is more preferably 0.001% to 5% by weight, still more preferably 0.005% to 3% by weight, most preferably 0.01% to 1% by weight.

The proportion of water in the cement composition is not limited, and is preferably 10% to 80% by weight relative to the cement, for example. If the proportion is less than 10% by weight, the components are insufficiently mixed, which may cause a failure of molding or a reduction in strength. If the proportion is more than 80% by weight, the strength of the cured product of the cement composition may be reduced. The proportion is more preferably 15% to 75% by weight, still more preferably 20% to 70% by weight, most preferably 25% to 65% by weight.

When the cement composition is used as mortar or concrete, sand and stone mixed in the cement composition may be those used in conventionally known cement compositions and are not particularly limited. Examples of the sand and stone include natural fine aggregate such as river sand, sea sand, and mountain sand made from rocks by natural action; artificial fine aggregate obtained by pulverizing these rocks and slabs; and light fine aggregate.

The amount of sand to be mixed may be the same as in the case of conventionally known cement compositions and is not limited. Also, the amount of stone to be mixed may be the same as in the case of conventionally known cement compositions and is not limited. For example, the proportion of the fine aggregate is preferably 20% to 60% by volume. If the proportion is less than 20% by volume, coarse concrete may be obtained, and in the case of concrete with a large slump, the coarse aggregate and the mortar are likely to be separated. If the proportion exceeds 60% by volume, the unit amount of cement and the unit amount of water are required to be large, and concrete having poor fluidity may be obtained. More preferably, the proportion is 30% to 50% by volume.

The cement composition may contain an additional material as necessary. The additional material may be the same as that for conventionally known cement compositions, and is not limited. Examples thereof include a water reducing agent, an AE agent (air entraining agent), an antifoaming agent, a hardening accelerator, a retarder, a rust preventive agent, an expanding material, silica fume, blast furnace slag, fly ash, silica powder, and fibrous materials such as steel fiber and glass fiber. The amounts of these materials to be mixed may be the same as those for conventionally known cement compositions and is not limited.

When the hydraulic material composition contains a water reducing agent, the amount of the water reducing agent is preferably 0.001 to 10 parts by weight in terms of solid content based on 100 parts by weight of the hydraulic material. The amount is more preferably 0.01 to 10 parts by weight, still more preferably 0.01 to 3 parts by weight.

When the composition for a hydraulic material contains a water reducing agent, the mixing ratio between the shrinkage reducing agent and the water reducing agent, (mass of the shrinkage reducing agent)/(mass of the water reducing agent), is preferably 99.9/0.1 to 40/60, more preferably 99/1 to 50/50, still more preferably 98/2 to 60/40, particularly preferably 98/2 to 65/35, most preferably 97/3 to 70/30.

The water reducing agent contained in the hydraulic material composition of the present invention is not limited as long as it functions as a water reducing agent. Examples thereof include lignin sulfonates such as a monovalent metal salt, a divalent metal salt, an ammonium salt, and an organic amine salt of lignin sulfonic acid; polyol derivatives; naphthalenesulfonic acid formalin condensates; polymers having a polyoxyalkylene group and an anionic group, such as a copolymer obtained from monomers including an alkenyl ether monomer and an unsaturated carboxylic acid monomer, in which ethylene oxide, for example, is added to an unsaturated alcohol (e.g. 3-methyl-3-buten-1-ol) or the salt of the copolymer, or a copolymer obtained from monomers including an (alkoxy)polyalkylene glycol mono(meth)acrylate monomer and a (meth)acrylic acid monomer or the salt of the copolymer. Preferred among these water reducing agents are lignin sulfonates and polymers having a polyoxyalkylene group and an anionic group.

In order to enhance the resistance to freezing and thawing of the hydraulic material composition of the present invention, the hydraulic material composition preferably contains fine bubbles and preferably contains an air-entraining agent (AE agent).

When the hydraulic material composition of the present invention contains an AE agent, the amount of the AE agent is preferably 0.002 parts by weight or more based on 100 parts by weight of the hydraulic material. Such an amount of the AE agent is effective to exhibit its performance to enhance the resistance to freezing and thawing. The amount of the AE agent is more preferably 0.0025 parts by weight or more, still more preferably 0.003 parts by weight or more, particularly preferably 0.004 parts by weight or more based on 100 parts by weight of the hydraulic material. Also, the amount of the AE agent is usually preferably 0.1 parts by weight or less, more preferably 0.05 parts by weight or less, still more preferably 0.04 parts by weight or less based on 100 parts by weight of the hydraulic material.

When the hydraulic material composition of the present invention contains an AE agent, the mixing ratio between the shrinkage reducing agent for a hydraulic material and the AE agent in the hydraulic material composition, (mass of shrinkage reducing agent)/(mass of AE agent), is preferably 99.98/0.02 to 80/20. With such a mixing ratio, the hydraulic material composition excellent in both shrinkage reducing performance and resistance to freezing and thawing is obtained. The mixing ratio is more preferably 99.96/0.04 to 85/15, still more preferably 99.9/0.1 to 90/10, particularly preferably 99.8/0.2 to 90/10.

It is another aspect of the present invention to provide such a hydraulic material composition containing the shrinkage reducing agent for a hydraulic material of the present invention, a hydraulic material, and an air entraining agent, in which the amount of the air entraining agent is 0.002 parts by weight or more based on 100 parts by weight of the hydraulic material, and the mass ratio between the shrinkage reducing agent for a hydraulic material and the air entraining agent is 99.98/0.02 to 80/20.

The air entraining agent contained in the hydraulic material composition of the present invention is not limited as long as it functions as an air entraining agent. Examples thereof include resin soap, saturated or unsaturated fatty acids or the salts thereof, sodium hydroxystearate, lauryl sulfate, alkyl benzene sulfonates (ABS), linear alkyl benzene sulfonates (LAS), alkylnaphthalenesulfonic acids or the salts thereof, alkane sulfonates, polyoxyethylene alkyl (phenyl) ethers, polyoxyethylene alkyl(phenyl) ether sulfuric acid esters or the salts thereof, polyoxyethylene alkyl (phenyl) ether phosphoric acid esters or the salts thereof, protein materials, alkenyl sulfosuccinic acids, α-olefin sulfonates, and polyoxyethylene sorbitan oleate.

Preferred among these are resin soap, saturated or unsaturated fatty acids or the salts thereof, alkyl benzene sulfonates (ABS), linear alkyl benzene sulfonates (LAS), polyoxyethylene alkyl(phenyl) ethers, polyoxyethylene alkyl(phenyl) ether sulfuric acid esters or the salts thereof, and polyoxyethylene sorbitan oleate. Particularly preferred are resin soap, alkyl benzene sulfonates (ABS), linear alkyl benzene sulfonates (LAS), polyoxyethylene alkyl(phenyl) ethers, polyoxyethylene alkyl(phenyl) ether sulfuric acid esters and the salts thereof, and polyoxyethylene sorbitan oleate.

In order to enhance the resistance to freezing and thawing of the hydraulic material composition of the present invention, bubbles present in the hydraulic material composition are preferably finer, and the composition preferably contains an antifoaming agent to eliminate large size bubbles generated in the composition when the shrinkage reducing agent or another agent is added.

When the hydraulic material composition of the present invention contains an antifoaming agent, the mixing ratio between the shrinkage reducing agent for a hydraulic material and the antifoaming agent, (mass of the shrinkage reducing agent)/(mass of the antifoaming agent), is preferably 99.99/0.01 to 85/15. With such a mixing ratio, the hydraulic material composition is excellent in both shrinkage reducing performance and resistance to freezing and thawing. The mixing ratio is more preferably 99.98/0.02 to 90/10, still more preferably 99.96/0.04 to 90/10, particularly preferably 99.95/0.05 to 95/5.

As described above, in order to improve the resistance to freezing and thawing of the hydraulic material composition, it is preferable to reduce large size bubbles in the hydraulic material composition. In this case, it is preferable to use a shrinkage reducing agent such that, when 0.7% by mass of the shrinkage reducing agent for a hydraulic material is added to a cement to provide a mortar composition, the mortar composition has a bubble spacing factor of 350 μm or less measured by an air void analyzer. Furthermore, the use of the antifoaming agent enables elimination of large size bubbles generated in the composition when the shrinkage reducing agent is added, and thus the resistance to freezing and thawing of the hydraulic material composition can be further improved.

Such a composition for a hydraulic material containing a shrinkage reducing agent and an antifoaming agent at a predetermined ratio is another aspect of the present invention, which is a composition for a hydraulic material including the shrinkage reducing agent for a hydraulic material and an antifoaming agent in which a mixing ratio between the shrinkage reducing agent for a hydraulic material and the antifoaming agent in the composition for a hydraulic material, (mass of the shrinkage reducing agent for a hydraulic material)/(mass of the antifoaming agent), is 99.99/0.01 to 85/15, and when 0.7% by mass of the shrinkage reducing agent for a hydraulic material is added to a cement to provide a mortar composition, the mortar composition has a bubble spacing factor of 350 μm or less measured by an air void analyzer.

The composition for a hydraulic material of the present invention preferably further contains an air entraining agent. When the hydraulic material composition contains an air entraining agent in addition to the antifoaming agent, the hydraulic material composition obtained by adding the composition for a hydraulic material to the hydraulic material has higher resistance to freezing and thawing. When the composition for a hydraulic material of the present invention contains an air entraining agent, the amount of the air entraining agent is preferably the same as the amount of the AE agent contained in the above-described hydraulic material composition.

That is, it is one preferred embodiment of the composition for a hydraulic material of the present invention that the composition for a hydraulic material of the present invention further contains an air-entraining agent, and a mixing ratio between the shrinkage reducing agent for a hydraulic material and the air-entraining agent in the composition for a hydraulic material, (mass of the shrinkage reducing agent for a hydraulic material)/(mass of the air-entraining agent), is 99.98/0.02 to 80/20.

The antifoaming agent contained in the hydraulic material composition of the present invention is not limited as long as it functions as an antifoaming agent. For example, one or two or more of the following antifoaming agents (1) to (10) can be used.

(1) Mineral-oil antifoaming agents: kerosene and liquid paraffin, for example (2) Fat-and-oil antifoaming agents: animal and vegetable oils, sesame oil and castor oil, and alkylene oxide adducts thereof, for example (3) Fatty-acid antifoaming agents: oleic acid and stearic acid, and alkylene oxide adducts thereof, for example (4) Fatty-acid-ester antifoaming agents: glycerin monoricinolate, alkenyl succinic acid derivatives, sorbitol monolaurate, sorbitol trioleate, and natural wax, for example (5) Oxyalkylene antifoaming agents: polyoxyalkylenes such as (poly)oxyethylene (poly)oxypropylene adducts; (poly)oxyalkyl ethers such as diethylene glycol heptyl ether, polyoxyethylene oleyl ether, polyoxypropylene butyl ether, polyoxyethylene polyoxypropylene-2-ethylhexyl ether, and oxyethylene oxypropylene adducts of C12-C14 higher alcohols; (poly)oxyalkylene (alkyl)aryl ethers such as polyoxypropylene phenyl ether and polyoxyethylene nonylphenyl ether; acetylene ethers produced by addition polymerization of an alkylene oxide to acetylene alcohol, such as 2,4,7,9-tetramethyl-5-decyne-4,7-diol, 2,5-dimethyl-3-hexyne-2,5-diol and 3-methyl-1-butyn-3-ol; and (poly)oxyalkylene fatty acid esters such as diethylene glycol oleic acid ester, diethylene glycol lauric acid ester, and ethylene glycol distearic acid ester; (poly)oxyalkylene sorbitan fatty acid esters such as polyoxyethylene sorbitan monolauric acid ester and polyoxyethylene sorbitan trioleic acid ester; (poly)oxyalkylene alkyl(aryl)ether sulfuric acid ester salts such as polyoxypropylene methyl ether sodium sulfate and polyoxyethylene dodecylphenol ether sodium sulfate; (poly)oxyalkylene alkyl phosphoric acid esters such as (poly)oxyethylene stearyl phosphoric acid ester; (poly)oxyalkylene alkylamines such as polyoxyethylene laurylamine; and polyoxyalkyleneamides, for example (6) Alcohol antifoaming agents: octyl alcohol, hexadecyl alcohol, 2-ethylhexyl alcohol, acetylene alcohol, and glycols, for example (7) Amide antifoaming agents: acrylate polyamine, for example (8) Phosphoric acid ester antifoaming agents: tributyl phosphate and sodium octylphosphate, for example (9) Metal-soap antifoaming agents: aluminum stearate and calcium oleate, for example

(10) Silicone antifoaming agents: dimethyl silicone oil, silicone paste, silicone emulsion, organo-modified polysiloxanes (polyorganosiloxanes such as dimethyl polysiloxane) and fluorosilicone oil, for example <Composition for Hydraulic Material>

The hydraulic material composition of the present invention containing an additional material such as the water reducing agent, the AE agent (air entraining agent), and/or the antifoaming agent can also be said to be a composition for a hydraulic material which contains a shrinkage reducing agent for a hydraulic material and an additional material. Such a composition for a hydraulic material which contains a shrinkage reducing agent for a hydraulic material and an additional material is also another aspect of the present invention.

When the composition for a hydraulic material of the present invention contains the AE agent and/or the antifoaming agent, a preferred mixing ratio between the shrinkage reducing agent for a hydraulic material and these agents is the same as the preferred mixing ratio in the case of the hydraulic material composition.

The composition for a hydraulic material of the present invention is preferably a composition such that, when 0.7% by mass of the shrinkage reducing agent for a hydraulic material is added to a cement to provide a mortar composition, the mortar composition has a bubble spacing factor of 350 μm or less measured by an air void analyzer. In order to improve the resistance to freezing and thawing of the composition for a hydraulic material, large size bubbles in the hydraulic material composition are preferably reduced. The bubble spacing factor is an indicator of the sizes of air bubbles in the hydraulic material composition. A bubble spacing factor thus measured of 350 μm or less indicates that the number of large size bubbles is small. The bubble spacing factor is more preferably 330 μm or less, still more preferably 300 μm or less, particularly preferably 280 μm or less. The bubble spacing factor is usually 120 μm or more.

Advantageous Effects of Invention

The shrinkage reducing agent for a hydraulic material of the present invention has the above features, exhibits excellent performance to reduce the shrinkage of a hydraulic material, and is suitable as a shrinkage reducing agent for a cured product formed from a cement composition.

DESCRIPTION OF EMBODIMENTS

The present invention will be described in more detail below referring to, but not limited to, examples. Unless otherwise mentioned, the term "part(s)" means "part(s) by weight" and "%" means "% by mass".

The molecular weight of a polymer was determined as follows. The surface tension of a polymer was determined under the above-described "condition (2) for measurement of surface tension".

<Measurement of Molecular Weight (GPC Analysis)>
Device: Waters Alliance (2695)
Analysis software: Empower professional+GPC option (Waters)
Column: TSK guardcolumns α+TSKgel α5000+α4000+ α3000 (Tosoh Corp.)
Detector: Differential refractive index (RI) detector (2414, Waters), multi-wavelength visible ultraviolet (PDA) detector (2996, Waters)
Eluent: Solution prepared by dissolving 93.98 g of boric acid and 30.4 g of sodium hydroxide in a solvent mixture of 15,076 g of water and 3,800 g of acetonitrile
Standard substance for drawing calibration curve: Polyethylene glycol (peak top molecular weight (Mp): 272,500, 219,300, 107,000, 50,000, 24,000, 12,600, 7,100, 4,250, 1,470)
Calibration curve: drawn using a cubic equation based on the Mp value and the eluting time of the polyethylene glycol
Flow rate: 1 mL/min
Column temperature: 40° C.
Measurement time: 45 min
Amount of sample liquid injected: 100 μL
Sample concentration: adjusted to 1% with an eluent (Production Example 1) Production of Polymer 1

A glass reaction vessel equipped with a thermometer, a stirrer, a dropping funnel, a nitrogen inlet tube, and a reflux condenser was charged with 91.0 parts of water. The reaction apparatus was purged with nitrogen under stirring and heated to 92° C. in a nitrogen atmosphere. An aqueous monomer solution prepared by mixing 119.4 parts of methoxypolyethylene glycol monoacrylate (average number of moles of ethylene oxide added: 23), 12.5 parts of methacrylic acid, 29.8 parts of water, 0.97 parts of a 30% aqueous solution of sodium hydroxide, and 2.14 parts of 3-mercaptopropionic acid as a chain transfer agent were added dropwise to the reaction vessel over four hours, and 42.0 parts of 1.5% ammonium persulfate were added dropwise to the reaction vessel over seven hours, respectively. After the completion of the addition of the 1.5% aqueous solution of ammonium persulfate, the temperature was continuously maintained at 92° C. for one hour to complete the polymerization. The reaction product was neutralized to pH 7.0 with a 30% aqueous solution of sodium hydroxide. Thus, an aqueous polymer solution (polymer 1) having a weight average molecular weight of 8,600 and an acid content of 57.0 mol % was obtained.

The surface tension of a 5% by mass aqueous solution of the polymer 1 was 62.0 mN/m.

(Production Example 2) Production of Polymer 2

A glass reaction vessel equipped with a thermometer, a stirrer, a dropping funnel, a nitrogen inlet tube, and a reflux condenser was charged with 91.0 parts of water. The reaction apparatus was purged with nitrogen under stirring and heated to 92° C. in a nitrogen atmosphere. An aqueous monomer solution prepared by mixing 122.4 parts of methoxypolyethylene glycol monoacrylate (average number of moles of ethylene oxide added: 23), 10.0 parts of methacrylic acid, 30.6 parts of water, 0.78 parts of a 30% aqueous solution of sodium hydroxide, and 1.92 parts of 3-mercaptopropionic acid as a chain transfer agent were added dropwise to the reaction vessel over four hours; and 42.0 parts of 1.5% ammonium persulfate were added dropwise to the reaction vessel over seven hours, respectively. After the completion of the addition of the 1.5% aqueous solution of ammonium persulfate, the temperature was continuously maintained at 92° C. for one hour to complete the polymerization. The reaction product was neutralized to pH 7.1 with a 30% aqueous solution of sodium hydroxide. Thus, an aqueous polymer solution (polymer 2) having a weight average molecular weight of 9,060 and an acid content of 57.0 mol % was obtained.

The surface tension of a 5% by mass aqueous solution of the polymer 2 was 62.4 mN/m.

(Production Example 3) Production of Polymer 3

An aqueous polymer solution (polymer 3) having a weight average molecular weight of 5,200 and an acid content of 48.0 mol % was obtained in the same manner as in Production Example 1, except that an aqueous monomer solution prepared by mixing 123.8 parts of methoxypolyethylene glycol monoacrylate (average number of moles of ethylene oxide added: 23), 8.9 parts of methacrylic acid, 30.9 parts of water, 0.69 parts of a 30% aqueous solution of sodium hydroxide, and 4.6 parts of 3-mercaptopropionic acid as a chain transfer agent was used.

The surface tension of a 5% by mass aqueous solution of the polymer 3 was 62.0 mN/m.

(Production Example 4) Production of Polymer 4

A glass reaction vessel equipped with a thermometer, a stirrer, a nitrogen inlet tube, and a reflux condenser was charged with 200.0 parts of polyethylene glycol having a weight average molecular weight of 4,000, and heated to 120° C.±5° C. under a stream of nitrogen to melt the polyethylene glycol. Next, while the temperature was maintained at 120° C.±5° C., 15.7 parts of acrylic acid and 2.5 g of Perbutyl D (trade name, di-t-butyl peroxide, NOF Corp.) were separately added dropwise continuously over one hour. The contents were stirred for one hour while the temperature was maintained at 120° C.±5° C., and the heating was stopped. After the solution was cooled to 80° C., 200.0 parts of water was added thereto, and the resulting solution was neutralized to pH 6.7 with a 30% aqueous solution of sodium hydroxide. Thus, an aqueous polymer solution (polymer 4) having a weight average molecular weight of 4,250 and an acid content of 81.2 mol % was obtained.

The surface tension of a 5% by mass aqueous solution of the polymer 4 was 61.9 mN/m.

(Production Example 5) Production of Polymer 5

A glass reaction vessel equipped with a thermometer, a stirrer, a nitrogen inlet tube, and a reflux condenser was charged with 200.0 parts of polyethylene glycol having a weight average molecular weight of 10,000, and heated to 120° C.±5° C. under a stream of nitrogen to melt the polyethylene glycol. Next, while the temperature was maintained at 120° C.±5° C., 8.6 parts of acrylic acid and 2.5 parts of Perbutyl D (trade name, di-t-butyl peroxide, NOF Corp.) were separately added dropwise continuously over one hour. The contents were stirred for one hour while the temperature was maintained at 120° C.±5° C., and the heating was stopped. After the solution was cooled to 80° C., 200.0 parts of water was added thereto, and the resulting solution was neutralized to pH 6.9 with a 30% aqueous solution of sodium hydroxide. Thus, an aqueous polymer solution (polymer 5) having a weight average molecular weight of 10,500 and an acid content of 85.6 mol % was obtained.

The surface tension of a 5% by mass aqueous solution of the polymer 5 was 60.7 mN/m.

(Production Example 6) Production of Polymer 6

An aqueous polymer solution (polymer 6) having a weight average molecular weight of 21,000 and an acid content of 90.6 mol % was obtained in the same manner as in Production Examples 4 and 5, except that 200.0 parts of polyethylene glycol having a weight average molecular weight of 20,000 and 6.9 parts of acrylic acid were used.

The surface tension of a 5% by mass aqueous solution of the polymer 6 was 59.7 mN/m.

(Production Example 7) Production of Polymer 7

(1. Tosylation)
A glass reaction vessel equipped with a stirrer was charged with 100.86 parts of polyethylene glycol having a weight average molecular weight of 10,000 (PEG10000), 4.576 g of tosyl chloride (TsCl), 3.036 parts of triethylamine (Et$_3$N), and 200.0 parts of dichloromethane (CH$_2$Cl$_2$). The reaction was carried out for 24 hours while the reaction system was stirred. The product was filtered to remove salts, and the filtrate was desolvated under reduced pressure to obtain a PEG10000 product with both ends tosylated (PEG10000-2OTs).
(2. Thioacetylation)
A glass reaction vessel equipped with a stirrer was charged with 96.65 parts of the PEG10000-2OTs, 2.467 parts of potassium thioacetate (CH$_3$COSK), and 100.0 parts of acetonitrile (CH$_3$CN). The reaction was carried out for 24 hours while the reaction system was stirred. The product was filtered to remove salts, and the filtrate was desolvated under reduced pressure to obtain a PEG10000 product with both ends thioacetylated (PEG10000-2SAc).
(3. Hydrolysis)
A glass reaction vessel equipped with a stirrer was charged with 92.65 parts of the synthesized PEG10000-2SAc and 100.00 parts of methanol (MeOH), and the PEG10000-2SAc was dissolved therein. To the resulting solution was added 25.00 parts of a 1 N aqueous solution of sodium hydroxide (NaOH), and the solution was stirred for 10 minutes. Thereafter, 25.00 parts of 1 N hydrochloric acid (HCl) was added, and the solution was further stirred for 10 minutes. The solution was extracted with dichloromethane and the organic phase was collected. The organic phase was desolvated under reduced pressure. Thus, a PAG dithiol compound 1 was obtained.
(4. Block Polymerization)
A glass reaction apparatus equipped with a thermometer, a stirrer, a dropping funnel, a nitrogen inlet tube, and a reflux condenser was charged with 15.0 parts of ion-exchanged water. The reaction apparatus was purged with nitrogen under stirring and heated to 80° C. in a nitrogen atmosphere. Thereafter, thereto was added dropwise an aqueous solution (A) (aqueous acid solution) consisted of 2.680 parts of methacrylic acid (MAA) and 10.720 parts of ion-exchanged water (PW) over four hours. At the same time of starting the dropwise addition of the aqueous solution (A), dropwise addition of an aqueous solution (B) (aqueous solution of PAG thiol) composed of 31.37 parts of the PAG dithiol compound 1 and 62.74 parts of ion-exchanged water was also started, which was continued for four hours. In addition, at the same time of starting the dropwise addition of the aqueous solution (A), dropwise addition of an aqueous solution (C) composed of 0.2830 parts of 2,2'-azobis(2-methylpropionamidine) dihydrochloride (V-50, Wako Pure Chemical Industries, Ltd.) as an azo initiator and 8.843 parts of ion-exchanged water was also started, which was continued for five hours. Thereafter, the temperature was continuously maintained at 80° C. for one hour and lowered to complete the polymerization. The reaction solution was neutralized to pH 6.5 with a 30% aqueous solution of sodium hydroxide. Thus, an aqueous copolymer solution (polymer 7) having a weight average molecular weight of 11,000 and an acid content of 90.9 mol % was obtained.

The surface tension of a 5% by mass aqueous solution of the polymer 7 was 60.6 mN/m.

(Production Example 8) Production of Polymer 8

(1. Tosylation)
A PEG20000 product with both ends tosylated (PEG20000-2OTs) was obtained in the same manner as in the tosylation in Production Example 7, except that a glass reaction vessel equipped with a stirrer was charged with 90.77 parts of polyethylene glycol having a weight average molecular weight of 20,000 (PEG20000), 2.060 parts of tosyl chloride (TsCl), and 1.368 parts of triethylamine (Et$_3$N).
(2. Thioacetylation)
A PEG20000 product with both ends thioacetylated (PEG20000-2SAc) was obtained in the same manner as in the thioacetylation in Production Example 7, except that a glass reaction vessel equipped with a stirrer was charged with 86.99 parts of the PEG20000-2OTs and 1.110 parts of potassium thioacetate (CH$_3$COSK).
(3. Hydrolysis)
A PAG dithiol compound 2 was obtained in the same manner as in the hydrolysis in Production Example 7, except that a glass reaction vessel equipped with a stirrer was charged with 82.49 parts of the synthesized PEG20000-2SAc and 150.00 parts of methanol (MeOH).
(4. Block Polymerization)
A glass reaction apparatus equipped with a thermometer, a stirrer, a dropping funnel, a nitrogen inlet tube, and a reflux condenser was charged with 15.0 parts of ion-exchanged water. The reaction apparatus was purged with nitrogen under stirring and heated to 80° C. in a nitrogen atmosphere. Thereafter, thereto was added dropwise an aqueous solution (A) (aqueous acid solution) composed of 1.560 parts of methacrylic acid (MAA) and 10.720 parts of ion-exchanged water (PW) over four hours. At the same time of starting the dropwise addition of the aqueous solution (A), dropwise addition of an aqueous solution (B) (aqueous solution of PAG thiol) composed of 36.40 parts of the PAG dithiol compound 2 and 62.74 parts of ion-exchanged water was also started, which was continued for four hours. In addition, at the same time of starting the dropwise addition of the aqueous solution (A), dropwise addition of an aqueous solution (C) composed of 0.2830 parts of 2,2'-azobis(2-methylpropionamidine)dihydrochloride (V-50, Wako Pure Chemical Industries, Ltd.) as an azo initiator and 8.843 parts of ion-exchanged water was also started, which was continued for five hours. Thereafter, the temperature was continuously maintained at 80° C. for one hour and lowered to complete the polymerization. The reaction solution was neutralized to pH 6.4 with a 30% aqueous solution of sodium hydroxide. Thus, an aqueous copolymer solution (polymer 8) having a weight average molecular weight of 22,500 and an acid content of 90.9 mol % was obtained.

The surface tension of a 5% by mass aqueous solution of the polymer 8 was 59.4 mN/m.

(Production Example 9) Production of Polymer 9

(1. Tosylation)
A PGM 75 product with one end tosylated (PGM 75-OTs) was obtained in the same manner as in the tosylation in Production Examples 7 and 8, except that a glass reaction vessel equipped with a stirrer was charged with 120.50 parts of methoxypolyethylene glycol (average number of moles of ethylene oxide added: 75 (PGM 75)), 9.146 parts of tosyl chloride (TsCl), and 6.057 parts of triethylamine ($Et_3N$).
(2. Thioacetylation)
A PGM 75 product with one end thioacetylated (PGM 75-SAc) was obtained in the same manner as in the thioacetylation in Production Examples 7 and 8, except that a glass reaction vessel equipped with a stirrer was charged with 119.93 parts of the PGM 75-OTs and 5.120 parts of potassium thioacetate ($CH_3COSK$).
(3. Hydrolysis)
A PGM thiol compound was obtained in the same manner as in the hydrolysis in Production Examples 7 and 8, except that a glass reaction vessel equipped with a stirrer was charged with 111.55 parts of the synthesized PGM 75-SAc and 140.00 parts of methanol.
(4. Block Polymerization)
An aqueous copolymer solution (polymer 9) having a weight average molecular weight of 3,450 and an acid content of 83.3 mol % was obtained in the same manner as in the block polymerization in Production Examples 7 and 8, except that a combination of 6.40 parts of methacrylic acid and 13.25 parts of ion-exchanged water was used as the aqueous acid solution and a combination of 45.00 parts of a PGM thiol compound and 77.48 parts of ion-exchanged water was used as the aqueous PGM solution.

The surface tension of a 5% by mass aqueous solution of the polymer 9 was 62.2 mN/m.

(Production Example 10) Production of Polymer 10

(1. Production of Polyethylene Glycol (n=100) with Both Ends Epoxidized)
A glass reaction vessel equipped with a thermometer, a dropping funnel, and a reflux condenser was charged with 10.00 parts of dehydrated tetrahydrofuran (THF). While the THF was stirred with a magnetic stirrer and cooled with ice, 1.00 part of sodium hydride was dissolved therein. After the dissolution, a mixture of 50.00 parts of polyethylene glycol (n=100) and 40.00 parts of THF was added dropwise slowly over 0.5 hours and stirred for about five minutes while the solution was cooled with ice, and the mixture warmed to 40° C. To the mixture was added dropwise 8.16 parts of epichlorohydrin over 0.5 hours while the internal temperature was maintained at 40° C., and the mixture was further stirred for five hours. Thereafter, a small amount of deionized water was added to treat unreacted sodium hydride, and THF was distilled off with an evaporator. Then, the residue was added dropwise to 200 ml of diethyl ether, and the precipitate was collected and dried to obtain an epoxidized polyethylene glycol (n=100).
(2. Production of Polymer 10)
A glass reaction vessel equipped with a thermometer, a stirrer, and a reflux condenser was charged with 48.5 parts of the polyethylene glycol (n=100) with both ends epoxidized. The internal temperature was raised to 55° C., and the contents were stirred. Thereto was slowly added dropwise a mixture of 2.87 parts of L-aspartic acid, 3.59 parts of 48% sodium hydroxide, and 42.09 parts of water over one hour while the internal temperature was maintained at 55° C. The mixture was further stirred for 2.5 hours. Thus, an aqueous polymer solution (polymer 10) having a weight average molecular weight of 4,800 and an acid content of 66.7 mol % was obtained.

The surface tension of a 5% by mass aqueous solution of the polymer 10 was 61.9 mN/m.

(Production Example 11) Production of Polymer 11

(1. Production of Polyethylene Glycol (n=227) with Both Ends Epoxidized)
A polyethylene glycol (n=227) with both ends epoxidized was obtained in the same manner as in "1. Production of polyethylene glycol (n=100) with both ends epoxidized" in Production Example 10, except that a mixture of 110.00 parts of polyethylene glycol (n=227) and 90.00 parts of THF was used instead of the mixture of 50.00 parts of polyethylene glycol (n=100) and 40.00 parts of THF.
(2. Production of Polymer 11)
An aqueous polymer solution (polymer 11) having a weight average molecular weight of 10,500 and an acid content of 66.7 mol % was obtained in the same manner as in "2. Production of polymer 10" in Production Example 10, except that a glass reaction vessel equipped with a thermometer, a stirrer, and a reflux condenser was charged with 105.00 parts of the polyethylene glycol (n=227) with both ends epoxidized, and the internal temperature was raised to 70° C.

The surface tension of a 5% by mass aqueous solution of the polymer 11 was 60.4 mN/m.

(Production Example 12) Production of Polymer 12

(1. Production of Polyethylene Glycol (n=50) with One End Epoxidized)
A polyethylene glycol (n=50) with one end epoxidized was obtained in the same manner as in "1. Production of polyethylene glycol (n=100) with both ends epoxidized" in Production Example 10, except that an unsaturated alcohol prepared by adding 50 mol of ethylene oxide to 3-methyl-3-buten-1-ol was used instead of the polyethylene glycol (n=100).
(2. Production of Polymer 12)
An aqueous polymer solution (polymer 12) having a weight average molecular weight of 2,400 and an acid content of 50.0 mol % was obtained in the same manner as in "2. Production of polymer 10" in Production Example 10, except that a glass reaction vessel equipped with a thermometer, a stirrer, and a reflux condenser was charged with 48.50 parts of polyethylene glycol (n=50) with one end epoxidized.

The surface tension of a 5% by mass aqueous solution of the polymer 12 was 58.9 mN/m.

(Production Example 13) Production of Polymer 13

A glass reaction vessel equipped with a thermometer, a stirrer, a dropping funnel, a nitrogen inlet tube, and a reflux condenser was charged with 102.5 parts of Epomin SP-200 (polyethyleneimine having a number average molecular weight of 10,000, Nippon Shokubai Co., Ltd.). The interior of the reaction vessel was purged with nitrogen under stirring and heated to 60° C. in a nitrogen atmosphere, and the contents were stirred. Thereto was added dropwise 11.81 parts of methyl acrylate over 0.5 hours, and then the temperature was continuously maintained at 60° C. for one hour to complete the addition reaction of methyl acrylate. Next, 18.80 parts of a 30 wt % NaOH aqueous solution and 340.5 parts of pure water were added, the temperature was raised to 70° C., and methyl acrylate was hydrolyzed over one hour. After completion of the hydrolysis, the temperature was lowered to 20° C. or lower, and 37.99 parts of acetic acid was added thereto to adjust the pH to 8.4. Thus, an aqueous polymer solution (polymer 13) having a weight average molecular weight of 10,500 and an acid content of 93.1 mol % was obtained.

The surface tension of a 5% by mass aqueous solution of the polymer 13 was 68.9 mN/m.

(Production Example 14) Production of Polymer 14

A glass reaction vessel equipped with a thermometer, a stirrer, a dropping funnel, a nitrogen inlet tube, and a reflux condenser was charged with 102.5 parts of Epomin SP-200 (polyethyleneimine having a number average molecular weight of 10,000, Nippon Shokubai Co., Ltd.). The interior of the reaction vessel was purged with nitrogen under stirring and heated to 60° C. in a nitrogen atmosphere, and the contents were stirred. Thereto was added dropwise 6.43 parts of methyl acrylate over 0.5 hours, and then the temperature was continuously maintained at 60° C. for one hour to complete the addition reaction of methyl acrylate. Next, 10.21 parts of a 30 wt % NaOH aqueous solution and 340.5 parts of pure water were added, the temperature was raised to 70° C., and methyl acrylate was hydrolyzed over one hour. After completion of the hydrolysis, the temperature was lowered to 20° C. or lower, and 39.90 parts of acetic acid was added thereto to adjust the pH to 8.1. Thus, an aqueous polymer solution (polymer 14) having a weight average molecular weight of 10,300 and an acid content of 88.6 mol % was obtained.

The surface tension of a 5% by mass aqueous solution of the polymer 14 was 69.1 mN/m.

(Comparative Production Example 1) Production of Comparative Polymer 1

A comparative aqueous polymer solution (comparative polymer 1) having an acid content of 81.0 mol % was obtained in the same manner as in Production Example 1 in JP 2007-76972 A.

The surface tension of a 5% by mass aqueous solution of the comparative polymer 1 was 58.0 mN/m.

(Comparative Production Example 2) Production of Comparative Polymer 2

A comparative polymer 2 having an acid content of 73.2 mol % was obtained in the same manner as in Reference Example 1 in JP 3179022 B.

The surface tension of a 5% by mass aqueous solution of the comparative polymer 2 was 63.1 mN/m.

(Comparative Production Example 3) Production of Comparative Polymer 3

A comparative aqueous polymer solution (comparative polymer 3) having an acid content of 82.1 mol % was obtained in the same manner as in Example 1-3 in JP 3683176 B.

The surface tension of a 5% by mass aqueous solution of the comparative polymer 3 was 60.5 mN/m.

(Comparative Production Example 4) Production of Comparative Polymer 4

A comparative aqueous polymer solution (comparative polymer 4) having an acid content of 40.6 mol % was obtained in the same manner as in Example 1-7 in JP 3683176 B.

The surface tension of a 5% by mass aqueous solution of the comparative polymer 4 was 61.3 mN/m.

(Comparative Production Example 5) Production of Comparative Polymer 5

A comparative aqueous polymer solution (comparative polymer 5) having an acid content of 51.5 mol % was obtained in the same manner as in Reference Example 5 in JP 3179022 B.

The surface tension of a 5% by mass aqueous solution of the comparative polymer 5 was 62.5 mN/m.

(Comparative Production Example 6) Production of Comparative Polymer 6

A glass reaction vessel equipped with a thermometer, a stirrer, a nitrogen inlet tube, and a reflux condenser was charged with 108.7 parts of polyethylene glycol having a weight average molecular weight of 1,000, and heated to 120° C.±5° C. under a stream of nitrogen to melt the polyethylene glycol. Next, while the temperature was maintained at 120° C.±5° C., 47.03 parts of acrylic acid and 2.5 g of Perbutyl D (trade name, di-t-butyl peroxide, NOF Corp.) were separately added dropwise continuously over one hour. The contents were stirred for one hour while the temperature was maintained at 120° C.±5° C., and the heating was stopped. After the solution was cooled to 80° C., 200.0 parts of water was added thereto, and the resulting solution was neutralized to pH 6.7 with a 30% aqueous solution of sodium hydroxide. Thus, a comparative aqueous polymer solution (comparative polymer 6) having an acid content of 85.7 mol % was obtained.

The surface tension of a 5% by mass aqueous solution of the comparative polymer 6 was 63.8 mN/m.

(Comparative Production Example 7) Production of Comparative Polymer 7

(1. Tosylation)

A tosylated MPEG1000 product (MPEG1000-OTs) was obtained in the same manner as in the tosylation in Production Example 7, except that a glass reaction vessel equipped with a stirrer was charged with 33.33 parts of methoxypolyethylene glycol (MPEG1000) (average number of moles of ethylene oxide added: 25), 6.867 parts of tosyl chloride (TsCl), 4.556 parts of triethylamine ($Et_3N$), and 200.0 parts of dichloromethan.

(2. Thioacetylation)

A thioacetylated MPEG1000 product (MPEG1000-SAc) was obtained in the same manner as in the thioacetylation in Production Example 7, except that a glass reaction vessel equipped with a stirrer was charged with 33.12 parts of MPEG1000-OTs and 3.907 parts of potassium thioacetate ($CH_3COSK$).

(3. Hydrolysis)

A PAG monothiol compound was obtained in the same manner as in the hydrolysis in Production Example 7, except that a glass reaction vessel equipped with a stirrer was charged with 32.215 parts of the synthesized MPEG1000-SAc and 50.00 parts of methanol (MeOH).

(4. Block Polymerization)

A glass reaction apparatus equipped with a thermometer, a stirrer, a dropping funnel, a nitrogen inlet tube, and a reflux condenser was charged with 15.0 parts of ion-exchanged water. The reaction apparatus was purged with nitrogen under stirring and heated to 80° C. in a nitrogen atmosphere. Thereafter, thereto was added dropwise an aqueous solution (A) (aqueous acid solution) composed of 5.774 parts of methacrylic acid (MAA), 0.962 parts of a 30% aqueous solution of sodium hydroxide, and 23.096 parts of ion-exchanged water (PW) over four hours. At the same time of starting the dropwise addition of the aqueous solution (A), dropwise addition of an aqueous solution (B) (aqueous solution of PAG thiol) composed of 3.800 parts of the PAG monothiol compound and 8.740 parts of ion-exchanged water was also started, which was continued for four hours. In addition, At the same time of starting the dropwise addition of the aqueous solution (A), dropwise addition of an aqueous solution (C) composed of 0.2830 parts of 2,2'-azobis(2-methylpropionamidine) dihydrochloride (V-50, Wako Pure Chemical Industries, Ltd.) as an azo initiator and 8.843 parts of ion-exchanged water was also started, which was continued for five hours. Thereafter, the temperature was continuously maintained at 80° C. for one hour and lowered to complete the polymerization. The reaction solution was neutralized to pH 7.1 with a 30% aqueous solution of sodium hydroxide. Thus, an aqueous comparative copolymer solution (comparative polymer 7) having a weight average molecular weight of 2,980 and an acid content of 95.5 mol % was obtained.

The surface tension of a 5% by mass aqueous solution of the comparative polymer 7 was 62.1 mN/m.

(Comparative Production Example 8) Production of Comparative Polymer 8

A glass reaction vessel equipped with a thermometer, a stirrer, and a reflux condenser was charged with 40.4 parts of polyethylene glycol diglycidyl ether (n=22). The internal temperature was raised to 50° C., and the contents were stirred. Thereto was slowly added dropwise a mixture of 10.00 parts of L-aspartic acid, 12.30 parts of 48% sodium hydroxide, and 57.20 parts of water over 0.5 hours while the internal temperature was maintained at 50° C. The mixture was further stirred for 2.5 hours. Thus, a comparative aqueous polymer solution (comparative polymer 8) having a weight average molecular weight of 1,280 and an acid content of 66.7 mol % was obtained.

The surface tension of a 5% by mass aqueous solution of the comparative polymer 8 was 63.2 mN/m.

(Comparative Production Example 9) Production of Comparative Polymer 9

A comparative aqueous polymer solution (comparative polymer 9) having an acid content of 10.6 mol % was obtained in the same manner as in Production Example 1 in JP 2007-76969 A.

The surface tension of a 5% by mass aqueous solution of the comparative polymer 9 was 38.0 mN/m.

(Measurements of Values According to the Parameters (1) to (4) in the Present Invention)

A mortar in accordance with JASS 5 M402 was prepared according to the below described formulation. With regard to the polymers 1 to 14, the comparative polymers 1 to 8, a commercially available polyethylene glycol having a weight average molecular weight of 4,500 (PEG4500), a commercially available shrinkage reducing agent (TETRAGUARD AS21, Taiheiyo Materials Corporation), and a commercially available polyethylene imine having a number average molecular weight of 10,000 (EPOMIN SP-200, Nippon Shokubai Co., Ltd.), the following conditions (1) to (4) were determined based on the methods for measuring a 15-drop flow value and a 0-drop flow value.

{(15-drop flow value of a mortar composition containing the compound)/(15-drop flow value of a mortar free from the compound)}×100    Condition (1):

{(ratio between 15-drop flow values after two hours mixing)/(ratio between 15-drop flow values after 10 minutes mixing)}×100    Condition (2):

the average particle diameter in an alkaline solution    Condition (3):

{(ratio between 15-drop flow values relating to a mortar composition containing the compound at a solid concentration of 1.0%)×(ratio between 15-drop flow values relating to a mortar composition containing the compound at a solid concentration of 0.1%)}    Condition (4):

Table 1 shows the results. The numerals (I) to (V) in Table 1 mean the following classification of the polymers described above in the present invention.

When the polymer (shrinkage reducing agent) was added to the mortar in accordance with JASS 5 M402, the polymer was added so that the total amount of water and the polymer was 225 g.

(I) Polycarboxylic acid polymer
(II) Graft polymer
(III) (Poly)alkylene glycol block copolymer
(IV) Chelate PEG polymer
(V) Polyamine polymer <Mortar in Accordance with JASS 5 M402>

Ordinary portland cement (conforming to JIS R 5210) 450 g
Water (deionized water) 225 g
ISO standard sand (Japan Cement Association) 1,350 g An antifoaming agent (MasterAir 404, BASF Japan Ltd.) was added to the mortar so that the difference of the air content between the mortar and a shrinkage reducing agent-free mortar (plain) fell within the range of ±3%.

<Mixing of Mortar Composition>

A mortar composition was mixed according to the method of Annex 2 of JIS R 5201-1997 as follows. A polymer or a shrinkage reducing agent and an antifoaming agent were weighed and diluted with water so that the solid content was 0.1% or 1.0% based on 100 parts by weight of cement. Next, 225 g of the dilution was put in a mixing bowl, followed by 450 g of ordinary portland cement, and a mixer is immediately started at a low speed (rotation speed: 140±5 rpm, revolution speed: 62±10 rpm). After 30 seconds from the start, 1,350 g of a standard sand for testing cement strength (specified in 5.1.3., Annex 2 of JIS R 5201-1997) was added thereto over 30 seconds. After the addition of the sand, they were further mixed for 30 seconds at a high speed (rotation speed: 285±10 rpm, revolution speed: 125±10 rpm), and then the mixing was stopped for 90 seconds. During the first 15 seconds of the stop period, the mortar attached to the mixing bowl was scraped off and the mortar attached to the bottom thereof was collected to the center. After the stop period, the mixing was restarted, and the mortar was mixed at a high speed for 60 seconds to complete the mixing. After the completion of the mixing, the mortar was taken out from the mixing bowl, and the air content was measured according to the method of JIS A 1174-1978.

After 10 minutes from the mixing, the mortar was taken out from the mixing bowl again, and the mortar flow was measured according to the method of JIS R 5201-1997. The mortar after the measurement of the air content and the mortar flow value was put in a 1000-ml polyethylene beaker, the top of the container was covered with a wet cloth so as to prevent drying, and the beaker was stored. After the start of the mixing, the entire mortar was stirred about 10 times with a stainless steel spoon every hour.

After two hours from the mixing, the entire mortar was stirred about 10 times using a stainless steel spoon, and then the 15-drop flow value was measured.

<Measurement of 0-Drop Flow Value and 15-Drop Flow Value of Mortar Composition>

The 0-drop flow value and the 15-drop flow value of the mortar composition were measured in accordance with the method of JIS R 5201-1997 as follows.

A flow cone (upper portion inner diameter: 70±0.5 mm, lower portion inner diameter: 100±0.5 mm, height: 60±0.5 mm) was put in the center of a flow table well wiped with a dry cloth and mortar was put in the flow cone in two portions. The mortar was placed up to ½ the height of the flow cone and tamped 15 times with a tamping rod (diameter: 20±1 mm, length: 200 mm) throughout the entire surface. Then, the flow cone was filled with additional mortar and the mortar was tamped 15 times with the tamping rod. If the amount of the mortar was insufficient, additional mortar was supplied and the surface of the mortar was flattened. Thereafter, the flow cone was lifted and removed, allowing the mortar to flow. The diameter of the mortar was measured and defined as a 0-drop flow value. After the measurement of the 0-drop flow value, the flow table was lifted up and then dropped 15 times over 15 seconds, allowing the mortar to flow. The diameter of the mortar was measured and defined as a 15-drop flow value.

Here, the largest diameter of the mortar and the diameter in the direction perpendicular to the largest diameter of the mortar were measured and averaged to determine the 0-drop flow value and the 15-drop flow value.

<Measurement of Average Particle Diameter of Polymer in Alkaline Solution>

(Preparation of Alkaline Solution)

An alkaline solution was prepared in the following way: 1.72 parts of gypsum dihydrate ($CaSO_4 \cdot 2H_2O$), 6.959 parts of sodium sulfate ($Na_2SO_4$), 4.757 parts of potassium sulfate ($K_2SO_4$), and 7.120 parts of potassium hydroxide (KOH) were put into a 1-L measuring flask with a gauge line, and ion-exchanged water was gradually added thereto to dissolve them, thereby preparing an alkaline solution in a total amount of 1 L.

(Preparation of Alkaline Solution of Polymer)

An alkaline solution of each polymer was prepared in the following way: an aqueous polymer solution with a solid content of 0.4 parts was weighed in a sample bottle, and an alkaline solution was added to the bottle until the whole amount reached 20 parts. Thereby, the solid content of the polymer was adjusted to 2%.

(Measurement Method of Average Particle Diameter of Polymer)

The average particle diameter of each polymer was determined using Zetasizer Nano (Malvern Instruments Ltd.) by the dynamic light scattering method (DLS). The parameters in the measurement were set as follows.

Measurement method: Manual
Refractive indicator: Polyethylene glycol (1.460)
Dispersing medium: Water
Temperature: 25° C.
Equilibrium time: 120 seconds
Cell type: Polystyrene cell
Measurement angle: 173 Å (Backscatter)
Measurement time: Automatic
Number of measurements: 6

The measurement was performed in the following procedure.

The temperature of the alkaline solution (solid content 2%) of the polymer was adjusted to 25° C., and the alkaline solution was put into a polystyrene measuring cell to a height of about 1 cm (within the scale range of the apparatus). The cell was set in the measurement site of the apparatus.

The average particle diameter was taken as the average of the middle four measurement values of the six measurement values of the particle diameter, excluding the maximum and minimum measurement values. When two or more particle diameters are obtained from one particle, these measurement values are not used for the determination of the average particle diameter.

TABLE 1

| | | Polymer | (1) Ratio of 15-drop flow values | (2) Retention | (3) Average particle diameter (nm) | (4) Ratio of 15-drop flow values × Ratio of 15-drop flow values |
|---|---|---|---|---|---|---|
| (I) | Example 1 | Polymer 1 | 117.0 | 107.4 | 4.75 | 16,380 |
| | Example 2 | Polymer 2 | 108.4 | 109.0 | 5.30 | 12,680 |
| | Example 3 | Polymer 3 | 109.0 | 101.1 | 3.55 | 11,780 |
| (II) | Example 4 | Polymer 4 | 118.5 | 86.5 | 3.50 | 17,775 |
| | Example 5 | Polymer 5 | 107.0 | 97.9 | 4.60 | 15,780 |
| | Example 6 | Polymer 6 | 106.1 | 97.6 | 6.93 | 12,400 |
| (III) | Example 7 | Polymer 7 | 111.0 | 87.2 | 4.55 | 16,670 |
| | Example 8 | Polymer 8 | 109.4 | 99.8 | 6.85 | 12,750 |
| | Example 9 | Polymer 9 | 106.3 | 96.9 | 3.13 | 13,102 |
| (IV) | Example 10 | Polymer 10 | 107.5 | 96.0 | 3.45 | 12,578 |
| | Example 11 | Polymer 11 | 110.8 | 88.0 | 4.73 | 13,695 |
| | Example 12 | Polymer 12 | 109.0 | 105.1 | 2.40 | 13,080 |
| (V) | Example 13 | Polymer 13 | 107.3 | 99.7 | 4.90 | 13,734 |
| | Example 14 | Polymer 14 | 106.2 | 96.4 | 4.85 | 12,425 |

TABLE 1-continued

|   | | Polymer | (1) Ratio of 15-drop flow values | (2) Retention | (3) Average particle diameter (nm) | (4) Ratio of 15-drop flow values × Ratio of 15-drop flow values |
|---|---|---|---|---|---|---|
| (I) | Comparative Example 1 | Comparative Polymer 1 | 156.1 | — | 7.39 | — |
| | Comparative Example 2 | Comparative Polymer 2 | 150.6 | — | — | — |
| | Comparative Example 3 | Comparative Polymer 3 | 147.5 | — | — | — |
| | Comparative Example 4 | Comparative Polymer 4 | 104.8 | 112.0 | 8.41 | — |
| | Comparative Example 5 | Comparative Polymer 5 | 117.0 | 96.8 | 8.78 | — |
| (II) | Comparative Example 6 | Comparative Polymer 6 | 150.2 | — | 2.00 | — |
| (III) | Comparative Example 7 | Comparative Polymer 7 | 123.6 | — | 1.78 | — |
| (IV) | Comparative Example 8 | Comparative Polymer 8 | 106.6 | — | 1.99 | — |
| Commercial product | Comparative Example 9 | PEG4500 | 100.0 | 93.8 | 3.27 | 9,500 |
| | Comparative Example 10 | Existing shrinkage reducing agent (Surfactant type) | — | — | 910.00 | — |
| | Comparative Example 11 | PEI(SP-200) | 99.0 | — | 4.70 | 9,702 |

(Evaluation of Shrinkage Reducing Performance)

The polymers 1 to 14, the comparative polymers 1 to 8, a commercially available polyethylene glycol having a weight average molecular weight of 4,500 (PEG4500 (acid content: 0 mol %, surface tension of a 5% by mass aqueous solution: 63.1 mN/m)), a commercially available shrinkage reducing agent (TETRAGUARD AS21, Taiheiyo Materials Corporation (acid content: 0 mol %, surface tension of a 5% by mass aqueous solution: 40.0 mN/m)), and a commercially available polyethylene imine having a number average molecular weight of 10,000 (EPOMIN SP-200, Nippon Shokubai Co., Ltd. (acid content: 0 mol %, surface tension of a 5% by mass aqueous solution: 69.0 mN/m)) were evaluated for shrinkage reducing performance in the following way. Tables 2 to 6 show the results. The classification of the polymers in Tables 2 to 6 was the same as in Table 1.

<Evaluation of Shrinkage Reducing Performance>
(Preparation of Specimen)

Specimens (4×4×16 cm) for the evaluation of the shrinkage reducing performance were prepared using the additives in amounts shown in Tables 2 to 6 and the mortar prepared by mixing according to the above-described <Mixing of mortar composition> in accordance with Annex 2 of JIS R 5201.

A mold was coated in advance with silicone grease in order to facilitate release therefrom. Gauge plugs were attached to the both ends of the mold. The mortar immediately after the mixing was put into the mold. Then, the mold was sealed tightly and retained at 20° C. to effect initial curing (sealed curing). One day thereafter, the specimen was released from the mold, the silicone grease adhering to the specimen was removed by washing with a scrubbing brush and water, and subsequently the specimen was cured in still water at 20° C. for six days (curing in water).

(Measurement of Change in Length)

A dial gauge (Nishinippon Shikenki K.K.) was used in accordance with JIS A 1129-3 (dial gauge method). The specimen cured in the still water for six days was wiped with paper towel to remove water remaining on the surface thereof and the length was immediately measured. The length at this point was taken as a standard. Thereafter, the specimen was stored in a constant temperature and humidity room at a temperature of 20° C.±1° C. and a humidity of 60%±5%, during which period the length of the specimen was measured at proper intervals.

In this case, the shrinkage reducing rate was determined by the following equation as a decrease in amount of shrinkage decreased by addition of the composition of the present invention relative to the amount of shrinkage of the standard mortar free from the composition of the present invention. The larger this value, the larger the decrease in amount of shrinkage.

$$\text{Shrinkage reducing rate (\%)} = \frac{(\text{Amount of shrinkage of standard mortar}) - \left(\begin{array}{c}\text{Amount of shrinkage of shrinkage}\\ \text{reducing agent-containing mortar}\end{array}\right)}{\text{Amount of shrinkage of standard mortar}} \times 100$$

TABLE 2

| | | Drying age: four weeks | |
|---|---|---|---|
| | Addition amount (/C) | Shrinkage strain (×10$^{-6}$) | Shrinkage reducing rate |
| (1) Example 1 | 2.0% | 360 | 35.2% |
| Example 2 | 2.0% | 350 | 36.8% |
| Example 3 | 2.0% | 355 | 36.0% |
| Comparative Example 1 | 0.5% | Unmeasurable due to remarkable material separation | |
| Comparative Example 2 | | | |
| Comparative Example 3 | | | |
| Comparative Example 4 | 2.00% | Unmeasurable due to remarkable material separation after pouring into a retaining mold and poor curing | |
| Comparative Example 5 | | | |
| Comparative Example 9 | 2.0% | 400 | 27.9% |
| Comparative Example 10 | 2.0% | 390 | 29.7% |

TABLE 3

| | | Addition | Drying age: four weeks | |
|---|---|---|---|---|
| | | amount (/C) | Shrinkage strain (×10$^{-6}$) | Shrinkage reducing rate |
| (II) | Example 4 | 1.0% | 390 | 29.7% |
| | Example 5 | 1.0% | 335 | 39.6% |
| | Example 6 | 1.0% | 395 | 28.8% |
| | Comparative Example 6 | 0.5% | Unmeasurable due to remarkable material separation | |

TABLE 4

|  | Addition amount (/C) | Drying age: four weeks | |
|---|---|---|---|
|  |  | Shrinkage strain ($\times 10^{-6}$) | Shrinkage reducing rate |
| (III) Example 7 | 0.5% | 425 | 23.4% |
| Example 8 | 0.5% | 375 | 32.4% |
| Example 9 | 0.5% | 455 | 18.0% |
| Comparative Example 7 | 0.5% | 590 | −6.0% |

TABLE 5

|  | Addition amount (/C) | Drying age: four weeks | |
|---|---|---|---|
|  |  | Shrinkage strain ($\times 10^{-6}$) | Shrinkage reducing rate |
| (IV) Example 10 | 1.2% | 435 | 21.6% |
| Example 11 | 1.2% | 440 | 20.7% |
| Example 12 | 1.2% | 415 | 25.0% |
| Comparative Example 8 | 1.2% | 545 | 1.8% |

TABLE 6

|  | Addition amount (/C) | Drying age: four weeks | |
|---|---|---|---|
|  |  | Shrinkage strain ($\times 10^{-6}$) | Shrinkage reducing rate |
| (V) Example 13 | 2.0% | 430 | 22.6% |
| Example 14 | 2.0% | 420 | 24.3% |
| Comparative Example 11 | 2.0% | 455 | 18.1% |

The results in Tables 2 to 6 demonstrate that the polymers satisfying the conditions (1) to (4) are highly effective as a shrinkage reducing agent for a cement composition. All the polymers satisfying the conditions (1) to (4) in Tables 2 to 6 impart excellent shrinkage reducing performance even though they are different in structure. This shows that it is important for the polymers to satisfy the conditions (1) to (4).

(Concrete Test)

Compositions were prepared using the compounds synthesized in the production examples and a commercially available shrinkage reducing agent together with admixtures. The resulting compositions in the form of concrete were evaluated for the change in length and the compressive strength. Table 7 shows the compounds and the admixtures used in the evaluation. The concrete was mixed and evaluated in the following way.

TABLE 7

| Formulation | Name | Type |
|---|---|---|
| Compound (A) | Polymer 2 | Polymer obtained in Production Example 2 |
|  | Polymer 3 | Polymer obtained in Production Example 3 |
|  | Polymer 6 | Polymer obtained in Production Example 6 |
|  | Polymer 9 | Polymer obtained in Production Example 9 |
|  | Polymer 11 | Polymer obtained in Production Example 11 |
|  | Polymer 14 | Polymer obtained in Production Example 14 |
|  | Comparative polymer 9 | Polymer obtained in Comparative Production Example 9 |
|  | PEG4500 | Polyethylene glycol having weight average molecular weight of 4,500 |
| Water reducing agent (B) | PC-1 | Polycarboxylic acid high-performance AE water-reducing agent |
| AE agent (C) | AE-1 | MasterAir 202(BASF Japan Ltd.) Modified rosin acid compound anionic surfactant |
| Antifoaming agent (D) | DEF-1 | MasterAir 404(BASF Japan Ltd.) Polyalkylene glycol derivative |

(1) Concrete Test

The materials of the concrete mix:

a unit amount of cement: 309 kg/m$^3$, a unit amount of water: 170 kg/m$^3$, a unit amount of fine aggregate: 822 kg/m$^3$, a unit amount of coarse aggregate: 942 kg/m$^3$, (the ratio of water to cement (W/C): 55%, sand-total aggregate ratio (s/a): 48.0%)

were weighed such that the amount of the concrete mix was 30 L, and mixed using a forced twin-screw mixer with a 55-L mixing tank. Here, the cement used was the ordinary portland cement (Taiheiyo Cement Corporation) (specific gravity: 3.16). The fine aggregate was a mixture of land sand from oui river (density in saturated surface-dry condition: 2.60 kg/L, fineness modulus: 2.79) and land sand from kimizu (density in saturated surface-dry condition: 2.57 kg/L, fineness modulus: 1.10) in a weight ratio of land sand from oui river/land sand from kimizu=90/10. The coarse aggregate was hard sandstone from Oume (density in saturated surface-dry condition: 2.65 kg/L, fineness modulus: 6.70). The air content of the cement was adjusted using a commercially available agent for air-content adjustment (AE agent and antifoaming agent: see Table 7) so as to fall within the range of 5%±1%. Furthermore, a polycarboxylic acid high-performance AE water-reducing agent was appropriately added so that the slump was adjusted to 18±2 cm. Table 8 shows the formulations of the admixtures.

TABLE 8

| | Compound (A) | | Water reducing agent (B) | AE agent (C) | Antifoaming agent (D) | Ratio between amounts (A)/(D) |
|---|---|---|---|---|---|---|
| | Compound | Addition amount | | | | |
| Example 15 | Polymer 3 | 1.5 | 0.35 | 0.0060 | 0.0035 | 99.8/0.2 |
| Example 16 | Polymer 6 | 1.0 | 0.40 | 0.0070 | 0.0050 | 99.5/0.5 |
| Example 17 | Polymer 9 | 0.5 | 0.15 | 0.0055 | 0.0045 | 99.1/0.9 |
| Example 18 | Polymer 11 | 1.0 | 0.40 | 0.0070 | 0.0090 | 99.1/0.9 |
| Example 19 | Polymer 14 | 2.0 | 0.55 | 0.0080 | 0.0070 | 99.7/0.3 |
| Example 20 | Polymer 2 | 1.5 | 0.25 | 0.0060 | 0.0030 | 99.8/0.2 |
| Example 21 | Polymer 3 | 1.5 | 0.35 | 0.0060 | 0.0035 | 99.8/0.2 |
| Comparative Example 12 | PEG4500 | 1.0 | 0.40 | 0.0060 | 0.0055 | 99.5/0.5 |
| Comparative Example 13 | PEG4500 | 2.0 | 0.35 | 0.0065 | 0.0050 | 99.8/0.2 |
| Comparative Example 14 | — | | 0.80 | 0.0075 | 0.0085 | — |
| Comparative Example 15 | Comparative Polymer 9 | 1.5 | 0.35 | 0.0050 | 0.0550 | 96.5/3.5 |
| Comparative Example 16 | Polymer 2 | 1.5 | 0.30 | 0.0010 | 0.0006 | 99.96/0.04 |

(2) Mixing of Materials

The coarse aggregate, fine aggregate, and cement were put into a mixer and dry-mixed for 10 seconds, and then the rotation was stopped. Water containing the compound (A), the water-reducing agent (B), the AE agent (C), and the antifoaming agent (D) were added thereto, and they were mixed for 60 seconds, and then the rotation was stopped. The mortar attached to the stirring blade and the shaft was scraped off and mixed again for 60 seconds. Then, the concrete was taken out from the mixer and evaluated.

(3) Evaluation of Fresh Concrete

The resulting fresh concrete was evaluated for the slump value and the air content in accordance with the followings.

Slump value: JIS A 1101-1998

Air content: JIS A 1128-1998

(4) Measurement of Bubble Spacing Factor

[Mixing of Concrete]

Concrete to measure a bubble spacing factor was prepared in the following way. Here, 0.7% by mass of the compound (A) in terms of solid content was added to 100 parts by weight of the cement, and the above method for mixing the concrete mix, admixture, and materials was used.

(i) The compound (A), a water-reducing agent, and an antifoaming agent were appropriately used, and the amounts of the water-reducing agent and the antifoaming agent were adjusted so that the slump fell within the range of 18±2 cm and the air content fell within the range of 2% to 2.5%. In this case, the amount of the antifoaming agent was set to the minimum required to achieve the target air content. If the air content became 2.5% or less only with the compound (A) and the water reducing agent, no antifoaming agent was used to adjust the air content.

(ii) An AE agent was appropriately added to the mix of the compound (A), the water-reducing agent, and the antifoaming agent in amounts determined in (i) to adjust the air content to 5%±1%. If the slump value fell outside the predetermined range (18±2 cm) by addition of the AE agent, the slump value was appropriately adjusted by controlling the amount of the water reducing agent.

(Measurement of Bubble Spacing Factor by Air Void Analyzer (AVA))

Aggregate with a size of 6 mm or larger was eliminated from the fresh concrete, and the bubble spacing factor, which is an indicator of the resistance to freezing and thawing, of the fresh concrete was measured using an air void analyzer (trade name: AVA, Germann Instruments).

The air content of the fresh concrete was measured, then aggregate with a size of 6 mm or larger was eliminated, and 20 ml of the mortar for the evaluation of bubble spacing factor was collected in a dedicated syringe. About 2,000 ml of water was injected into a measurement column, and bubbles on the wall surface of the column were removed with a brush. Then, 250 ml of the solution for AVA measurement was injected into the bottom of the column using a dedicated instrument. After the injection, a Petri dish for collecting bubbles was installed near the water surface of the column, and the dish was fixed to the measurement part. Then, 20 ml of the mortar collected in the syringe was injected into the bottom of the column, and the mortar was stirred for 30 seconds to sufficiently discharge the entrained air of the mortar into the liquid. The bubble spacing factor was determined by measuring the volume of bubbles discharged with time.

For the calculation of the bubble spacing factor, the value obtained by subtracting the volume of the aggregate with a size of 6 mm or larger from the total volume of the concrete (mortar volume ratio) and the volume of the paste (paste volume ratio) were calculated from the following formulas (I) and (II).

$$\text{Mortar volume ratio (\%)} = [(V_B + V_W + V_S)/1000] \times 100 \quad (I)$$

$$\text{Paste volume ratio (\%)} = [(V_B + V_W)/1000] \times 100 \quad (II)$$

$V_B$: Volume of binding material (=unit amount of binding material (kg)/specific gravity of binding material)

$V_W$: Volume of water and admixture (which was the same as the unit amount of water)

$V_S$: Volume of aggregate with a size of 6 mm or larger (=unit amount of fine aggregate/specific gravity of fine aggregate)

(5) Evaluation of Drying Shrinkage Reducing Performance

The concrete was mixed by the above (1) and (2) in the "(concrete test)". After confirming that the slump and the air content reached the predetermined values, a concrete specimen (10×10×40 cm) for the evaluation of the drying shrinkage reducing performance was prepared, and the change in length was measured in accordance with JIS A 1129.

A mold was coated in advance with silicone grease in order to obtain waterproofness and facilitate release therefrom. Gauge plugs were attached to the both ends of the mold. The mixed concrete was poured into the mold and retained at 20° C. to effect initial curing. One day thereafter, the cured concrete was released from the mold, and subsequently cured in still water at 20° C. for six days (curing in water). A dial gauge (Nishinippon Shikenki K.K.) was used in accordance with JIS A 1129. The specimen cured in the still water for six days was wiped with paper towel to remove the water remaining on the surface thereof and immediately measured to determine the length thereof. The length found at this point was taken as a standard. Thereafter, the specimen was stored in a constant temperature and humidity room at a temperature of 20° C. and a humidity of 60%, during which period the length of the specimen was measured at proper intervals. The shrinkage reducing performance was evaluated by determining the ratio of changes in length using the following formula (i):

Ratio of changes in length (%)=(L2/L1)×100    (i)

L1: Shrinkage strain of a concrete specimen with a shrinkage reducing agent
L2: Shrinkage strain of concrete (standard concrete) free from a shrinkage reducing agent The smaller the ratio of changes in length, the better the shrinkage reduction performance.

(6) Evaluation of Compressive Strength

The concrete was mixed by the above (1) and (2) in the "(concrete test)". A concrete specimen (diameter: 10 cm, height: 20 cm) for the evaluation of the compressive strength was prepared in accordance with JIS A 1132, and the compressive strength was measured in accordance with JIS A 1180. After confirming that the slump and the air content reached the predetermined values, the concrete was poured into a plastic mold and retained at 20° C. to effect initial curing. One day thereafter, the concrete was removed from the mold and subsequently cured in still water at 20° C. (curing in water). The specimen cured for seven days and the specimen cured for 28 days in water were prepared, and both the upper and lower end faces of each specimen were polished. Then, the compressive strength was measured in accordance with JIS A 1108.

(7) Evaluation of Resistance to Freezing and Thawing

The resulting fresh concrete was poured into a mold (10×10×40 cm) for a specimen, subjected to sealed curing at 20° C. for two days, and the cured concrete was demolded. After demolding, the concrete was further cured in still water at 20° C. for five days. Thereafter, the resistance to freezing and thawing was evaluated.

The resistance to freezing and thawing was evaluated in accordance with Method A in JIS A 1148-2001 by measuring the primary resonance frequency and the weight of the specimen every 30 cycles in accordance with JIS A 1127-2001.

The resistance to freezing and thawing every 30 freeze-thaw cycles was evaluated by calculating the relative dynamic elastic modulus from the ratio of the primary resonance frequency at the end of every cycle relative to the primary resonance frequency before the start of the freeze-thaw cycle (0 cycle) as shown in the following equation (ii). The number of freeze-thaw cycles was at most 300 cycles. If the relative dynamic elastic modulus became 60% or less before the number of freeze-thaw cycles reached 300 cycles, the evaluation was completed at that time. The final resistance to freezing and thawing was evaluated by calculating the durability index represented by the following equation (iii). The relative dynamic elastic modulus and the durability index closer to 100 indicate better resistance to freezing and thawing.

Relative dynamic elastic modulus (%)=($f_n^2/f_0^2$)×100    (ii)

$f_n$: Primary resonance frequency (Hz) after n freeze-thaw cycles
$f_0$: Primary resonance frequency (Hz) at 0 freeze-thaw cycle Durability index=(P×N)/300    (iii)

P: Relative dynamic elastic modulus (%) at the time of N freeze-thaw cycles
N: The smaller one of 300 cycles and the number of freeze-thaw cycles when the relative dynamic elastic modulus (%) reached 60% or less Table 9 shows the evaluation results of the physical properties of the concrete containing admixtures.

TABLE 9

| | Physical properties of concrete | | | | | |
|---|---|---|---|---|---|---|
| | Slump (cm) | Air content (%) | Compressive strength (Age of material: 28 days) (MPa) | Bubble spacing factor (μm) | Durability index | Ratio of changes in length (Drying age:eight weeks) |
| Example 15 | 17.5 | 4.9 | 41.1 | — | 88 | 73 |
| Example 16 | 18.0 | 5.9 | 42.3 | — | 90 | 75 |
| Example 17 | 19.0 | 6.0 | 41.1 | — | 88 | 82 |
| Example 18 | 19.5 | 5.5 | 41.7 | — | 85 | 82 |
| Example 19 | 19.0 | 5.8 | 41.4 | — | 84 | 70 |
| Example 20 | 20.5 | 5.4 | — | 320 | 75 | 73 |
| Example 21 | 17.5 | 4.9 | — | 280 | 88 | 75 |
| Comparative Example 12 | 18.5 | 5.5 | 41.0 | — | 89 | 88 |
| Comparative Example 13 | 19.0 | 5.3 | 40.3 | — | 86 | 75 |
| Comparative Example 14 | 18.5 | 5.6 | 42.5 | — | 93 | 100 |
| Comparative Example 15 | 20.0 | 5.2 | — | 275 | 29 | 86 |

TABLE 9-continued

| | | | Physical properties of concrete | | | |
|---|---|---|---|---|---|---|
| | Slump (cm) | Air content (%) | Compressive strength (Age of material: 28 days) (MPa) | Bubble spacing factor (μm) | Durability index | Ratio of changes in length (Drying age:eight weeks) |
| Comparative Example 16 | 18.0 | 5.0 | — | 480 | 20 | 75 |

Comparison of the results of Examples 16 to 18 with the results of Comparative Example 12 and comparison of the results of Examples 15 and 19 with the results of Comparative Example 13 show that every polymer satisfying the conditions (1) to (4) reduces the ratio of changes in length to equal to or smaller than that provided by the comparative compound PEG4500 even when the amount of each polymer is smaller than that of the comparative compound PEG4500. This demonstrates that these polymers provide excellent shrinkage reducing performance also in concrete.

Furthermore, it is also confirmed that the durability index as an indicator of the compressive strength and the resistance to freezing and thawing is favorable, and the compound provides higher durability.

Comparison of the results of Examples 20 and 21 with the results of Comparative Example 15 and comparison of the results of Examples 20 and 21 with the results of Comparative Example 16 show that a mortar composition which contains a polymer satisfying the conditions (1) to (4) (shrinkage reducing agent) and an antifoaming agent and is prepared by adding the polymer to mortar with a bubble spacing factor within the predetermined range is excellent in both shrinkage reducing performance and resistance to freezing and thawing.

The invention claimed is:

1. A shrinkage reducing agent for a hydraulic material comprising a compound that satisfies the following conditions (1) to (4), a 5% by mass aqueous solution of the compound having a surface tension of 55 to 70 mN/m:
   (1) a ratio represented by {(15-drop flow value of a mortar composition containing the compound)/(15-drop flow value of a mortar free from the compound)}×100 is 120 or less,
   wherein the (15-drop flow value of a mortar composition containing the compound) means a 15-drop flow value of a mortar composition containing the compound at a solid concentration of 0.1% after 10 minutes mixing and
   the (15-drop flow value of a mortar free from the compound) means a 15-drop flow value of a mortar free from the compound after 10 minutes mixing;
   (2) a ratio represented by {(ratio between 15-drop flow values after two hours mixing)/(ratio between 15-drop flow values after 10 minutes mixing)}×100 is 110 or less,
   wherein the (ratio between 15-drop flow values after two hours mixing) means a ratio of a 15-drop flow value of a mortar composition containing the compound at a solid concentration of 0.1% after two hours mixing to a 15-drop flow value of a mortar free from the compound after two hours mixing, and
   the (ratio between 15-drop flow values after 10 minutes mixing) means a ratio of a 15-drop flow value of a mortar composition containing the compound at a solid concentration of 0.1% after 10 minutes mixing to a 15-drop flow value of a mortar free from the compound after 10 minutes mixing;
   (3) the compound has an average particle size of 2.2 to 8.5 nm in an alkaline solution; and
   (4) a product of {(ratio between 15-drop flow values relating to a mortar composition containing the compound at a solid concentration of 1.0%)×(ratio between 15-drop flow values relating to a mortar composition containing the compound at a solid concentration of 0.1%)} is 10,100 or more,
   wherein the (ratio between 15-drop flow values relating to a mortar composition containing the compound at a solid concentration of 1.0%) means a ratio of a 15-drop flow value of a mortar composition containing the compound at a solid concentration of 1.0% after 10 minutes mixing to a 15-drop flow value of a mortar free from the compound after 10 minutes mixing, and
   the (ratio between 15-drop flow values relating to a mortar composition containing the compound at a solid concentration of 0.1%) means a ratio of a 15-drop flow value of a mortar composition containing the compound at a solid concentration of 0.1% after 10 minutes mixing to a 15-drop flow value of a mortar free from the compound after 10 minutes mixing,
   the mortar compositions and the mortars are in accordance with JASS 5 M402.

2. The shrinkage reducing agent for a hydraulic material according to claim 1,
   wherein the compound has an acid content of 25 mol % or more.

3. The shrinkage reducing agent for a hydraulic material according to claim 1,
   wherein the compound is a polymer having in a structure at least one polymer chain selected from the group consisting of polymer chains derived from an ethylenically unsaturated monomer, polyalkylene glycol chains, and polyamine chains.

4. The shrinkage reducing agent for a hydraulic material according to claim 1,
   wherein the compound is at least one compound selected from the group consisting of the compounds (I) to (V):
   (I): a polymer including a structural unit represented by the following formula (1):

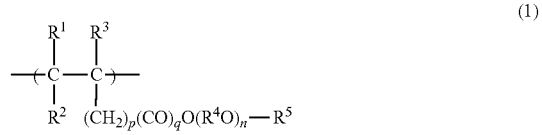

(1)

wherein $R^1$ to $R^3$ are the same as or different from each other and each represent a hydrogen atom or a methyl group, $R^4$Os are the same as or different from each other and each represent a C2-C18 oxyalkylene group, $R^5$ represents a hydrogen atom or a C1-C30 hydrocarbon group, p represents 0 to 5, q represents 0 or 1, and n represents an average number of moles of oxyalkylene groups added and is 1 to 300; and a structural unit represented by the following formula (2):

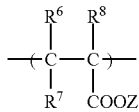

(2)

wherein $R^6$ to $R^8$ are the same as or different from each other and each represent a hydrogen atom, a methyl group, or a $—(CH_2)_m COOZ'$ group, in which m is an integer of 0 to 2 and $Z'$ represents a hydrogen atom, a metal atom, an ammonium group, an organic amine group, or a hydrocarbon group, and Z represents a hydrogen atom, a metal atom, an ammonium group, an organic amine group, or a hydrocarbon group;

(II): a polymer prepared by graft polymerization of an ethylenically unsaturated monomer to a polyether compound represented by the following formula (3):

(3)

wherein $R^9$Os are the same as or different from each other and each represent a C2-C18 oxyalkylene group, r represents an average number of moles of oxyalkylene groups added and is 1 to 2,000, and W and Y are the same as or different from each other and each represent a hydrogen atom or a methyl group;

(III): a (poly)alkylene glycol block copolymer having a structure in which a polymer chain (A) derived from an ethylenically unsaturated monomer component is bonded to an end of a (poly)alkylene glycol chain (B) via a binding site (X);

(IV): a polyalkylene glycol compound including a linear or branched polyalkylene glycol chain, the chain having at least two ends each of which has an organic residue bonded thereto, the organic residue being capable of adsorbing at least one selected from the group consisting of metals, metal compounds, and metal ions, the organic residue containing at least one functional group selected from the group consisting of a carbonyl group, a hydroxy group, an amino group, a thiol group, a phosphoric acid group, a phosphorous acid group, and a silane group; and (V): a polyamine compound having an acid group-containing side chain.

5. The shrinkage reducing agent for a hydraulic material according to claim 4,
wherein the polymer of (II) is a graft polymer prepared by graft polymerization of the ethylenically unsaturated monomer to the polyether compound so that the amount of an unsaturated carboxylic acid monomer in the ethylenically unsaturated monomer is 0.1% to 50% by weight relative to the polyether compound.

6. The shrinkage reducing agent for a hydraulic material according to claim 4,
wherein the polyether compound represented by the formula (3) has a weight average molecular weight of 1,000 to 1,000,000.

7. A hydraulic material composition comprising:
the shrinkage reducing agent for a hydraulic material according to claim 1;
a hydraulic material; and
water.

8. A composition for a hydraulic material comprising:
the shrinkage reducing agent for a hydraulic material according to claim 1; and
an antifoaming agent,
wherein a mixing ratio between the shrinkage reducing agent for a hydraulic material and the antifoaming agent in the composition for a hydraulic material, (mass of the shrinkage reducing agent for a hydraulic material)/(mass of the antifoaming agent), is 99.99/0.01 to 85/15, and
when 0.7% by mass of the shrinkage reducing agent for a hydraulic material is added to a cement to provide a mortar composition, the mortar composition has a bubble spacing factor of 350 µm or less measured by an air void analyzer.

9. The composition for a hydraulic material according to claim 7, further comprising an air-entraining agent,
wherein a mixing ratio between the shrinkage reducing agent for a hydraulic material and the air-entraining agent in the composition for a hydraulic material, (mass of the shrinkage reducing agent for a hydraulic material)/(mass of the air-entraining agent), is 99.98/0.02 to 80/20.

10. A hydraulic material composition comprising:
the shrinkage reducing agent for a hydraulic material according to claim 1;
a hydraulic material; and
an air-entraining agent,
wherein the hydraulic material composition contains 0.002 parts by weight or more of the air-entraining agent based on 100 parts by weight of the hydraulic material, and
a mass ratio between the shrinkage reducing agent for a hydraulic material and the air-entraining agent is 99.98/0.02 to 80/20.

* * * * *